United States Patent
Choi et al.

(10) Patent No.: US 11,297,315 B2
(45) Date of Patent: Apr. 5, 2022

(54) VIDEO ENCODING METHOD AND DEVICE AND VIDEO DECODING METHOD AND DEVICE

(71) Applicant: SAMSUNG ELECTRONICS CO., LTD., Suwon-si (KR)

(72) Inventors: Narae Choi, Suwon-si (KR); Minsoo Park, Suwon-si (KR); Minwoo Park, Suwon-si (KR); Seungsoo Jeong, Suwon-si (KR); Kiho Choi, Suwon-si (KR); Woongil Choi, Suwon-si (KR); Anish Tamse, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/042,461

(22) PCT Filed: Apr. 24, 2019

(86) PCT No.: PCT/KR2019/004966
§ 371 (c)(1),
(2) Date: Sep. 28, 2020

(87) PCT Pub. No.: WO2019/209028
PCT Pub. Date: Oct. 31, 2019

(65) Prior Publication Data
US 2021/0014487 A1    Jan. 14, 2021

Related U.S. Application Data

(60) Provisional application No. 62/661,890, filed on Apr. 24, 2018.

(51) Int. Cl.
*H04N 19/11*     (2014.01)
*H04N 19/105*    (2014.01)
(Continued)

(52) U.S. Cl.
CPC .......... *H04N 19/11* (2014.11); *H04N 19/105* (2014.11); *H04N 19/132* (2014.11); *H04N 19/159* (2014.11); *H04N 19/176* (2014.11)

(58) Field of Classification Search
None
See application file for complete search history.

(56) References Cited

U.S. PATENT DOCUMENTS 9,532,058 B2    12/2016    Chien et al.
9,787,982 B2    10/2017    Wang et al.
(Continued)

FOREIGN PATENT DOCUMENTS

KR    10-2014-0017014 A    2/2014
KR    10-2014-0049098 A    4/2014
(Continued)

OTHER PUBLICATIONS

Communication dated Aug. 5, 2019, issued by the International Searching Authority in corresponding International Application No. PCT/KR2019/004966 (PCT/ISA/220, 210, 237).

(Continued)

*Primary Examiner* — Chikaodili E Anyikire
(74) *Attorney, Agent, or Firm* — Sughrue Mion, PLLC

(57) ABSTRACT

Provided are video encoding/decoding methods and apparatuses for determining an intra prediction mode of a current block, based on a width and height of the current block. When the current block has a square shape in which the width and height are equal, the intra prediction mode of the current block is determined from among first intra prediction mode candidates including a plurality of predetermined intra prediction directions, and when the current block has a non-square shape in which the width and height are not equal, the intra prediction mode of the current block is (Continued)

determined from among second intra prediction mode candidates configured based on the non-square shape.

2 Claims, 42 Drawing Sheets

(51) Int. Cl.
    *H04N 19/132* (2014.01)
    *H04N 19/159* (2014.01)
    *H04N 19/176* (2014.01)

(56) References Cited

U.S. PATENT DOCUMENTS

| | | | |
|---|---|---|---|
| 10,284,866 B1* | 5/2019 | Zhao | H04N 19/11 |
| 2017/0150180 A1 | 5/2017 | Lin et al. | |
| 2017/0374370 A1 | 12/2017 | Min et al. | |
| 2019/0174128 A1* | 6/2019 | Jang | H04N 19/105 |
| 2019/0356909 A1* | 11/2019 | Lainema | H04N 19/147 |
| 2020/0137381 A1* | 4/2020 | Van der Auwera | H04N 19/172 |
| 2020/0213584 A1 | 7/2020 | Gamei et al. | |
| 2020/0296403 A1 | 9/2020 | Han et al. | |

FOREIGN PATENT DOCUMENTS

| | | |
|---|---|---|
| KR | 10-2017-0054561 A | 5/2017 |
| KR | 10-2017-0142860 A | 12/2017 |
| WO | 2018/037896 A1 | 3/2018 |
| WO | 2018/127624 A1 | 7/2018 |

OTHER PUBLICATIONS

Rickard Sjöberg et al., "Description of SDR and HDR video coding technology proposal by Ericsson and Nokia", Joint Video Exploration Team (JVET) of ITU-T SG 16 WP 3 and ISO/IEC JTC 1/SC 29/WG 11, Document: JVET-J0012-v1, Apr. 13, 2018, 32 pages total.

Communication dated Nov. 19, 2020 issued by the Korean Intellectual Property Office in counterpart Korean Application No. 10-2020-7021738.

Communication dated Jan. 27, 2021 issued by the Korean Intellectual Property Office in counterpart Korean Application No. 10-2020-7021738.

Zhao, et al., "CE3-related: Unification of angular intra prediction for square and non-square blocks", Oct. 2018, Joint Video Experts Team (JVET) of ITU-T SG 16 WP 3 and ISO/IEC JTC 1/SC 29/WG 11, JVET-L0279, 10 pages total.

Racapé, et al., "CE3-related: Wide-angle intra prediction for non-square blocks", Jul. 2018, Joint Video Experts Team (JVET) of ITU-T SG 16 WP 3 and ISO/IEC JTC 1/SC 29/WG 11, JVET-K0500_r4, 13 pages total.

Communication dated Dec. 9, 2021 by the European Patent Office for European Patent Application No. 19792735.3.

* cited by examiner

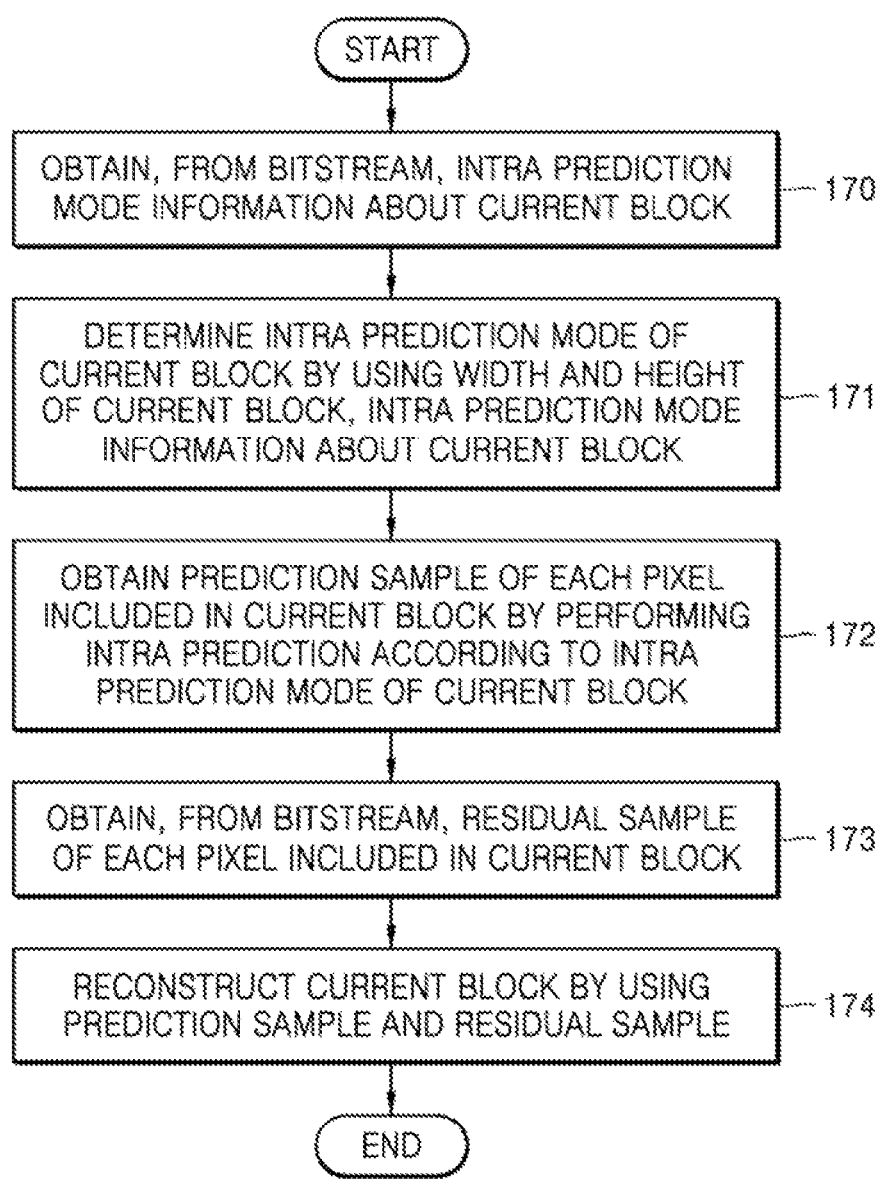

FIG. 13

| DEPTH \ BLOCK SHAPE | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 19

X Location of luma sample
O Location of chroma sample

FIG. 27

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | – | 32 | 26 | 21 | 17 | 13 | 9 | 5 | 2 | 0 | -2 | -5 | -9 | -13 | -17 | -21 | -26 |
| intraPredAngle for non-square | – | 48 | 40 | 32 | 26 | 20 | 14 | 8 | 4 | 0 | -4 | -8 | -14 | -20 | -26 | -32 | -24 |
| predModeIntra | 18 | 19 | 20 | 21 | 22 | 23 | 24 | 25 | 26 | 27 | 28 | 29 | 30 | 31 | 32 | 33 | 34 |
| intraPredAngle | -32 | -26 | -21 | -17 | -13 | -9 | -5 | -2 | 0 | 2 | 5 | 9 | 13 | 17 | 21 | 26 | 32 |
| intraPredAngle for non-square | -16 | -13 | -10 | -8 | -6 | -4 | -2 | -1 | 0 | 1 | 2 | 4 | 6 | 8 | 10 | 13 | 16 |

FIG. 28

| predModeIntra | -14 | -13 | -12 | -11 | -10 | -9 | -8 | -7 | -6 | -5 | -4 | -3 | -2 | -1 | 2 | 3 | 4 |
|---|---|---|---|---|---|---|---|---|---|---|---|---|---|---|---|---|---|
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | -1 | -2 | -3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | -4 | -6 | -8 | -10 | -12 | -14 | -16 | -18 | -20 | -23 | -26 | -29 | -32 | -29 | -26 | -23 | -20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | -18 | -16 | -14 | -12 | -10 | -8 | -6 | -4 | -3 | -2 | -1 | 0 | 1 | 2 | 3 | 4 | 6 |
| predModeIntra | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | 74 | 75 | 76 | 77 | 78 | 79 | 80 | | | | | | | | | |
| intraPredAngle | 73 | 86 | 102 | 128 | 171 | 256 | 341 | 512 | | | | | | | | | |

VIDEO ENCODING METHOD AND DEVICE AND VIDEO DECODING METHOD AND DEVICE

TECHNICAL FIELD

The disclosure relates to a video decoding method and apparatus, and a video encoding method and apparatus, and more particularly, to intra prediction by which intra prediction modes to be applied based on a shape of a block are adaptively configured.

BACKGROUND ART

Image data is encoded by a predetermined codec conforming to a data compression standard, e.g., the Moving Picture Expert Group (MPEG) standard, and then is stored in a recording medium or transmitted through a communication channel in the form of a bitstream. Recently, due to the evolution of wired/wireless communication infrastructures including $5^{th}$ generation (5G), there is an increasing demand for a technology for efficiently compressing next-generation media such as 4K/8K ultra high definition (UHD) videos, 360-degree videos, virtual reality (VR) images, and the like, in addition to existing image media.

DESCRIPTION OF EMBODIMENTS

Technical Problem

In a case where intra prediction modes applied to a square block are applied to a non-square block, neighbouring pixels that are not used in intra prediction with respect to a current pixel may exist and thus, intra prediction efficiency may deteriorate.

Solution to Problem

According to various embodiments, in a case where a current block has a non-square shape, it is possible to configure intra prediction modes to be applied to a non-square block by adaptively changing intra prediction modes that are used to be applied to a square block.

Advantageous Effects of Disclosure

According to various embodiments, intra prediction modes may be adaptively configured based on a shape of a current block, such that intra prediction efficiency may be improved.

BRIEF DESCRIPTION OF DRAWINGS

FIG. 1B illustrates a flowchart of an image decoding method according to various embodiments.

FIG. 13 illustrates a process of determining a depth of a coding unit when a shape and size of the coding unit change, when the coding unit is recursively split such that a plurality of coding units are determined, according to an embodiment.

FIG. 19 illustrates locations of luma samples and locations of chroma samples based on a 4:2:2 format, according to an embodiment.

FIG. 27 illustrates a look-up table showing mapping relations between intra prediction mode indices (predModeIntra) and angle parameters (IntraPredAngle) according to intra prediction modes, according to an embodiment.

FIG. 28 illustrates a look-up table showing mapping relations between intra prediction mode indices (predModeIntra) and angle parameters (IntraPredAngle) according to intra prediction modes, according to another embodiment.

BEST MODE

Figure 1A:
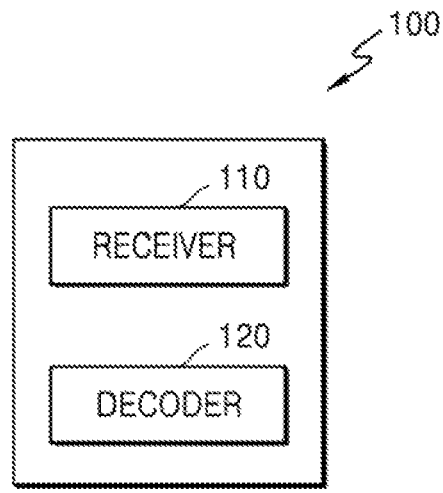
FIG. 1A is a block diagram of an image decoding apparatus, according to various embodiments.

According to an embodiment, a video decoding method includes obtaining, from a bitstream, intra prediction mode information about a current block; determining an intra prediction mode of the current block by using a width and a height of the current block, and the intra prediction mode information about the current block; obtaining a prediction sample of each pixel included in the current block by performing intra prediction according to the determined intra prediction mode of the current block; obtaining, from the bitstream, a residual sample of each pixel included in the current block; and reconstructing the current block by using the prediction sample and the residual sample, and wherein the determining of the intra prediction mode of the current block includes, when the current block has a square shape in which a width and a height are equal, determining an intra prediction mode of the current block, based on the intra prediction mode information, the intra prediction mode being from among first intra prediction mode candidates including a plurality of predetermined intra prediction directions; and when the current block has a non-square shape in which a width and a height are not equal, determining an intra prediction mode of the current block, based on the intra prediction mode information, the intra prediction mode being from among second intra prediction mode candidates configured based on the non-square shape.

According to an embodiment, when the current block has a non-square shape whose width is greater than its height, the second intra prediction mode candidates include a predetermined number of intra prediction modes indicating particular directions configured based on an upper-right direction other than directions indicated by intra prediction modes included in the first intra prediction mode candidates, instead of a predetermined number of intra prediction modes selected based on a lower-left direction from among the first intra prediction mode candidates, and when the current block has a non-square shape whose height is greater than its width, the second intra prediction mode candidates include a predetermined number of intra prediction modes indicating particular directions configured based on a lower-left direction other than directions indicated by intra prediction modes included in the first intra prediction mode candidates, instead of a predetermined number of intra prediction modes selected based on an upper-right direction from among the first intra prediction mode candidates.

According to an embodiment, the predetermined number of the intra prediction modes selected based on the lower-left direction from among the first intra prediction mode candidates are selected in an order of indicating directions close to −135 degrees with respect to an direction of −135 degrees, the intra prediction modes included in the second intra prediction mode candidates, instead of the predetermined number of the intra prediction modes selected based on the lower-left direction, are selected in an order of indicating directions close to 45 degrees from among particular directions between 0 degree and 45 degrees, and the predetermined number of the intra prediction modes selected based on the upper-right direction from among the first intra prediction mode candidates are selected in an order of indicating directions close to 45 degrees with respect to an direction of 45 degrees, the intra prediction modes included in the second intra prediction mode candidates, instead of the predetermined number of the intra prediction modes selected based on the upper-right direction, are selected in an order of indicating directions close to −135 degrees from among particular directions between −90 degrees and −135 degrees According to an embodiment, an intra prediction mode included in the second intra prediction mode candidates, instead of the intra prediction modes included in the first intra prediction mode candidates, indicates a direction opposite to a particular direction indicated by an intra prediction mode that is included in the first intra prediction mode candidates and is substituted.

According to an embodiment, the first intra prediction mode candidates and the second intra prediction mode candidates are configured by using a look-up table of a parameter IntraPredAngle of a particular angle according to predModeIntra referring to an intra prediction mode index, the particular angle is indicated by using a fixed number in a horizontal direction and the parameter IntraPredAngle in a vertical direction, or is indicated by using the parameter IntraPredAngle in a horizontal direction and a fixed number in a vertical direction, and the fixed number is a power of 2.

According to an embodiment, when the current block has a non-square shape whose width is greater than its height, the second intra prediction mode candidates further include an intra prediction mode indicating a direction close to a horizontal direction, in addition to the first intra prediction mode candidates, and when the current block has a non-square shape whose height is greater than its width, the second intra prediction mode candidates further include an intra prediction mode indicating a direction close to a vertical direction, in addition to the first intra prediction mode candidates.

According to an embodiment, based on a first intra prediction mode with a direction of 45 degrees, a second intra prediction mode with a direction of 135 degrees, and a third intra prediction mode with a direction of −135 degrees, the first intra prediction mode candidates include vertical-part intra prediction modes configured by sequentially dividing directions between 45 degrees and 135 degrees, and horizontal-part intra prediction modes configured by dividing directions between 135 degrees and 180 degrees and between −135 degrees and −180 degrees, and based on a fourth intra prediction mode indicating a top-right vertex direction from a center of the current block, a fifth intra prediction mode indicating a top-left vertex direction from the center of the current block, and a sixth intra prediction mode indicating a bottom-left vertex direction from the center of the current block, the second intra prediction mode candidates include vertical-part intra prediction modes configured by sequentially bisecting gaps between a direction of the fourth intra prediction mode and a direction of the fifth intra prediction mode, and horizontal-part intra prediction modes configured by sequentially bisecting gaps between the direction of the fifth intra prediction mode and a direction of the sixth intra prediction mode.

According to an embodiment, based on a first intra prediction direction pointing to a bottom-left vertex from a center of the current block, and a second intra prediction direction pointing to a top-right vertex from the center of the current block, the second intra prediction mode candidates indicate particular directions between the first intra prediction direction and the second intra prediction direction based on a ratio of a width and a height of the current block.

According to an embodiment, the determining of the intra prediction mode of the current block includes: configuring a Most Probable Mode (MPM) by using a prediction mode of an adjacent block of the current block; and determining the intra prediction mode of the current block, based on the MPM.

According to an embodiment, intra prediction modes included in the MPM are configured by using a prediction mode of an adjacent block adjacent to a left end of the current block and a prediction mode of an adjacent block adjacent to a top end of the current block, and when a shape of the adjacent block adjacent to the left end or the top end of the current block is different from a shape of the current block, and an intra prediction mode of the adjacent block adjacent to the left end or the top end is not included in intra prediction mode candidates of the current block, the intra prediction mode of the adjacent block adjacent to the left end or the top end is substituted with an intra prediction mode having a closest direction from among the intra prediction mode candidates of the current block or is substituted with an intra prediction mode indicating a direction closest to a direction that is opposite, by 180 degrees, to a direction indicated by the intra prediction mode of the adjacent block adjacent to the left end or the top end.

According to an embodiment, a video decoding apparatus includes a memory; and at least one processor connected to the memory and configured to perform: obtaining, from a bitstream, intra prediction mode information about a current block; determining an intra prediction mode of the current block by using a width and a height of the current block, and the intra prediction mode information about the current block; obtaining a prediction sample of each pixel included in the current block by performing intra prediction according to the determined intra prediction mode of the current block; obtaining, from the bitstream, a residual sample of each pixel included in the current block; and reconstructing the current block by using the prediction sample and the residual sample, and wherein the at least one processor is further configured to perform, when the current block has a square shape in which a width and a height are equal, determining an intra prediction mode of the current block, based on the intra prediction mode information, the intra prediction mode being from among first intra prediction mode candidates including a plurality of predetermined intra prediction directions, and when the current block has a non-square shape in which a width and a height are not equal, determining an intra prediction mode of the current block, based on the intra prediction mode information, the intra prediction mode being from among second intra prediction mode candidates configured based on the non-square shape.

According to an embodiment, a video encoding method includes: determining a plurality of intra prediction modes, based on a width and a height of a current block; determining an intra prediction mode of the current block, the intra prediction mode being from among the plurality of intra prediction modes; obtaining a residual sample based on the intra prediction mode, the residual sample corresponding to a difference between a pixel value of the current block and a prediction sample of each of pixels included in the current block; and encoding the residual sample and intra prediction mode information about the current block, and wherein the plurality of intra prediction modes include: first intra prediction mode candidates including a plurality of predetermined intra prediction directions when the current block has a square shape in which a width and a height are equal; and second intra prediction mode candidates configured based on a non-square shape when the current block has the non-square shape in which a width and a height are not equal.

MODE OF DISCLOSURE

Advantages and features of embodiments and methods of accomplishing the same may be understood more readily by reference to the embodiments and the accompanying drawings. In this regard, the disclosure may have different forms and should not be construed as being limited to the embodiments set forth herein. Rather, these embodiments are provided so that this disclosure will be thorough and complete and will fully convey the concept of the disclosure to one of ordinary skill in the art.

The terms used in the specification will be briefly defined, and the embodiments will be described in detail.

All terms including descriptive or technical terms which are used in the specification should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Therefore, the terms used in the disclosure should not be interpreted based on only their names but have to be defined based on the meaning of the terms together with the descriptions throughout the specification.

In the following specification, the singular forms include plural forms unless the context clearly indicates otherwise.

When a part "includes" or "comprises" an element, unless there is a particular description contrary thereto, the part may further include other elements, not excluding the other elements.

In the following descriptions, terms such as "unit" indicate software or a hardware component, and the "unit" performs certain functions. However, the "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

According to an embodiment of the disclosure, "unit" may be implemented as a processor and a memory. The term "processor" should be interpreted broadly to include a general purpose processor, a central processing unit (CPU), a microprocessor, a digital signal processor (DSP), a controller, a microcontroller, a state machine, and the like. In some environments, the "processor" may refer to an application specific semiconductor (ASIC), a programmable logic device (PLD), a field programmable gate array (FPGA), or the like. The term "processor" may refer to a combination of processing devices such as, for example, a combination of a DSP and a microprocessor, a combination of a plurality of microprocessors, a combination of one or more microprocessors in conjunction with a DSP core, or a combination of any other such configurations.

The term "memory" should be interpreted broadly to include any electronic component capable of storing electronic information. The term "memory" may refer to various types of processor-readable media, such as a random access memory (RAM), a read-only memory (ROM), a non-volatile random access memory (NVRAM), a programmable read-only memory (PROM), an erase-programmable read-only memory (EPROM), an electrically erasable PROM (EEPROM), a flash memory, a magnetic or optical data storage device, registers, and the like. When the processor can read information from a memory and/or write information to the memory, the memory is said to be in an electronic communication state with the processor. The memory integrated in the processor is in an electronic communication state with the processor.

Hereinafter, an "image" may be a static image such as a still image of a video or may be a dynamic image such as a moving image, that is, the video itself.

Hereinafter, a "sample" denotes data assigned to a sampling position of an image, i.e., data to be processed. For example, pixel values of an image in a spatial domain and transform coefficients on a transform domain may be samples. A unit including at least one such sample may be defined as a block.

Hereinafter, the disclosure will now be described more fully with reference to the accompanying drawings for one of ordinary skill in the art to be able to perform the embodiments without any difficulty. In addition, portions irrelevant to the description will be omitted in the drawings for a clear description of the disclosure.

Hereinafter, an image encoding apparatus and an image decoding apparatus, and an image encoding method and an image decoding method according to embodiments will be described with reference to FIGS. 1A to 31. With reference to FIGS. 3 to 16, a method of determining a data unit of an image according to an embodiment will be described, and with reference to FIGS. 1A and 2D, and 17 to 31, an image encoding or decoding method and apparatus for performing intra prediction by adaptively applying intra prediction modes, based on a block shape, will be described.

Hereinafter, the image encoding or decoding method and apparatus for adaptively performing intra prediction, based on various-shape coding units, according to an embodiment of the disclosure, will now be described with reference to FIGS. 1A and 2D.

FIG. 1A is a block diagram of an image decoding apparatus, according to various embodiments.

An image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding apparatus 150 to be described below. Also, the bitstream may be transmitted from an image encoding apparatus 150. The image encoding apparatus 150 and the image decoding apparatus 100 may be connected by wire or wirelessly, and the receiver 110 may receive the bitstream by wire or wirelessly. The receiver 110 may receive the bitstream from a storage medium such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

The receiver 110 may obtain, from the bitstream, prediction mode information about a current block and intra prediction mode information about the current block.

The prediction mode information about the current block, which is included in the bitstream, may include information about a skip mode, an intra mode, or an inter prediction mode. When the current block does not correspond to the skip mode, which prediction mode from among the intra mode or the inter prediction mode was used to encode the current block may be signaled.

The intra prediction mode information about the current block may be information about an intra prediction mode to be applied to the current block, the intra prediction mode being from among a plurality of intra prediction modes. For example, the intra prediction mode may be one of a DC mode, a planar mode, and a plurality of angular modes having prediction directions. The angular modes may include a horizontal mode, a vertical mode, and a diagonal mode, and may also include modes having predetermined directions excluding a horizontal direction, a vertical direction, and a diagonal direction. For example, the number of the angular modes may be 65 or 33.

The decoder 120 may obtain a prediction block of the current block, based on a prediction mode of the current block. The decoder 120 may obtain, from the bitstream, transform coefficient information about the current block, may perform inverse quantization and inverse transformation by using the obtained transform coefficient information, and thus may obtain a residual sample of a residual block with respect to the current block.

As will be described below, the decoder 120 may determine the intra prediction mode of the current block by using a width and height of the current block, and the intra prediction mode information about the current block. When the current block has a square shape in which a width and a height are equal, the decoder 120 may determine an intra prediction mode of the current block based on the intra prediction mode information, the intra prediction mode being from among first intra prediction mode candidates including a plurality of predetermined intra prediction directions. When the current block has a non-square shape in which a width and a height are not equal, the decoder 120 may determine an intra prediction mode of the current block based on the intra prediction mode information, the intra prediction mode being from second intra prediction mode candidates configured based on the non-square shape.

When the current block has a non-square shape in which a width of the current block is greater than its height, the second intra prediction mode candidates according to an embodiment may include, instead of a predetermined number of intra prediction modes selected based on a lower-left direction from among the first intra prediction mode candidates, a predetermined number of intra prediction modes indicating particular directions configured based on an upper-right direction other than directions indicated by intra prediction modes included in the first intra prediction mode candidates. When the current block has a non-square shape in which a height of the current block is greater than its width, the second intra prediction mode candidates according to an embodiment may include, instead of a predetermined number of intra prediction modes selected based on an upper-right direction from among the first intra prediction mode candidates, a predetermined number of intra prediction modes pointing particular directions selected based on a lower-left direction other than directions indicated by intra prediction modes included in the first intra prediction mode candidates.

According to an embodiment, the predetermined number of intra prediction modes selected based on the lower-left direction from among the first intra prediction mode candidates may be selected in an order of indicating directions close to −135 degrees with respect to the direction of −135 degrees.

According to an embodiment, intra prediction modes included in the second intra prediction mode candidates, instead of the predetermined number of intra prediction modes selected based on the lower-left direction from among the first intra prediction mode candidates, may be selected in an order of indicating directions close to 45 degrees from among particular directions between 0 degree and 45 degrees.

According to an embodiment, the predetermined number of intra prediction modes selected based on the upper-right direction from among the first intra prediction mode candidates may be selected in an order of indicating directions close to 45 degrees with respect to the direction of 45 degrees.

According to an embodiment, intra prediction modes included in the second intra prediction mode candidates, instead of the predetermined number of intra prediction modes selected based on the upper-right direction from among the first intra prediction mode candidates, may be selected in an order of indicating directions close to −135 degrees from among particular directions between −90 degrees and −135 degrees.

The decoder 120 may reconstruct the current block, based on the prediction block of the current block and a residual block of the current block. The decoder 120 may generate a reconstructed sample in the current block by using a sample value of a prediction sample in the prediction block of the current block and a sample value of a residual sample in the residual block of the current block, and may generate a reconstructed block of the current block based on the reconstructed sample.

FIG. 1B illustrates a flowchart of an image decoding method according to various embodiments.

In operation 170, the decoder 120 may obtain, from a bitstream, intra prediction mode information about a current block. The intra prediction mode information may be information about a most probable mode (MPM) or information for determining an intra mode index (predModeIntra) of the current block.

In operation 171, the decoder 120 may determine an intra prediction mode of the current block by using a width and a height of the current block and the intra prediction mode information about the current block. As will be described below, the decoder 120 may determine the intra prediction mode of the current block by using a width and height of the current block, and the intra prediction mode information about the current block. When the current block has a square shape in which a width and a height are equal, the decoder 120 may determine an intra prediction mode of the current block based on the intra prediction mode information, the intra prediction mode being from among first intra prediction mode candidates including a plurality of predetermined intra prediction directions. When the current block has a non-square shape in which a width and a height are not equal, the decoder 120 may determine an intra prediction mode of the current block based on the intra prediction mode information, the intra prediction mode being from second intra prediction mode candidates configured based on the non-square shape. When the current block has a non-square shape in which a width of the current block is greater than its height, the second intra prediction mode candidates according to an embodiment may include, instead of a predetermined number of intra prediction modes selected based on a lower-left direction from among the first intra prediction mode candidates, a predetermined number of intra prediction modes indicating particular directions configured based on an upper-right direction other than directions indicated by intra prediction modes included in the first intra prediction mode candidates. When the current block has a non-square shape in which a height of the current block is greater than its width, the second intra prediction mode candidates according to an embodiment may include, instead of a predetermined number of intra prediction modes selected based on an upper-right direction from among the first intra prediction mode candidates, a predetermined number of intra prediction modes indicating particular directions configured based on a lower-left direction other than directions indicated by intra prediction modes included in the first intra prediction mode candidates.

In operation 172, the decoder 120 may obtain a prediction sample of each of pixels included in the current block by performing intra prediction according to the determined intra prediction mode of the current block.

In operation 173, the decoder 120 obtains, from the bitstream, a residual sample of each of the pixels included in the current block.

In operation 174, the decoder 120 reconstructs the current block by using the prediction sample and the residual sample. The residual sample refers to a value corresponding to a difference value between a current pixel and a prediction value, and the current pixel may be reconstructed by adding the prediction value and residual.

Figure 1C:
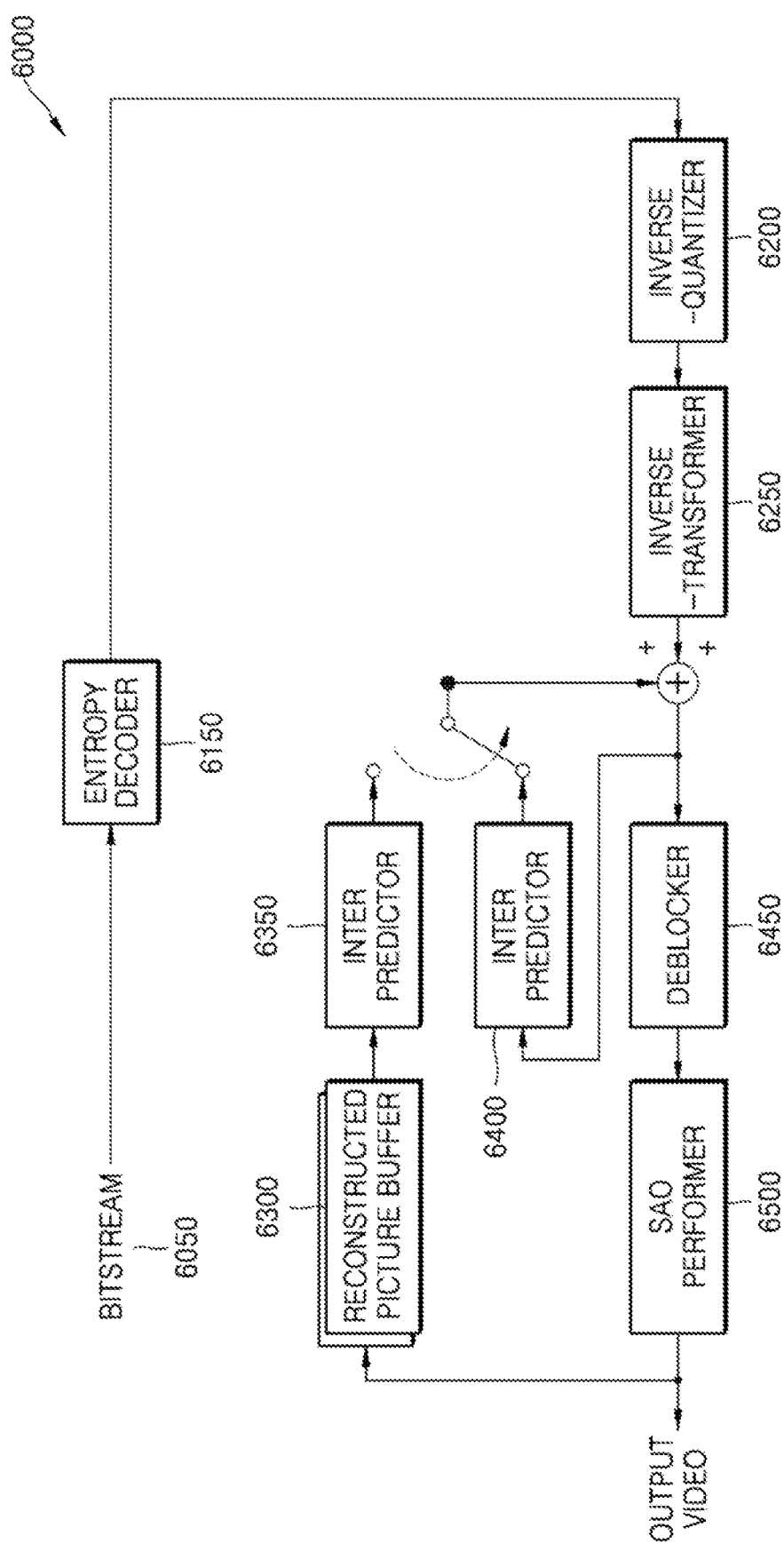
FIG. 1C is a block diagram of an image decoder according to various embodiments.

FIG. 1C is a block diagram of an image decoder 6000 according to various embodiments.

The image decoder 6000 according to various embodiments performs operations necessary for the decoder 120 of the image decoding apparatus 100 to decode image data.

Referring to FIG. 1C, an entropy decoder 6150 parses, from a bitstream 6050, encoded image data to be decoded, and encoding information necessary for decoding. The encoded image data is a quantized transform coefficient, and an inverse-quantizer 6200 and an inverse-transformer 6250 reconstruct residual data from the quantized transform coefficient.

An intra predictor 6400 performs intra prediction on each of blocks. As will be described below, the intra predictor 6400 may determine an intra prediction mode of a current block by using a width and height of the current block, and intra prediction mode information about the current block. When the current block has a square shape in which a width and a height are equal, the intra predictor 6400 may determine an intra prediction mode of the current block based on the intra prediction mode information, the intra prediction mode being from among first intra prediction mode candidates including a plurality of predetermined intra prediction directions.

An inter predictor 6350 performs inter prediction on each block by using a reference image obtained from a reconstructed picture buffer 6300. Data of a spatial domain for a block of a current image may be reconstructed by adding residual data and prediction data of each block which are generated by the intra predictor 6400 or the inter predictor 6350, and a deblocker 6450 and a sample adaptive offset (SAO) performer 6500 may perform loop filtering on the reconstructed data of the spatial domain, such that a filtered reconstructed image may be output. Reconstructed images stored in the reconstructed picture buffer 6300 may be output as a reference image.

In order for the decoder 120 of the image decoding apparatus 100 to encode the image data, the image decoder 6000 according to various embodiments may perform operations of each stage on each block.

Figure 1D:
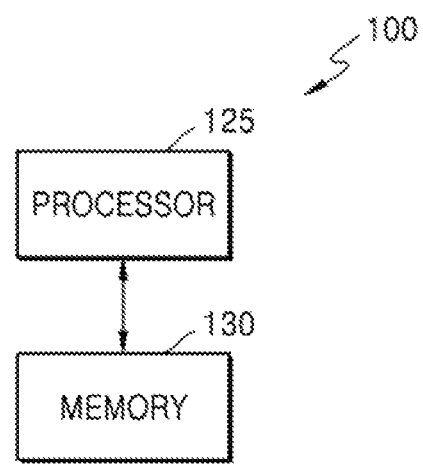
FIG. 1D is a block diagram of the image decoding apparatus according to an embodiment.

FIG. 1D is a block diagram of the image decoding apparatus 100 according to an embodiment.

The image decoding apparatus 100 according to an embodiment may include a memory 130 and at least one processor 125 connected with the memory 130. Operations of the image decoding apparatus 100 according to an embodiment may be performed by individual processors or may be performed by the control of a central processor. Also, the memory 130 of the image decoding apparatus 100 may store data received from an external source, and data generated by a processor. The at least one processor 125 of the image decoding apparatus 100 may obtain, from a bitstream, intra prediction mode information about a current block, and then may determine an intra prediction mode of the current block by using a width and a height of the current block, and the intra prediction mode information about the current block.

Figure 2A:
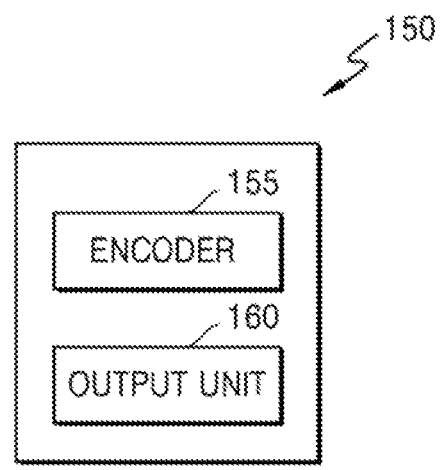
FIG. 2A is a block diagram of an image encoding apparatus, according to various embodiments.

FIG. 2A is a block diagram of an image encoding apparatus, according to various embodiments.

The image encoding apparatus 150 according to various embodiments may include an encoder 155 and an output unit 160.

The encoder 155 and the output unit 160 may include at least one processor. Also, the encoder 155 and the output unit 160 may include a memory storing instructions to be performed by the at least one processor. The encoder 155 and the output unit 160 may be implemented as separate hardware components, or the encoder 155 and the output unit 160 may be included in one hardware component.

The encoder 155 determines a prediction mode of a current block by applying various prediction modes including a skip mode, an intra mode, an inter prediction mode, or the like. When the current block does not correspond to the skip mode, which prediction mode from among the intra mode or the inter prediction mode was used to encode the current block may be signaled.

The encoder 155 may obtain a prediction block of the current block, based on the prediction mode of the current block, and then may encode residual by transforming and quantizing the residual that is a difference value between the current block and the prediction block. As will be described below, the encoder 155 may determine an intra prediction mode candidate to be applied to the current block, by using a width and height of the current block. When the current block has a square shape in which a width and a height are equal, the encoder 155 may determine second intra prediction mode candidates to be applied to the current block having a non-square shape by reconfiguring first intra prediction mode candidates including a plurality of predetermined intra prediction directions.

The encoder 155 may encode intra prediction mode information about the current block. The output unit 160 may generate a bitstream including the intra prediction mode information about the current block and structure information for determining data units having hierarchical split shapes, and may output the bitstream.

Figure 2B:
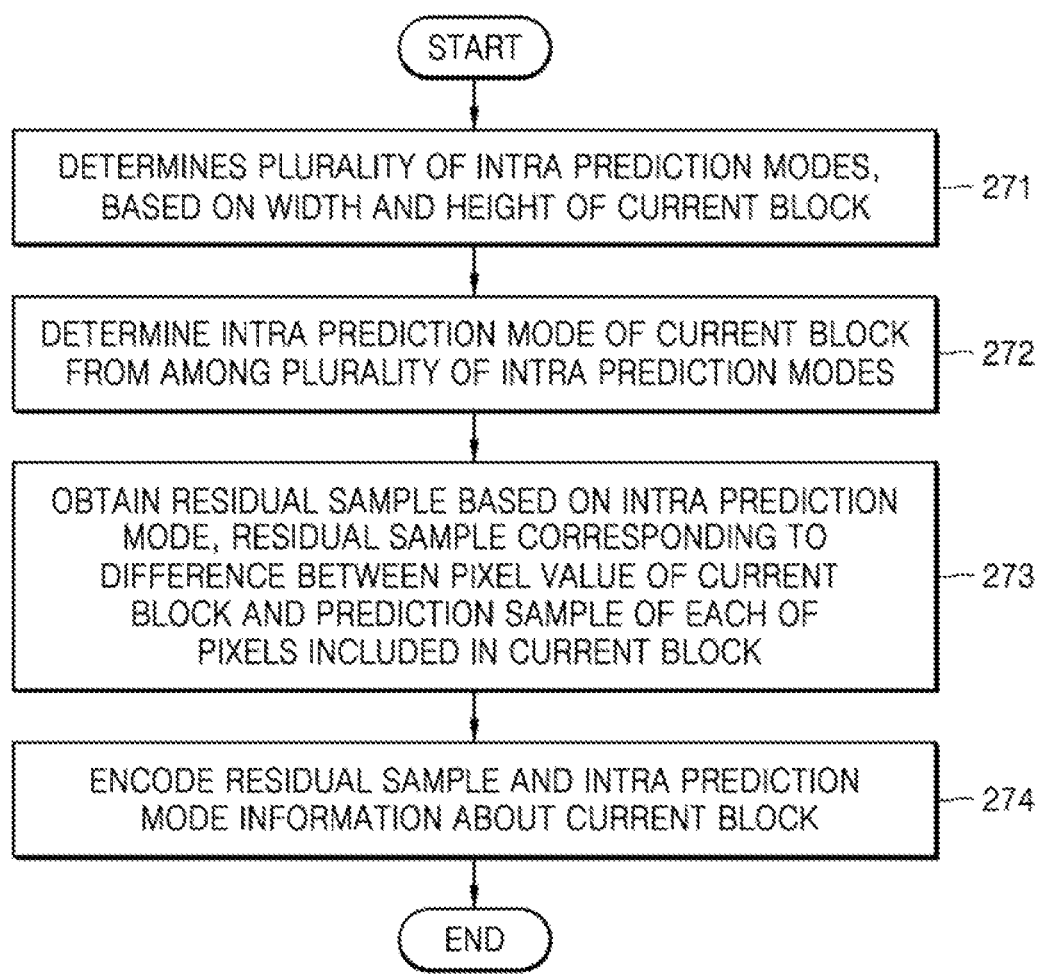
FIG. 2B illustrates a flowchart of an image encoding method according to various embodiments.

FIG. 2B illustrates a flowchart of an image encoding method according to various embodiments.

In operation 271, the encoder 155 determines a plurality of intra prediction modes, based on a width and a height of a current block. As will be described below, the encoder 155 may determine intra prediction modes to be applied to the current block, by using the width and the height of the current block. When the current block has a square shape in which a width and a height are equal, the encoder 155 may determine an intra prediction mode of the current block, the intra prediction mode being from among first intra prediction mode candidates including a plurality of predetermined intra prediction directions. When the current block has a non-square shape in which a width and a height are not equal, the encoder 155 may determine second intra prediction mode candidates as intra prediction modes to be applied to the current block, the second intra prediction mode candidates being different from the first intra prediction mode candidates. When the current block has a non-square shape in which a width of the current block is greater than its height, the second intra prediction mode candidates according to an embodiment may include, instead of a predetermined number of intra prediction modes selected based on a lower-left direction from among the first intra prediction mode candidates, a predetermined number of intra prediction modes indicating particular directions configured based on an upper-right direction other than directions indicated by intra prediction modes included in the first intra prediction mode candidates. When the current block has a non-square shape in which a height of the current block is greater than its width, the second intra prediction mode candidates according to an embodiment may include, instead of a predetermined number of intra prediction modes selected based on an upper-right direction from among the first intra prediction mode candidates, a predetermined number of intra prediction modes indicating particular directions configured based on a lower-left direction other than directions indicated by intra prediction modes included in the first intra prediction mode candidates.

In operation 272, the encoder 155 may determine an intra prediction mode of the current block, the intra prediction mode being from among the plurality of intra prediction modes. An optimal intra prediction mode may be determined based on a rate-distortion (RD) cost.

In operation 273, the encoder 155 obtains a residual sample based on the intra prediction mode, the residual sample corresponding to a difference between a pixel value of the current block and a prediction sample of each of pixels included in the current block.

In operation 274, the encoder 155 encodes the residual sample and intra prediction mode information about the current block.

Figure 2C:
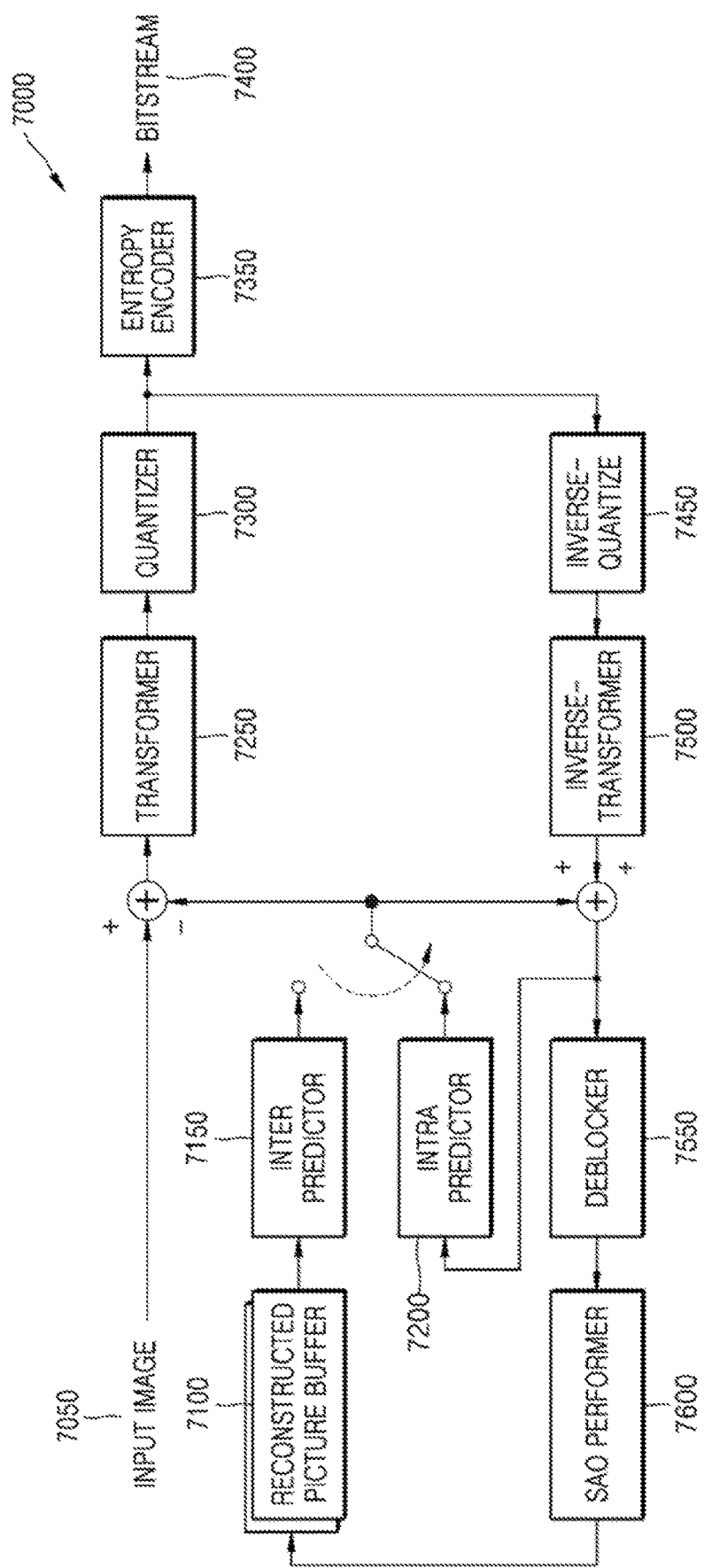
FIG. 2C is a block diagram of an image encoder according to various embodiments.

FIG. 2C is a block diagram of an image encoder according to various embodiments.

An image encoder 7000 according to various embodiments performs operations necessary for the encoder 155 of the image encoding apparatus 150 to encode image data.

That is, an intra predictor 7200 performs intra prediction on each of blocks of a current image 7050, and an inter predictor 7150 performs inter prediction on each of the blocks by using the current image 7050 and a reference image obtained from a reconstructed picture buffer 7100.

The residual data is obtained by subtracting prediction data from data of a block to be encoded in the current image 7050, wherein the prediction data is related to each block and is output from the intra predictor 7200 or the inter predictor 7150, and a transformer 7250 and a quantizer 7300 may output a quantized transform coefficient of each block by performing transformation and quantization on the residual data.

An inverse-quantizer 7450 and an inverse-transformer 7500 may reconstruct residual data of a spatial domain by performing inverse quantization and inverse transformation on the quantized transform coefficient. The reconstructed residual data of the spatial domain may be added to the prediction data that is related to each block and is output from the intra predictor 7200 or the inter predictor 7150, and thus may be reconstructed as data of a spatial domain with respect to a block of the current image 7050. A deblocker 7550 and a SAO performer 7600 generate a filtered reconstructed image by performing inloop filtering on the reconstructed data of the spatial domain. The generated reconstructed image is stored in the reconstructed picture buffer 7100. Reconstructed images stored in the reconstructed picture buffer 7100 may be used as a reference image for inter prediction with respect to another image. An entropy encoder 7350 may entropy encode the quantized transform coefficient, and the entropy encoded coefficient may be output as a bitstream 7400.

In order for the image encoder 7000 according to various embodiments to be applied to the image encoding apparatus 150, the image encoder 7000 according to various embodiments may perform operations of each stage on each block.

Figure 2D:
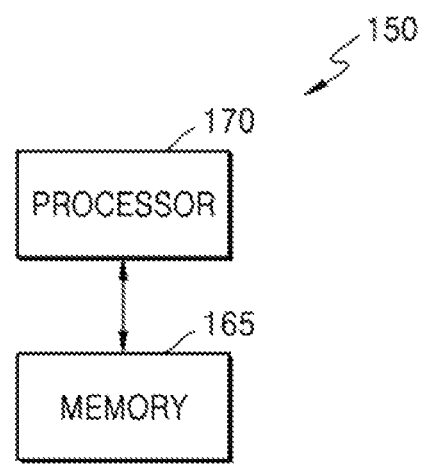
FIG. 2D is a block diagram of the image encoding apparatus according to various embodiments.

FIG. 2D is a block diagram of the image encoding apparatus 150 according to an embodiment.

The image encoding apparatus 150 according to an embodiment may include a memory 165 and at least one processor 170 connected with the memory 165. Operations of the image encoding apparatus 150 according to an embodiment may be performed by individual processors or may be performed by the control of a central processor. Also, the memory 165 of the image encoding apparatus 150 may store data received from an external source, and data generated by a processor.

The at least one processor 170 of the image encoding apparatus 150 may determine an intra prediction mode candidate to be applied to a current block, by using a width and a height of the current block. When the current block has a square shape in which a width and a height are equal, the at least one processor 170 may determine second intra prediction mode candidates to be applied to the current block having a non-square shape by reconfiguring first intra prediction mode candidates including a plurality of predetermined intra prediction directions.

Hereinafter, splitting of a coding unit will be described in detail according to an embodiment of the disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding unit (CTB) refers to an N×N block including N×N samples (where N is an integer). Each color component may be split into one or more largest coding blocks.

When a picture has three sample arrays (sample arrays for Y, Cr, and Cb components, respectively), a largest coding unit (CTU) includes a largest coding block of a luma sample, two corresponding largest coding blocks of chroma samples, and syntax elements used to encode the luma sample and the chroma samples. When a picture is a monochrome picture, a largest coding unit includes a largest coding block of a monochrome sample and syntax elements used to encode the monochrome samples. When a picture is a picture encoded in color planes separated according to color components, a largest coding unit includes syntax elements used to encode the picture and samples of the picture.

One largest coding block (CTB) may be split into M×N coding blocks including M×N samples (where M and N are integers).

When a picture has sample arrays for respective Y, Cr, and Cb components, a coding unit (CU) includes a coding block of a luma sample, two corresponding coding blocks of chroma samples, and syntax elements used to encode the luma sample and the chroma samples. When a picture is a monochrome picture, a coding unit includes a coding block of a monochrome sample and syntax elements used to encode the monochrome samples. When a picture is a picture encoded in color planes separated according to color components, a coding unit includes syntax elements used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax element corresponding to the (largest) coding block. However, because one of ordinary skill in the art can understand that a (largest) coding unit or a (largest) coding block refers to a block of a predetermined size including a predetermined number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the disclosure is not limited thereto.

For example, information about a maximum size of a luma coding block may be obtained from the bitstream. For example, the maximum size of the luma coding block indicated by the information about the maximum size of the luma coding block may be one of 16×16, 32×32, 64×64, 128×128, and 256×256.

For example, information about a luma block size difference and a maximum size of a luma coding block that is splittable by 2 may be obtained from the bitstream. The information about the luma block size difference may refer to a size difference between a luma largest coding unit and a largest luma coding block that is splittable by 2. Accordingly, when the information about the maximum size of the luma coding block that is splittable by 2 and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from the bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from the bitstream. At least one of information indicating whether quad splitting is to be performed, information indicating whether multi-splitting is to be performed, split direction information, and split type information may be obtained as the split shape mode information from the bitstream.

For example, the information indicating whether quad splitting is to be performed may indicate whether a current coding unit is to be quad split (QUAD_SPLIT) or not.

When the current coding unit is not to be quad split, the information indicating whether multi-splitting is to be performed may indicate whether the current coding unit is to not be split (NO_SPLIT) any more or is to be binary/ternary split.

When the current coding unit is binary split or ternary split, the split direction information indicates that the current coding unit is to be split in one of a horizontal direction or a vertical direction.

When the current coding unit is split in the horizontal direction or the vertical direction, the split type information indicates that the current coding unit is to be binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode SPLIT_TT_VER.

The image decoding apparatus 100 may obtain, from the bitstream, the split shape mode information from one bin string. A form of the bitstream received by the image decoding apparatus 100 may include fixed length binary code, unary code, truncated unary code, predetermined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad-split a coding unit, whether not to split a coding unit, a split direction, and a split type, based on one bin string.

The coding unit may be smaller than or equal to the largest coding unit. For example, because a largest coding unit is a coding unit having a maximum size, the largest coding unit is one of coding units. When split shape mode information about a largest coding unit indicates that splitting is not to be performed, a coding unit determined in the largest coding unit has the same size as that of the largest coding unit. When split shape code information about a largest coding unit indicates that splitting is to be performed, the largest coding unit may be split into coding units. Also, when split shape mode information about a coding unit indicates that splitting is to be performed, the coding unit may be split into smaller coding units. However, the splitting of the image is not limited thereto, and the largest coding unit and the coding unit may not be distinguished. The splitting of the coding unit will be described in detail with reference to FIGS. 3 to 16.

Also, one or more prediction blocks for prediction may be determined from a coding unit. The prediction block may be equal to or smaller than the coding unit. Also, one or more transform blocks for transformation may be determined from the coding unit. The transform block may be equal to or smaller than the coding unit.

The shapes and sizes of the transform block and prediction block may not be related to each other.

In another embodiment, prediction may be performed by using a coding unit as a prediction unit. Also, transformation may be performed by using a coding unit as a transform block.

The splitting of the coding unit will be described in detail with reference to FIGS. 3 to 16. A current block and a neighboring block of the disclosure may indicate one of the largest coding unit, the coding unit, the prediction block, and the transform block. Also, the current block of the current coding unit is a block that is currently being decoded or encoded or a block that is currently being split. The neighboring block may be a block reconstructed prior to the current block. The neighboring block may be spatially or temporally adjacent to the current block. The neighboring block may be located at one of the lower-left, left, upper-left, top, upper-right, right, lower-right of the current block.

Figure 3:
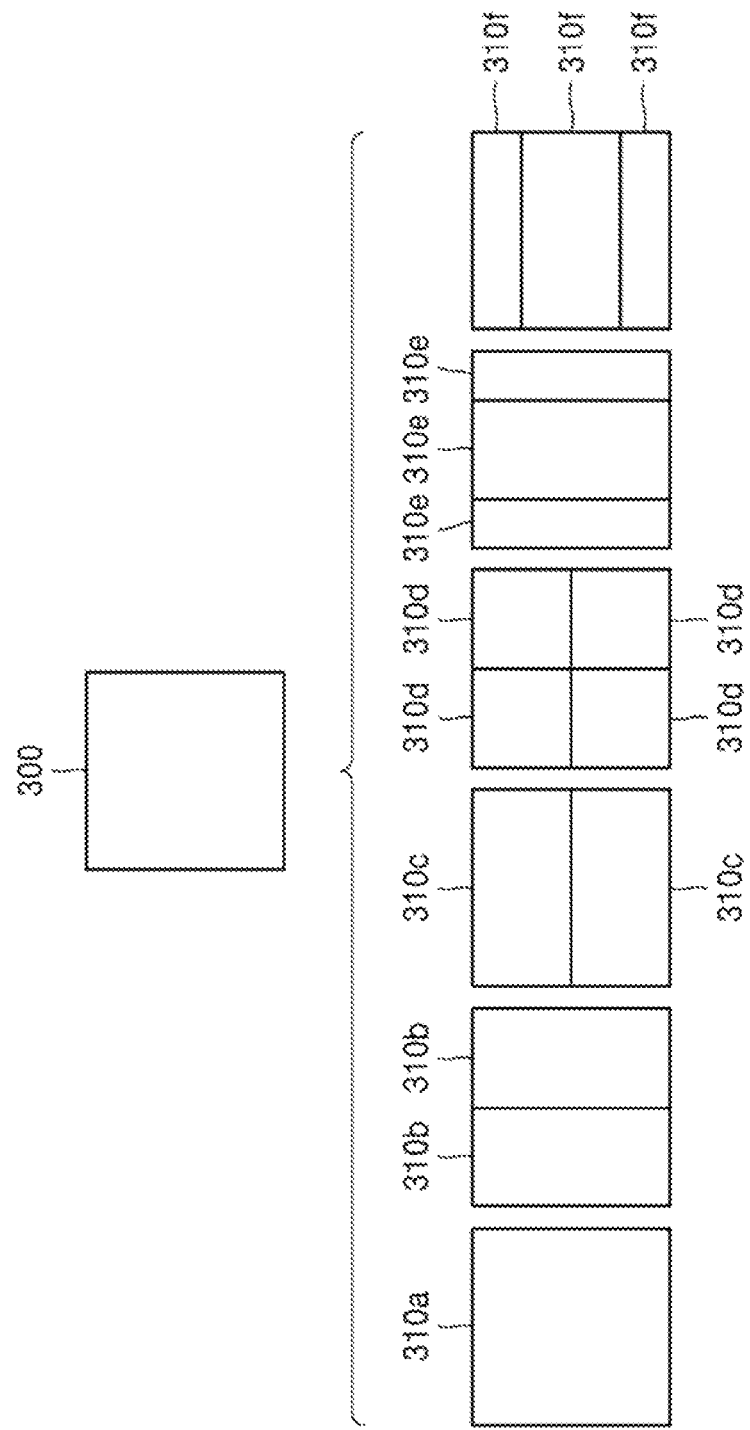
FIG. 3 illustrates a process, performed by the image decoding apparatus, of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, direction, a ratio of a width and height, or sizes of the width and height.

The shape of the coding unit may include a square and a non-square. When the lengths of the width and height of the coding unit are equal (i.e., when the block shape of the coding unit is 4N×4N), the image decoding apparatus 100 may determine the block shape information of the coding unit as a square. The image decoding apparatus 100 may determine the shape of the coding unit to be a non-square.

When the lengths of the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the ratio of the width and height in the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 150 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which both the width and the height of the coding unit are bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310a having the same size as the current coding unit 300, based on the split shape mode information indicating not to perform splitting, or may determine coding units 310b, 310c, 310d, 310e, or 310f split based on the split shape mode information indicating a predetermined splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary-splitting in a vertical direction. The image decoding apparatus 100 may determine three coding units 310f obtained by splitting the current coding unit 300 in a horizontal direction, based on the split shape mode information indicating to perform ternary-splitting in a horizontal direction. However, splitting methods of the square coding unit are not limited to the aforementioned methods, and may include various methods that may be indicated by the split shape mode information. Predetermined splitting methods of splitting the square coding unit will be described in detail below in relation to various embodiments.

Figure 4:
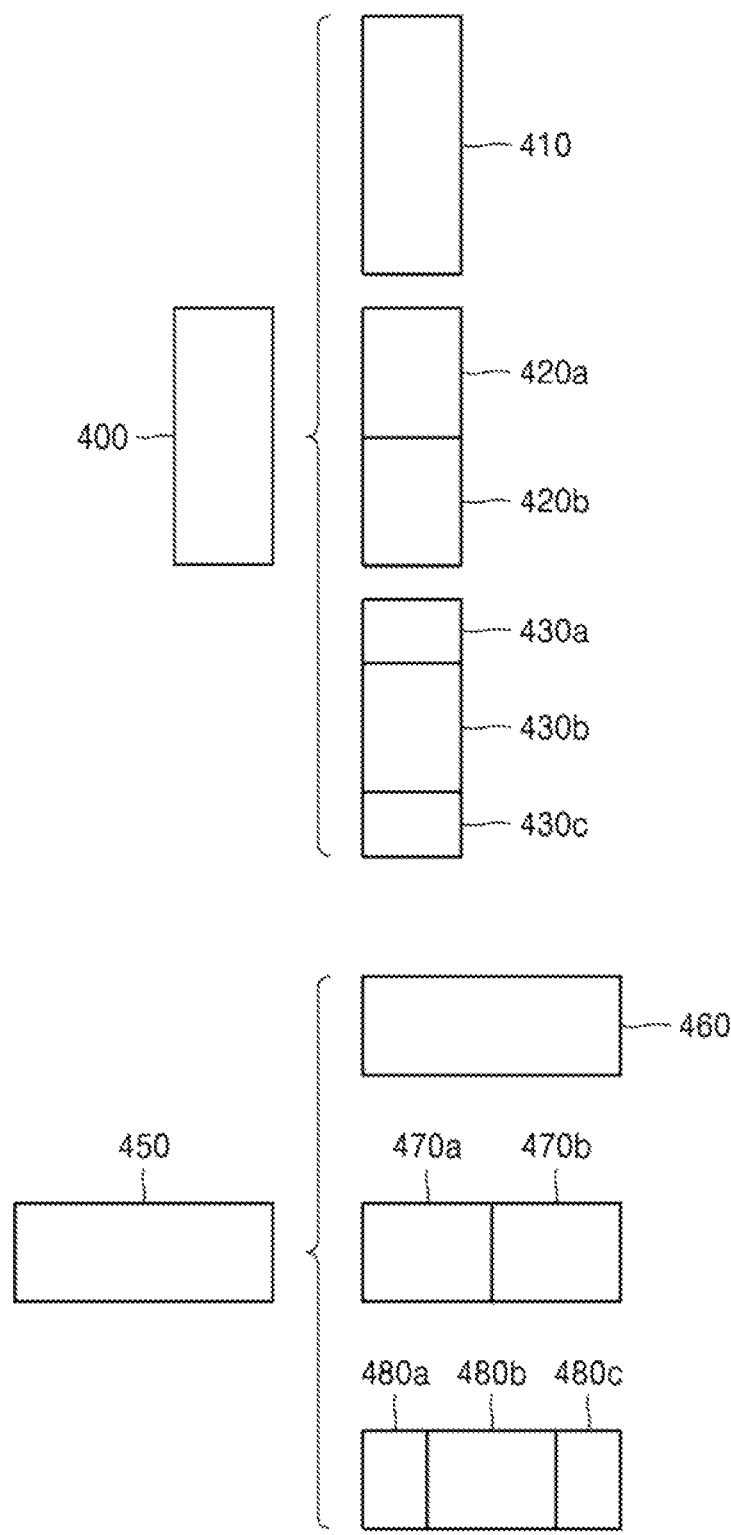
FIG. 4 illustrates a process, performed by the image decoding apparatus, of determining at least one coding unit by splitting a non-square coding unit, according to an embodiment.

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a predetermined splitting method, based on split shape mode information. Referring to FIG. 4, when the block shape information of a current coding unit 400 or 450 indicates a non-square shape, the image decoding apparatus 100 may determine that a coding unit 410 or 460 having the same size as the current coding unit 400 or 450, based on the split shape mode information indicating not to perform splitting, or may determine coding units 420a and 420b, 430a, 430b, and 430c, 470a and 470b, or 480a, 480b, and 480c which are split based on the split shape mode information indicating a predetermined splitting method. Predetermined splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may split a current coding unit, in consideration of the location of a long side of the non-square current coding unit 400 or 450. For example, the image decoding apparatus 100 may determine a plurality of coding units by splitting the current coding unit 400 or 450 by splitting a long side of the current coding unit 400 or 450, in consideration of the shape of the current coding unit 400 or 450.

According to an embodiment, when the split shape mode information indicates to split (ternary-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction in which a height is greater than its width, the image decoding apparatus 100 may determine the coding units 430a, 430b, and 430c by splitting the current coding unit 400 in the horizontal direction. Also, when the current coding unit 450 is in the horizontal direction in which a width is greater than its height, the image decoding apparatus 100 may determine the coding units 480a, 480b, and 480c by splitting the current coding unit 450 in the vertical direction.

According to an embodiment, the image decoding apparatus 100 may determine the odd number of coding units included in the current coding unit 400 or 450, and not all the determined coding units may have the same size. For example, a predetermined coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a predetermined restriction on at least one coding unit from among the odd number of coding units generated by splitting the current coding unit 400 or 450. Referring to FIG. 4, the image decoding apparatus 100 may allow a decoding process of the coding unit 430b or 480b to be different from that of the other coding units 430a and 430c, or 480a or 480c, wherein coding unit 430b or 480b is at a center location from among the three coding units 430a, 430b, and 430c or 480a, 480b, and 480c generated by splitting the current coding unit 400 or 450. For example, the image decoding apparatus 100 may restrict the coding unit 430b or 480b at the center location to be no longer split or to be split only a predetermined number of times, unlike the other coding units 430a and 430c, or 480a and 480c.

Figure 5:
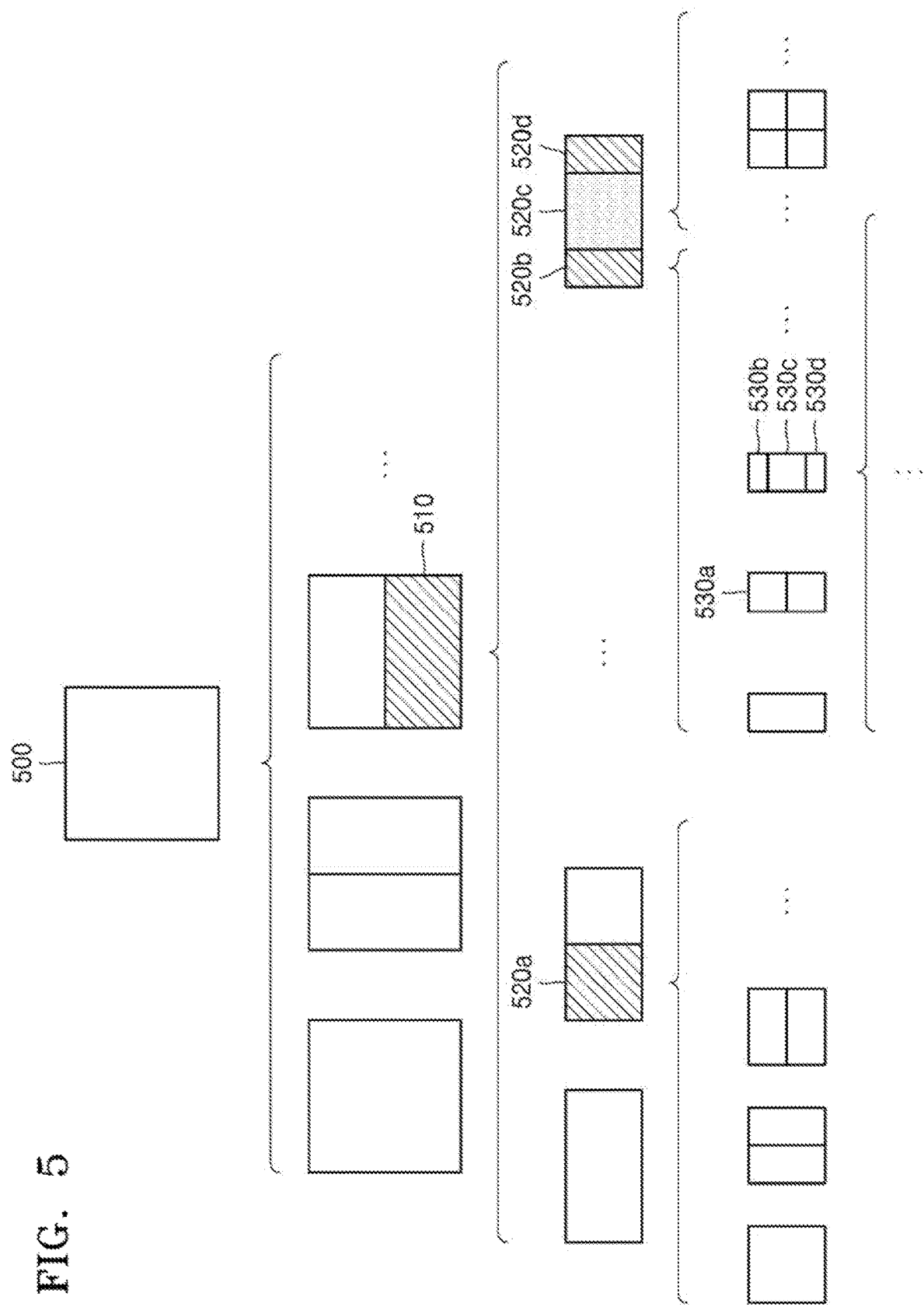
FIG. 5 illustrates a process, performed by the image decoding apparatus, of splitting a coding unit based on at least one of block shape information and split shape mode information, according to an embodiment.

FIG. 5 illustrates a process, performed by the image decoding apparatus 100, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, the second coding unit may be determined by splitting the first coding unit, and the third coding unit may be determined by splitting the second coding unit. It will be understood that the structure of the first coding unit, the second coding unit, and the third coding unit follows the above descriptions.

According to an embodiment, the image decoding apparatus 100 may determine to split the determined second coding unit 510 into coding units, based on the split shape mode information, or may determine to not split the determined second coding unit 510. Referring to FIG. 5, the image decoding apparatus 100 may split the non-square second coding unit 510, which is determined by splitting the first coding unit 500, into one or more third coding units 520a, or 520b, 520c, and 520d based on the split shape mode information, or may not split the non-square second coding unit 510. The image decoding apparatus 100 may obtain the split shape mode information, and may determine a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units 520a, or 520b, 520c, and 520d based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a predetermined coding unit (e.g., a coding unit located at a center location or a square coding unit) from among the odd number of third coding units 520b, 520c, and 520d determined by splitting the non-square second coding unit 510 may be recursively split. According to an embodiment, the non-square third coding unit 520b from among the odd number of third coding units 520b, 520c, and 520d may be split in a horizontal direction into a plurality of fourth coding units. A non-square fourth coding unit 530b or 530d from among a plurality of fourth coding units 530a, 530b, 530c, and 530d may be re-split into a plurality of coding units. For example, the non-square fourth coding unit 530b or 530d may be re-split into the odd number of coding units. A method that may be used to recursively split a coding unit will be described below in relation to various embodiments.

According to an embodiment, the image decoding apparatus 100 may split each of the third coding units 520a, or 520b, 520c, and 520d into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520b, 520c, and 520d. The image decoding apparatus 100 may put a predetermined restriction on a predetermined third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a predetermined splitting method (e.g., split into only four coding units or split by using a splitting method of the second coding unit 510), or to be split only a predetermined number of times (e.g., split only n times (where n>0)). However, the restrictions on the third coding unit 520c at the center location are not limited to the aforementioned examples, and it should be interpreted that the restrictions may include various restrictions for decoding the third coding unit 520c at the center location differently from the other third coding units 520b and 520d.

According to an embodiment, the image decoding apparatus 100 may obtain the split shape mode information, which is used to split a current coding unit, from a predetermined location in the current coding unit.

Figure 6:
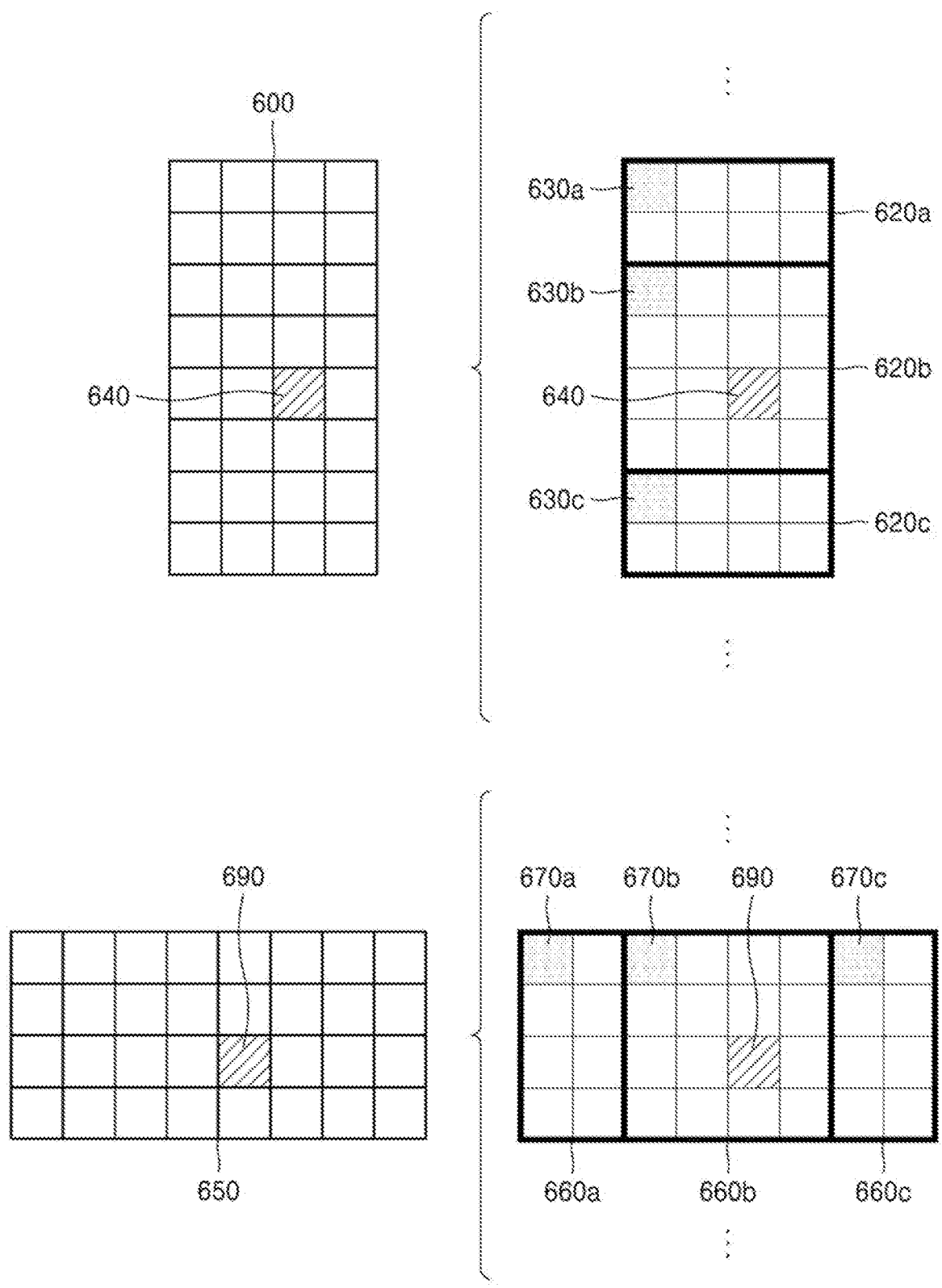
FIG. 6 illustrates a method, performed by the image decoding apparatus, of determining a predetermined coding unit from among an odd number of coding units, according to an embodiment.

FIG. 6 illustrates a method, performed by the image decoding apparatus 100, of determining a predetermined coding unit from among an odd number of coding units, according to an embodiment.

Referring to FIG. 6, split shape mode information of a current coding unit 600 or 650 may be obtained from a sample of a predetermined location (e.g., a sample 640 or 690 of a center location) from among a plurality of samples included in the current coding unit 600 or 650. However, the predetermined location in the current coding unit 600, from which at least one piece of the split shape mode information may be obtained, is not limited to the center location in FIG. 6, and may include various locations included in the current coding unit 600 (e.g., top, bottom, left, right, upper-left, lower-left, upper-right, and lower-right locations). The image decoding apparatus 100 may obtain the split shape mode information from the predetermined location and may determine to split or not to split the current coding unit into various-shaped and various-sized coding units.

According to an embodiment, when the current coding unit is split into a predetermined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predetermined location.

According to an embodiment, the image decoding apparatus 100 may use information indicating locations of the odd number of coding units, so as to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of predetermined samples included in the coding units 620a, 620b, and 620c. In detail, the image decoding apparatus 100 may determine the coding unit 620b at the center location by determining the locations of the coding units 620a, 620b, and 620c based on information indicating locations of top-left samples 630a, 630b, and 630c of the coding units 620a, 620b, and 620c.

According to an embodiment, the information indicating the locations of the top-left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the top-left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the top-left sample 630a of the upper coding unit 620a may include coordinates (xa, ya), information indicating the location of the top-left sample 630b of the middle coding unit 620b may include coordinates (xb, yb), and information indicating the location of the top-left sample 630c of the lower coding unit 620c may include coordinates (xc, yc). The image decoding apparatus 100 may determine the middle coding unit 620b by using the coordinates of the top-left samples 630a, 630b, and 630c which are included in the coding units 620a, 620b, and 620c, respectively. For example, when the coordinates of the top-left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the top-left samples 630a, 630b, and 630c may include coordinates indicating absolute locations in the picture, or may use coordinates (dxb, dyb) indicating a relative location of the top-left sample 630b of the middle coding unit 620b and coordinates (dxc, dyc) indicating a relative location of the top-left sample 630c of the lower coding unit 620c with reference to the location of the top-left sample 630a of the upper coding unit 620a. A method of determining a coding unit at a predetermined location by using coordinates of a sample included in the coding unit, as information indicating a location of the sample, is not limited to the aforementioned method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a predetermined criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the top-left sample 630a of the upper coding unit 620a, the coordinates (xb, yb) that is the information indicating the location of the top-left sample 630b of the middle coding unit 620b, and the coordinates (xc, yc) that is the information indicating the location of the top-left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a, 620b, and 620c. Referring to FIG. 6, the image decoding apparatus 100 may determine the middle coding unit 620b, which has a size different from the size of the upper and lower coding units 620a and 620c, as the coding unit of the predetermined location. However, the aforementioned method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus 100 may determine the width or height of each of the coding units 660a, 660b, and 660c by using the coordinates (xd, yd) that is information indicating the location of a top-left sample 670a of the left coding unit 660a, the coordinates (xe, ye) that is information indicating the location of a top-left sample 670b of the middle coding unit 660b, and the coordinates (xf, yf) that is information indicating a location of the top-left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 650. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a, 660b, and 660c. Referring to FIG. 6, the image decoding apparatus 100 may determine the middle coding unit 660b, which has a size different from the sizes of the left and right coding units 660a and 660c, as the coding unit of the predetermined location. However, the aforementioned method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the aforementioned top-left locations, and information about arbitrary locations of samples included in the coding units may be used.

According to an embodiment, the image decoding apparatus 100 may select a coding unit at a predetermined location from among an odd number of coding units determined by splitting the current coding unit, in consideration of the shape of the current coding unit. For example, when the current coding unit has a non-square shape, a width of which is longer than its height, the image decoding apparatus 100 may determine the coding unit at the predetermined location in a horizontal direction. That is, the image decoding apparatus 100 may determine one of coding units at different locations in a horizontal direction and may put a restriction on the coding unit. When the current coding unit has a non-square shape, a height of which is longer than its width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, so as to determine the coding unit at the predetermined location from among the even number of coding units. The image decoding apparatus 100 may determine an even number of coding units by splitting (binary-splitting) the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which is described in detail above with reference to FIG. 6, and thus detailed descriptions thereof are not provided here.

According to an embodiment, when a non-square current coding unit is split into a plurality of coding units, predetermined information about a coding unit at a predetermined location may be used in a splitting process to determine the coding unit at the predetermined location from among the plurality of coding units. For example, the image decoding apparatus 100 may use at least one of block shape information and split shape mode information, which is stored in a sample included in a middle coding unit, in a splitting process to determine a coding unit at a center location from among the plurality of coding units determined by splitting the current coding unit.

Referring to FIG. 6, the image decoding apparatus 100 may split the current coding unit 600 into the plurality of coding units 620*a*, 620*b*, and 620*c* based on the split shape mode information, and may determine the coding unit 620*b* at a center location from among the plurality of the coding units 620*a*, 620*b*, and 620*c*. Furthermore, the image decoding apparatus 100 may determine the coding unit 620*b* at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620*a*, 620*b*, and 620*c* based on the split shape mode information, the coding unit 620*b* including the sample 640 may be determined as the coding unit at the center location. However, information used to determine the coding unit at the center location is not limited to the split shape mode information, and various types of information may be used to determine the coding unit at the center location.

According to an embodiment, predetermined information for identifying the coding unit at the predetermined location may be obtained from a predetermined sample included in a coding unit to be determined. Referring to FIG. 6, the image decoding apparatus 100 may use the split shape mode information, which is obtained from a sample at a predetermined location in the current coding unit 600 (e.g., a sample at a center location of the current coding unit 600), to determine a coding unit at a predetermined location from among the plurality of the coding units 620*a*, 620*b*, and 620*c* determined by splitting the current coding unit 600 (e.g., a coding unit at a center location from among a plurality of split coding units). That is, the image decoding apparatus 100 may determine the sample at the predetermined location by considering a block shape of the current coding unit 600, may determine the coding unit 620*b* including a sample, from which predetermined information (e.g., the split shape mode information) is obtainable, from among the plurality of coding units 620*a*, 620*b*, and 620*c* determined by splitting the current coding unit 600, and may put a predetermined restriction on the coding unit 620*b*. Referring to FIG. 6, according to an embodiment, the image decoding apparatus 100 may determine the sample 640 at the center location of the current coding unit 600 as the sample from which the predetermined information is obtainable, and may put a predetermined restriction on the coding unit 620*b* including the sample 640, in a decoding operation. However, the location of the sample from which the predetermined information is obtainable is not limited to the aforementioned location, and may include arbitrary locations of samples included in the coding unit 620*b* to be determined for a restriction.

According to an embodiment, the location of the sample from which the predetermined information is obtainable may be determined based on the shape of the current coding unit 600. According to an embodiment, the block shape information may indicate whether the current coding unit has a square or non-square shape, and the location of the sample from which the predetermined information is obtainable may be determined based on the shape. For example, the image decoding apparatus 100 may determine a sample located on a boundary for splitting at least one of a width and height of the current coding unit in half, as the sample from which the predetermined information is obtainable, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the predetermined information is obtainable.

According to an embodiment, when the current coding unit is split into a plurality of coding units, the image decoding apparatus 100 may use the split shape mode information so as to determine a coding unit at a predetermined location from among the plurality of coding units. According to an embodiment, the image decoding apparatus 100 may obtain the split shape mode information from a sample at a predetermined location in a coding unit, and may split the plurality of coding units, which are generated by splitting the current coding unit, by using the split shape mode information, which is obtained from the sample of the predetermined location in each of the plurality of coding units. That is, a coding unit may be recursively split based on the split shape mode information, which is obtained from the sample at the predetermined location in each coding unit. An operation of recursively splitting a coding unit is described above with reference to FIG. 5, and thus detailed descriptions thereof are not provided here.

According to an embodiment, the image decoding apparatus 100 may determine one or more coding units by splitting the current coding unit, and may determine an order of decoding the one or more coding units, based on a predetermined block (e.g., the current coding unit).

Figure 7:
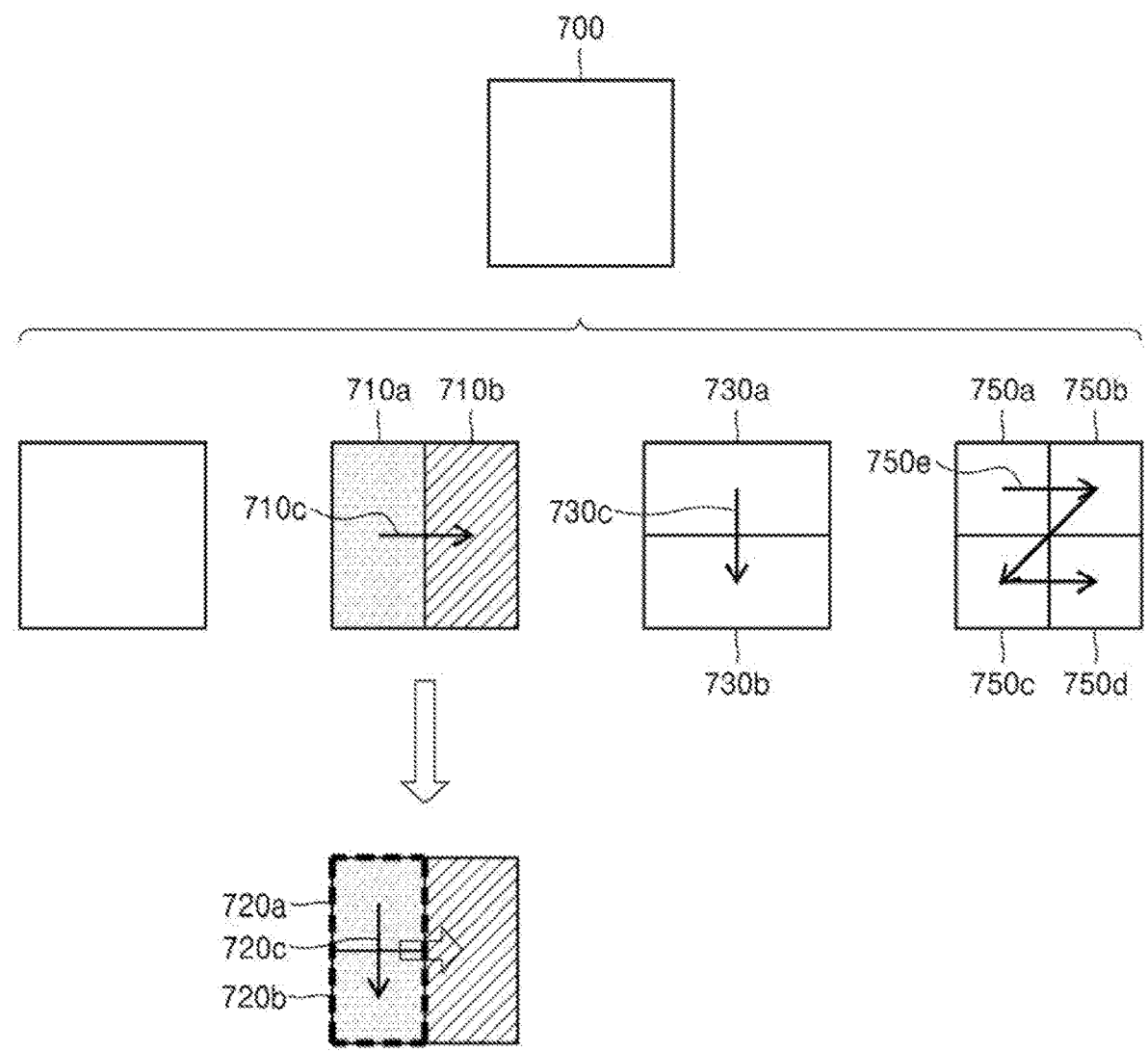
FIG. 7 illustrates an order of processing a plurality of coding units when the image decoding apparatus determines the plurality of coding units by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a to 750d by splitting the first coding unit 700 in vertical and horizontal directions, based on split shape mode information.

Referring to FIG. 7, the image decoding apparatus 100 may determine to process the second coding units 710a and 710b in a horizontal direction order 710c, the second coding units 710a and 710b being determined by splitting the first coding unit 700 in a vertical direction. The image decoding apparatus 100 may determine to process the second coding units 730a and 730b in a vertical direction order 730c, the second coding units 730a and 730b being determined by splitting the first coding unit 700 in a horizontal direction. The image decoding apparatus 100 may determine the second coding units 750a, 750b, 750c, and 750d, which are determined by splitting the first coding unit 700 in vertical and horizontal directions, according to a predetermined order (e.g., a raster scan order or Z-scan order 750e) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710a and 710b, 730a and 730b, or 750a, 750b, 750c, and 750d by splitting the first coding unit 700, and may recursively split each of the determined plurality of coding units 710a and 710b, 730a and 730b, or 750a, 750b, 750c, and 750d. A splitting method of the plurality of coding units 710a and 710b, 730a and 730b, or 750a, 750b, 750c, and 750d may correspond to a splitting method of the first coding unit 700. Accordingly, each of the plurality of coding units 710a and 710b, 730a and 730b, or 750a, 750b, 750c, and 750d may be independently split into a plurality of coding units. Referring to FIG. 7, the image decoding apparatus 100 may determine the second coding units 710a and 710b by splitting the first coding unit 700 in a vertical direction, and may determine to independently split each of the second coding units 710a and 710b or not to split the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. It should be construed that an operation of determining a processing order of coding units based on a coding unit before being split is not limited to the aforementioned example, and various methods may be used to independently process coding units, which are split and determined to various shapes, in a predetermined order.

Figure 8:
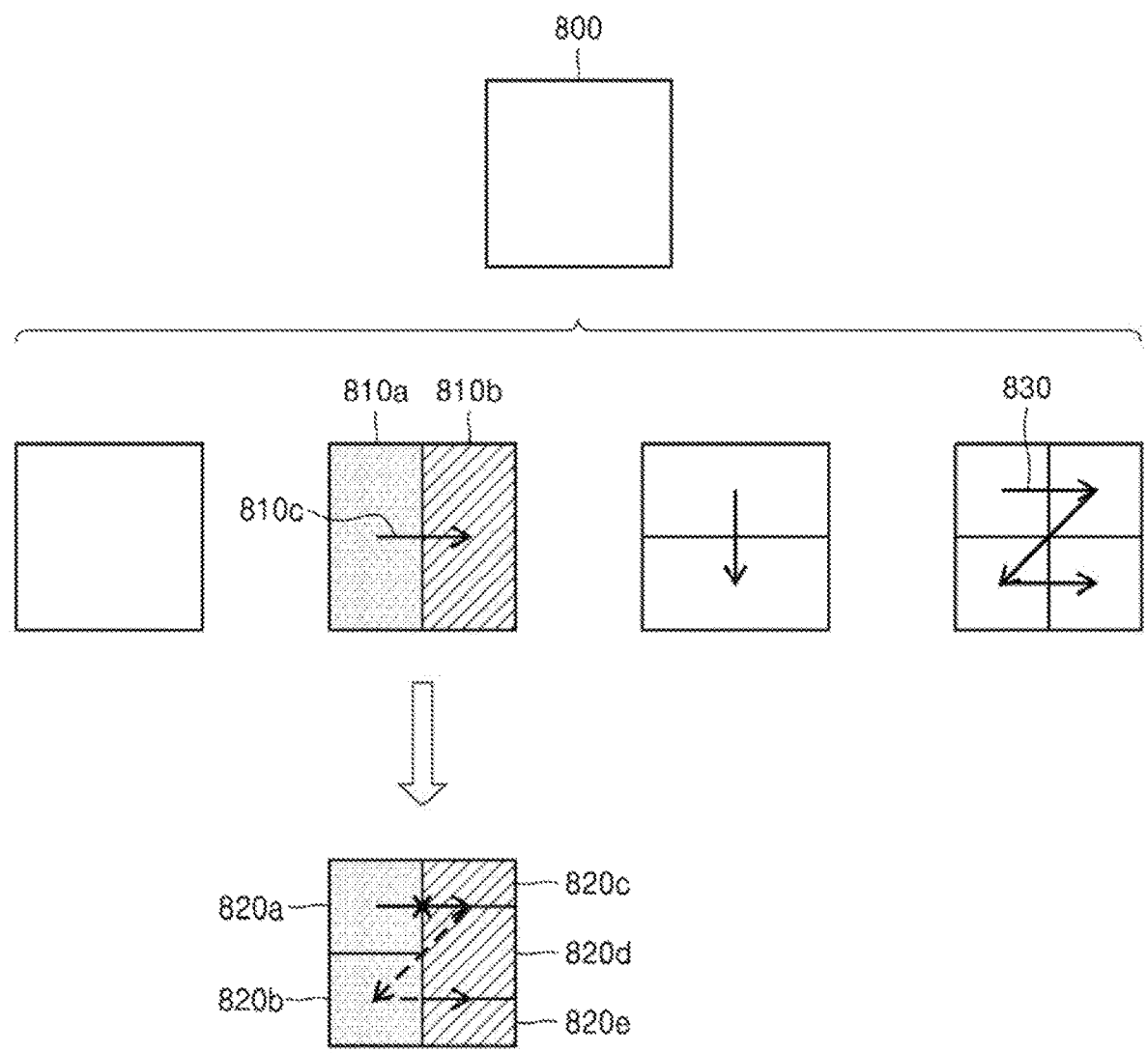
FIG. 8 illustrates a process, performed by the image decoding apparatus, of determining that a current coding unit is to be split into an odd number of coding units, when the coding units are not processable in a predetermined order, according to an embodiment.

FIG. 8 illustrates a process, performed by the image decoding apparatus 100, of determining that a current coding unit is to be split into an odd number of coding units, when the coding units are not processable in a predetermined order, according to an embodiment.

According to an embodiment, the image decoding apparatus 100 may determine that the current coding unit is to be split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c, 820d, and 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c, 820d, and 820e.

According to an embodiment, the image decoding apparatus 100 may determine whether there are an odd number of split coding units, by determining whether the third coding units 820a and 820b, and 820c, 820d, and 820e are processable in a predetermined order. Referring to FIG. 8, the image decoding apparatus 100 may determine the third coding units 820a and 820b, and 820c, 820d, and 820e by recursively splitting the first coding unit 800. The image decoding apparatus 100 may determine whether any of the first coding unit 800, the second coding units 810a and 810b, or the third coding units 820a and 820b, and 820c, 820d, and 820e is to be split into an odd number of coding units, based on at least one of the block shape information and the split shape mode information. For example, the second coding unit 810b located in the right from among the second coding units 810a and 810b may be split into an odd number of third coding units 820c, 820d, and 820e. A processing order of a plurality of coding units included in the first coding unit 800 may be a predetermined order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the predetermined order.

According to an embodiment, the image decoding apparatus 100 may determine whether the third coding units 820a and 820b, and 820c, 820d, and 820e included in the first coding unit 800 satisfy the condition for processing in the predetermined order, and the condition relates to whether at least one of a width and height of the second coding units 810a and 810b is to be split in half along a boundary of the third coding units 820a and 820b, and 820c, 820d, and 820e. For example, the third coding units 820a and 820b determined when the height of the left second coding unit 810a of the non-square shape is split in half may satisfy the condition. It may be determined that the third coding units 820c, 820d, and 820e do not satisfy the condition because the boundaries of the third coding units 820c, 820d, and 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is to be split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location is described above in relation to various embodiments, and thus detailed descriptions thereof are not provided herein.

Figure 9:
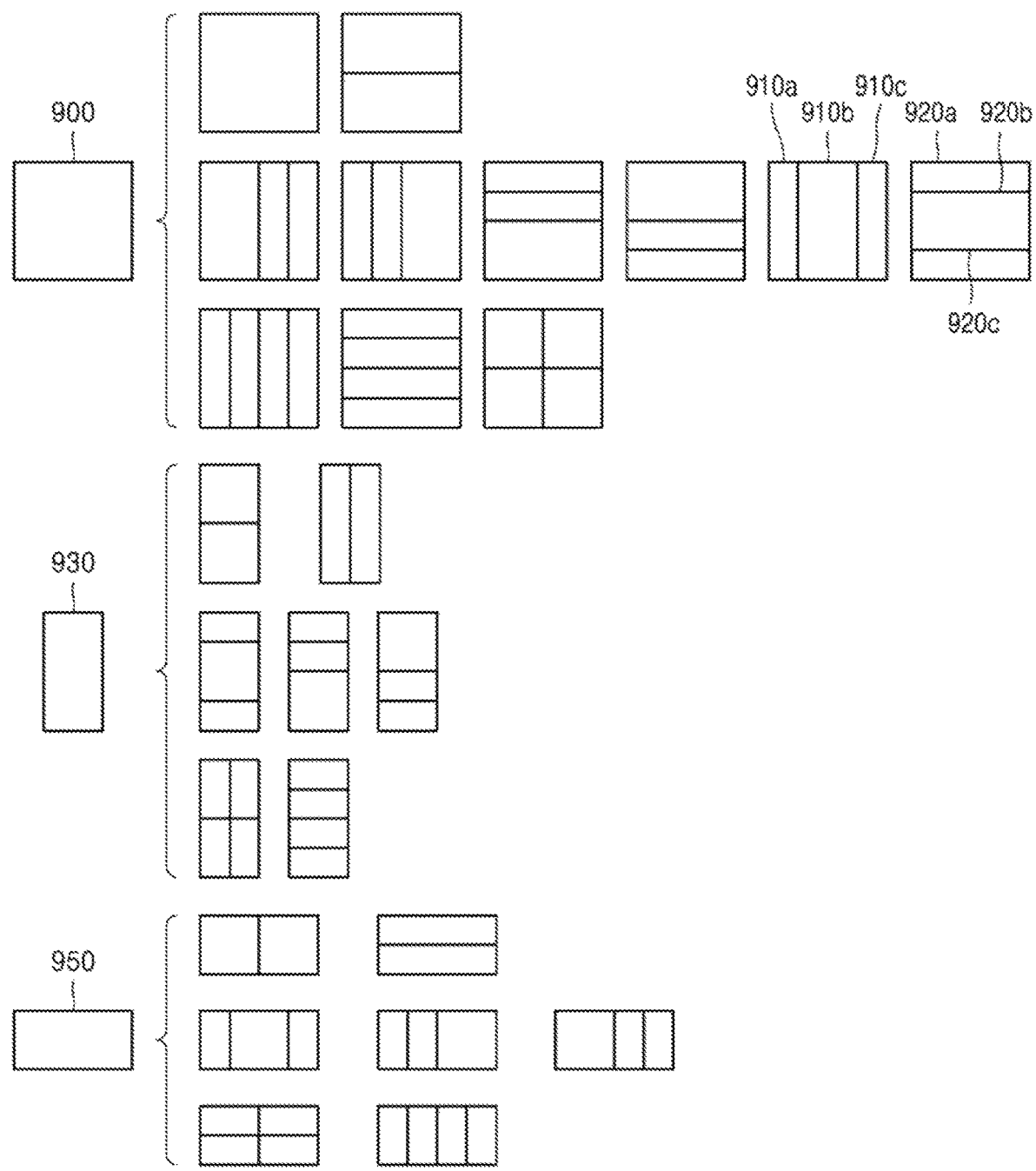
FIG. 9 illustrates a process, performed by the image decoding apparatus, of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on split shape mode information that is obtained through a receiver (not shown). The square first coding unit 900 may be split into four square coding units, or may be split into a plurality of non-square coding units. For example, referring to FIG. 9, when the first coding unit 900 is a square and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a predetermined order, and the condition relates to whether at least one of a width and height of the first coding unit 900 is to be split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the predetermined order. In addition, because boundaries of the second coding units 920a, 920b, and 920c determined by splitting the square first coding unit 900 in a horizontal direction do not split the height of the first coding unit 900 in half, it may be determined that the first coding unit 900 does not satisfy the condition for processing in the predetermined order. When the condition is not satisfied as described above, the image decoding apparatus 100 may determine disconnection of a scan order, and may determine that the first coding unit 900 is to be split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location is described above in relation to various embodiments, and thus detailed descriptions thereof are not provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
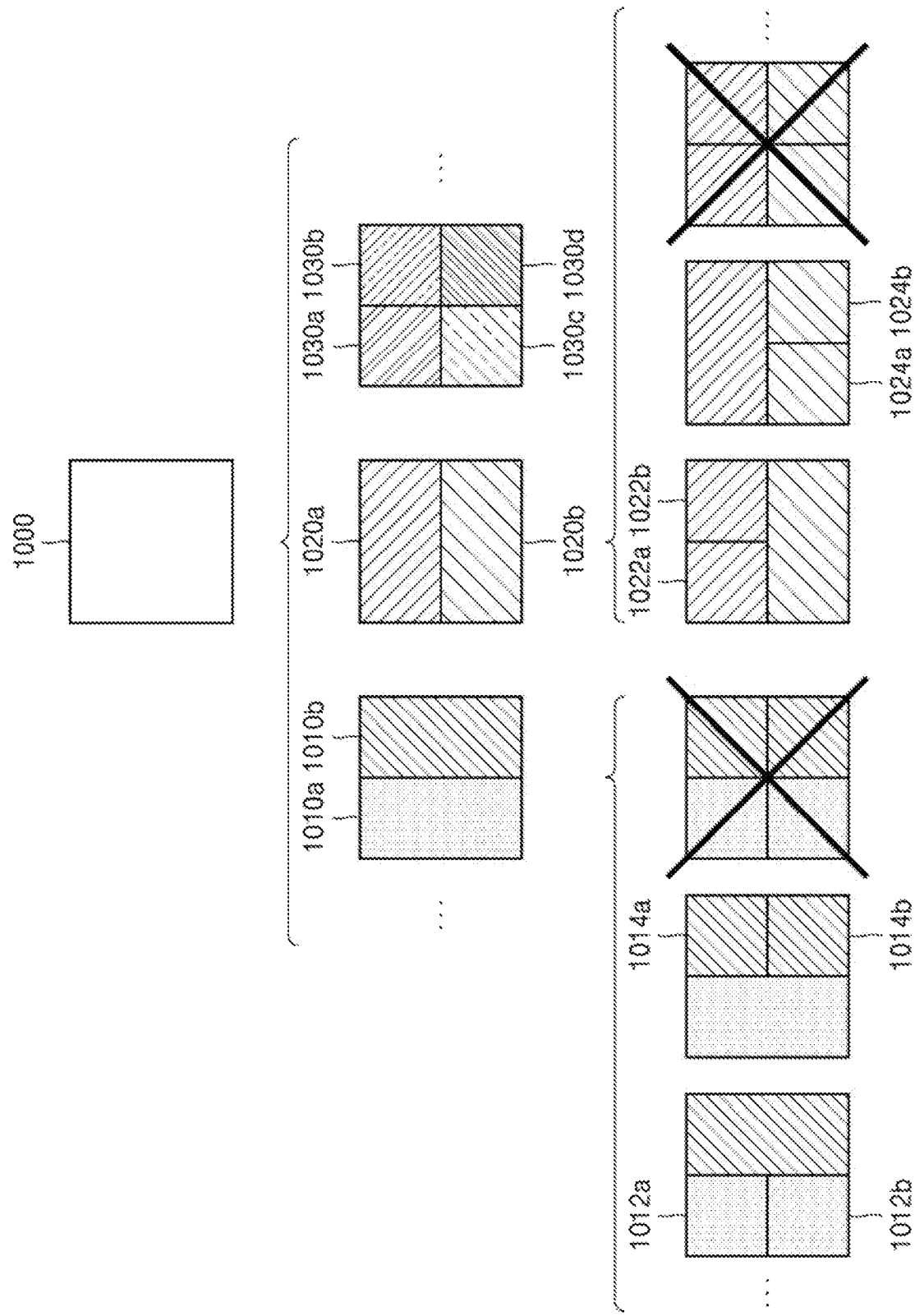
FIG. 10 illustrates that a shape into which a second coding unit is splittable is restricted when the second coding unit having a non-square shape, which is determined when the image decoding apparatus splits a first coding unit, satisfies a predetermined condition, according to an embodiment.

FIG. 10 illustrates that a shape into which a second coding unit is splittable is restricted when the second coding unit having a non-square shape, which is determined as the image decoding apparatus 100 splits a first coding unit 1000, satisfies a predetermined condition, according to an embodiment.

According to an embodiment, the image decoding apparatus 100 may determine to split the square first coding unit 1000 into non-square second coding units 1010a and 1010b or 1020a and 1020b, based on split shape mode information that is obtained by the receiver (not shown). The second coding units 1010a and 1010b or 1020a and 1020b may be independently split. Accordingly, the image decoding apparatus 100 may determine to split or not to split each of the second coding units 1010a and 1010b or 1020a and 1020b into a plurality of coding units, based on the split shape mode information of each of the second coding units 1010a and 1010b or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left second coding unit 1010a and the right second coding unit 1010b are independently split in a horizontal direction, the third coding units 1012a and 1012b or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b or 1024*a* and 1024*b* by splitting the non-square second coding unit 1020*a* or 1020*b*, which is determined by splitting the first coding unit 1000 in a horizontal direction, in a vertical direction. However, when a second coding unit (e.g., the upper second coding unit 1020*a*) is split in a vertical direction, for the aforementioned reason, the image decoding apparatus 100 may restrict the other second coding unit (e.g., the lower second coding unit 1020*b*) to not be split in a vertical direction in which the upper second coding unit 1020*a* is split.

Figure 11:
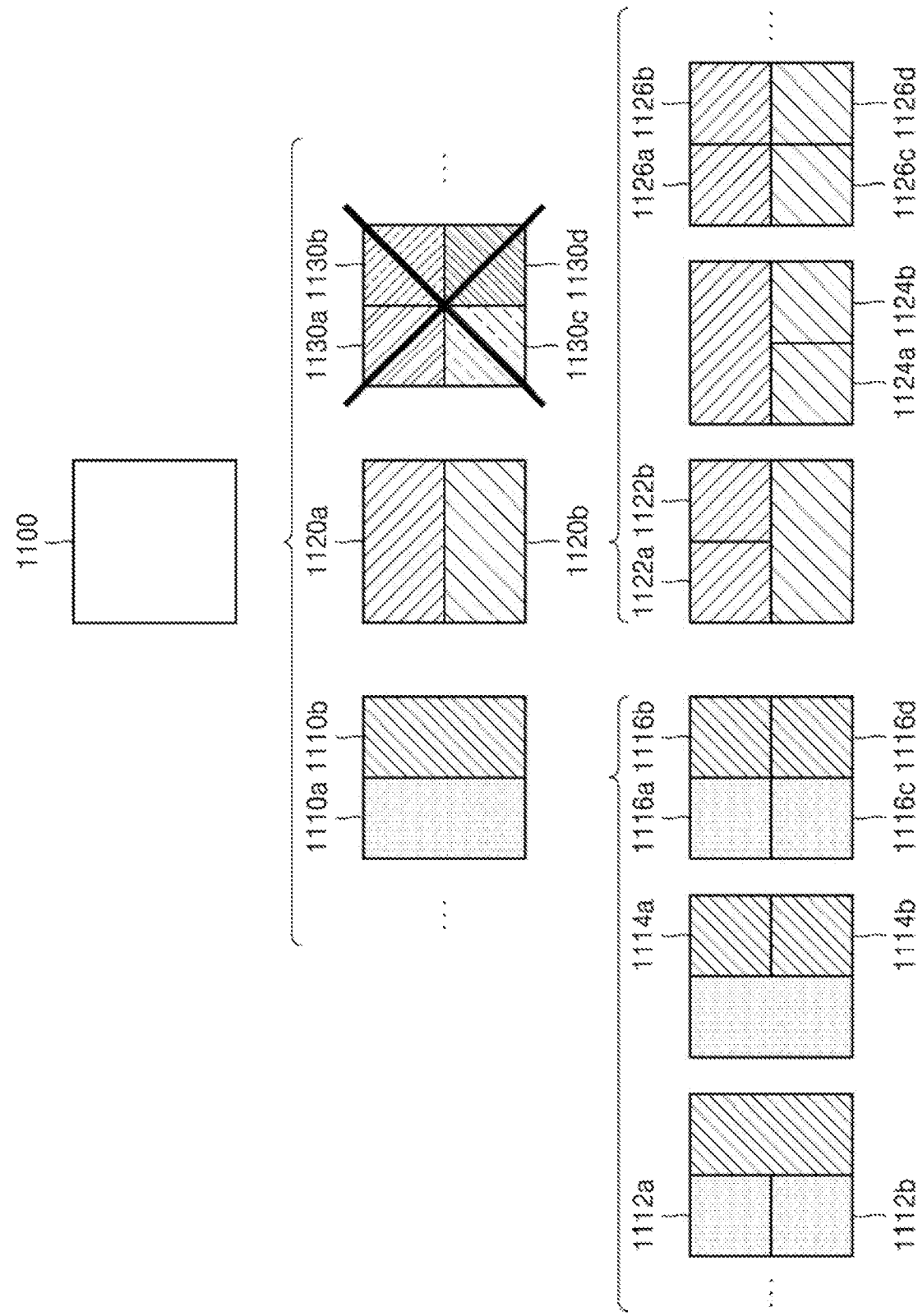
FIG. 11 illustrates a process, performed by the image decoding apparatus, of splitting a square coding unit when split shape mode information indicates that the square coding unit is to not be split into four square coding units, according to an embodiment.

FIG. 11 illustrates a process, performed by the image decoding apparatus 100, of splitting a square coding unit when split shape mode information indicates that the square coding unit is to not be split into four square coding units, according to an embodiment.

According to an embodiment, the image decoding apparatus 100 may determine second coding units 1110*a* and 1110*b* or 1120*a* and 1120*b*, etc. by splitting a first coding unit 1100, based on split shape mode information. The split shape mode information may include information about various methods of splitting a coding unit, but the information about various splitting methods may not include information for splitting a coding unit into four square coding units. Based on the split shape mode information, the image decoding apparatus 100 does not split the square first coding unit 1100 into four square second coding units 1130*a*, 1130*b*, 1130*c*, and 1130*d*. The image decoding apparatus 100 may determine the non-square second coding units 1110*a* and 1110*b* or 1120*a* and 1120*b*, etc., based on the split shape mode information.

According to an embodiment, the image decoding apparatus 100 may independently split the non-square second coding units 1110*a* and 1110*b* or 1120*a* and 1120*b*, etc. Each of the second coding units 1110*a* and 1110*b* or 1120*a* and 1120*b*, etc. may be recursively split in a predetermined order, and this splitting method may correspond to a method of splitting the first coding unit 1100, based on the split shape mode information.

For example, the image decoding apparatus 100 may determine square third coding units 1112*a* and 1112*b* by splitting the left second coding unit 1110*a* in a horizontal direction, and may determine square third coding units 1114*a* and 1114*b* by splitting the right second coding unit 1110*b* in a horizontal direction. Furthermore, the image decoding apparatus 100 may determine square third coding units 1116*a*, 1116*b*, 1116*c*, and 1116*d* by splitting both the left second coding unit 1110*a* and the right second coding unit 1110*b* in a horizontal direction. In this case, coding units having the same shape as the four square second coding units 1130*a*, 1130*b*, 1130*c*, and 1130*d* split from the first coding unit 1100 may be determined.

As another example, the image decoding apparatus 100 may determine square third coding units 1122*a* and 1122*b* by splitting the upper second coding unit 1120*a* in a vertical direction, and may determine square third coding units 1124*a* and 1124*b* by splitting the lower second coding unit 1120*b* in a vertical direction. Furthermore, the image decoding apparatus 100 may determine square third coding units 1126*a*, 1126*b*, 1126*c*, and 1126*d* by splitting both the upper second coding unit 1120*a* and the lower second coding unit 1120*b* in a vertical direction. In this case, coding units having the same shape as the four square second coding units 1130*a*, 1130*b*, 1130*c*, and 1130*d* split from the first coding unit 1100 may be determined.

Figure 12:
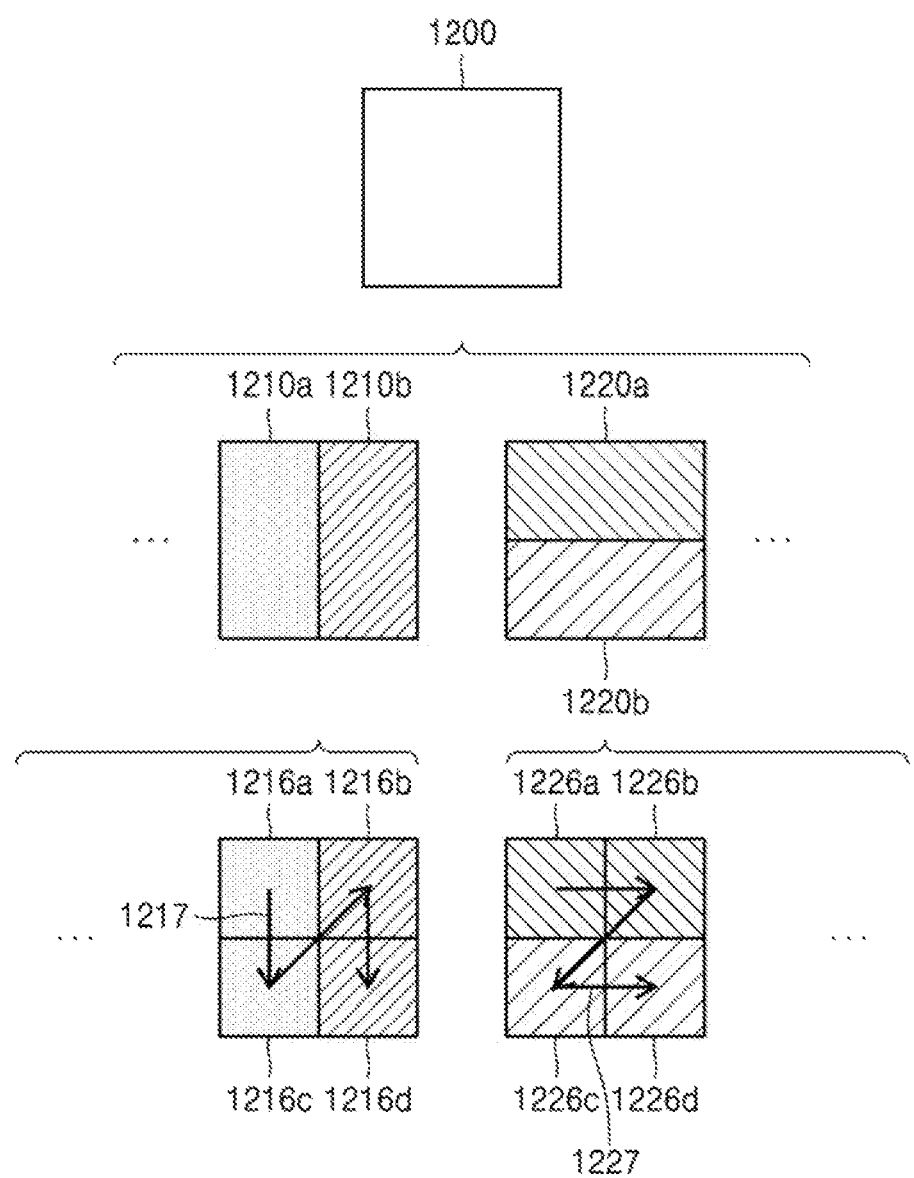
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units 1210*a* and 1210*b* or 1220*a* and 1220*b*, etc. by splitting the first coding unit 1200. Referring to FIG. 12, the non-square second coding units 1210*a* and 1210*b* or 1220*a* and 1220*b* determined by splitting the first coding unit 1200 in only a horizontal direction or vertical direction may be independently split based on the split shape mode information of each coding unit. For example, the image decoding apparatus 100 may determine third coding units 1216*a*, 1216*b*, 1216*c*, and 1216*d* by splitting the second coding units 1210*a* and 1210*b*, which are generated by splitting the first coding unit 1200 in a vertical direction, in a horizontal direction, and may determine third coding units 1226*a*, 1226*b*, 1226*c*, and 1226*d* by splitting the second coding units 1220*a* and 1220*b*, which are generated by splitting the first coding unit 1200 in a horizontal direction, in a vertical direction. An operation of splitting the second coding units 1210*a* and 1210*b* or 1220*a* and 1220*b* is described above with reference to FIG. 11, and thus detailed descriptions thereof are not provided herein.

According to an embodiment, the image decoding apparatus 100 may process coding units in a predetermined order. An operation of processing coding units in a predetermined order is described above with reference to FIG. 7, and thus detailed descriptions thereof are not provided herein. Referring to FIG. 12, the image decoding apparatus 100 may determine four square third coding units 1216*a*, 1216*b*, 1216*c*, and 1216*d*, and 1226*a*, 1226*b*, 1226*c*, and 1226*d* by splitting the square first coding unit 1200. According to an embodiment, the image decoding apparatus 100 may determine processing orders of the third coding units 1216*a*, 1216*b*, 1216*c*, and 1216*d*, and 1226*a*, 1226*b*, 1226*c*, and 1226*d* based on a split shape by which the first coding unit 1200 is split.

According to an embodiment, the image decoding apparatus 100 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding unit 1216*b* and 1216*d*, which are included in the right second coding unit 1210*b*, in a vertical direction.

According to an embodiment, the image decoding apparatus 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. Accordingly, by recursively splitting a coding unit in different manners based on the split shape mode information, the image decoding apparatus 100 may process a plurality of coding units in different orders even when the coding units are eventually determined to have the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than its width, or as '2: NS_HOR' indicating a non-square shape, a width of which is longer than its height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
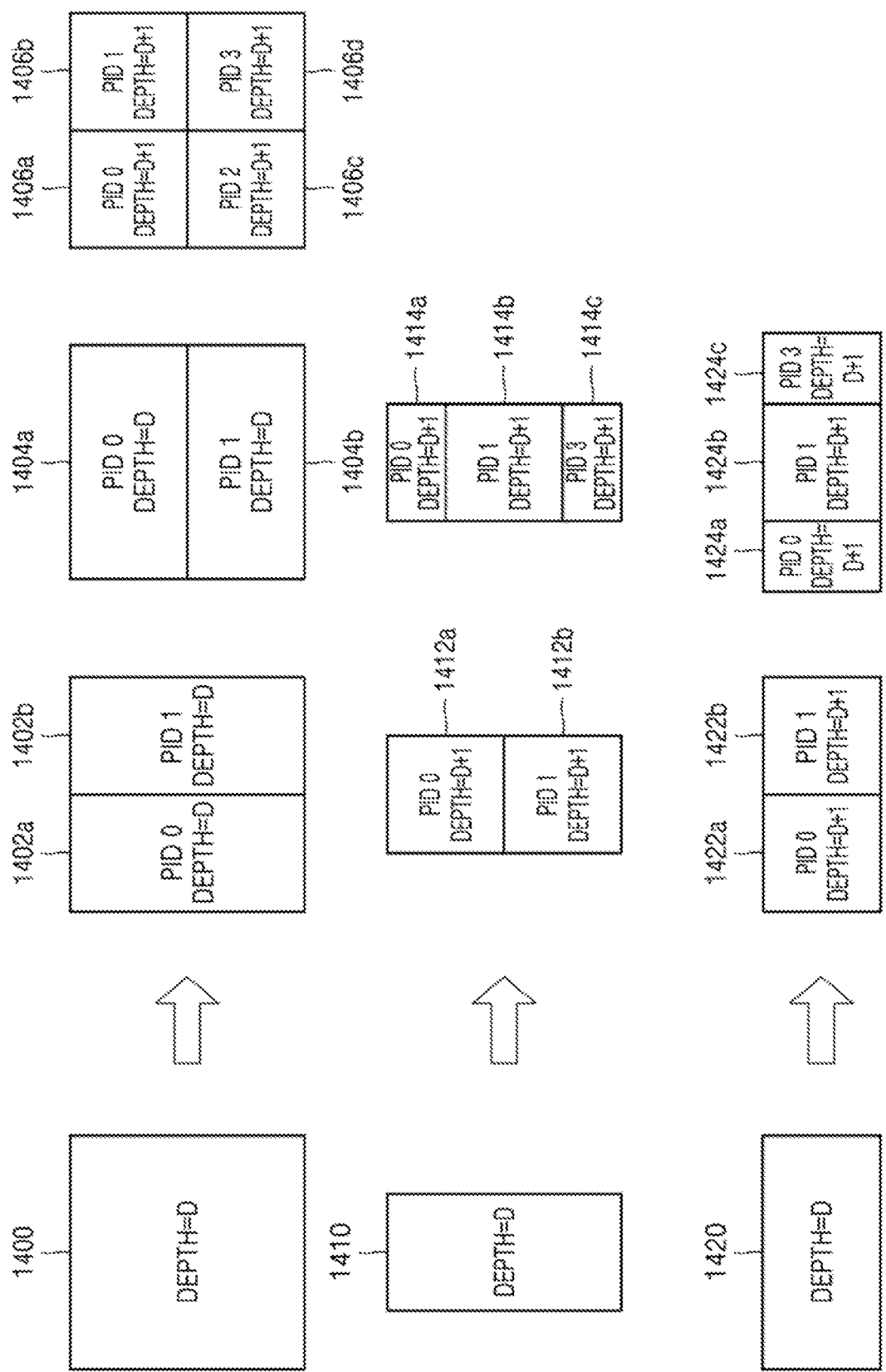
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406b, 1406c, and 1406d that are determined based on the split shape mode information of the square first coding unit 1400 may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than its width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than its height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than its width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than its height, by using the aforementioned method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width being equal to that of the other coding units 1414a and 1414c and a height being twice that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a particular splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than its width. The image decoding apparatus 100 may use PIDs indicating respective coding units so as to identify the respective coding units. According to an embodiment, the PID may be obtained from a sample at a predetermined location of each coding unit (e.g., an upper left sample).

According to an embodiment, the image decoding apparatus 100 may determine a coding unit at a predetermined location from among the split coding units, by using the PIDs for distinguishing the coding units. According to an embodiment, when the split shape mode information of the first coding unit 1410 having a rectangular shape, a height of which is longer than its width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units so as to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width being equal to that of the other coding units 1414*a* and 1414*c* and a height being twice that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a predetermined location among an odd number of coding units (e.g., a coding unit of a centre location) has a size different from that of the other coding units. In this case, the image decoding apparatus 100 may determine the coding unit of the centre location, which has a different size, by using PIDs of the coding units. However, the PIDs and the size or location of the coding unit of the predetermined location are not limited to the aforementioned examples, and various PIDs and various locations and sizes of coding units may be used.

According to an embodiment, the image decoding apparatus 100 may use a predetermined data unit where a coding unit starts to be recursively split.

Figure 15:
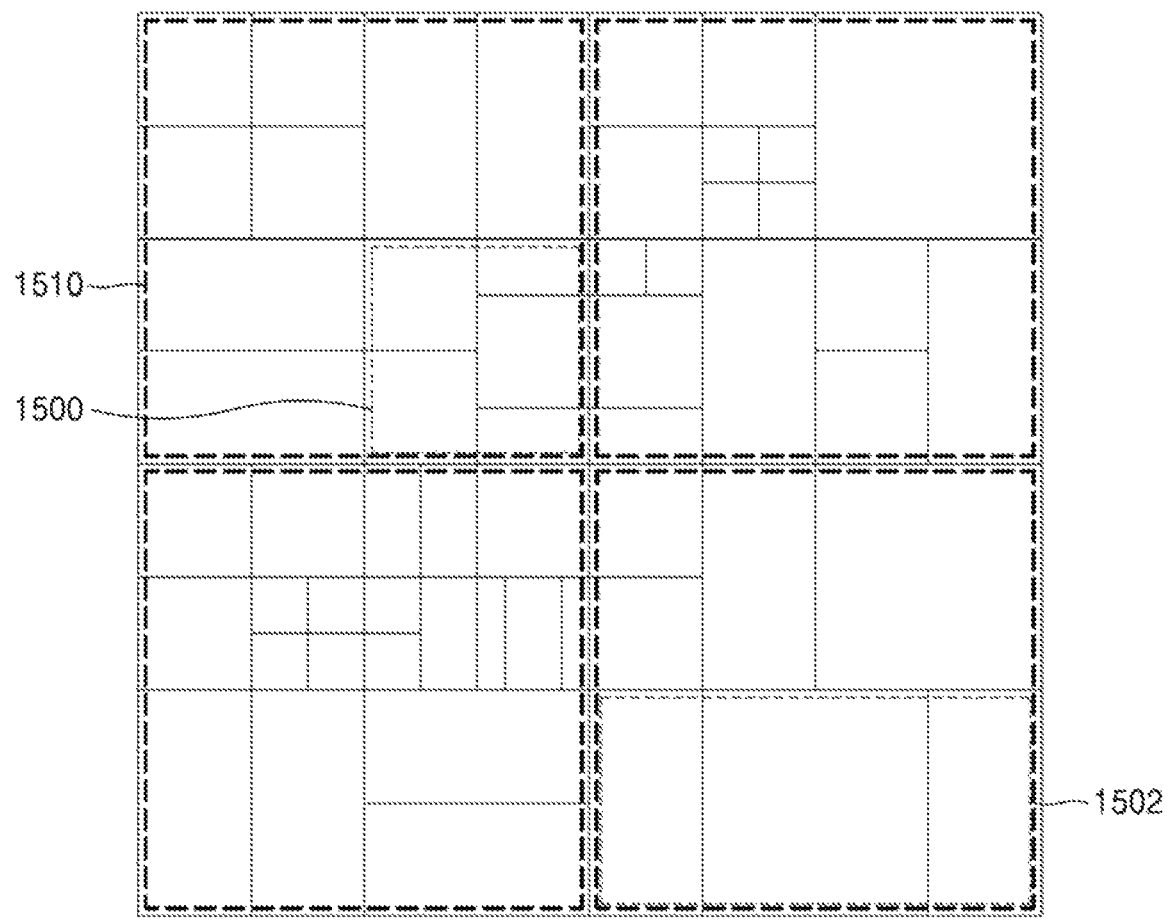
FIG. 15 illustrates that a plurality of coding units are determined based on a plurality of predetermined data units included in a picture, according to an embodiment.

FIG. 15 illustrates that a plurality of coding units are determined based on a plurality of predetermined data units included in a picture, according to an embodiment.

According to an embodiment, a predetermined data unit may be defined as a data unit where a coding unit starts to be recursively split by using split shape mode information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined shape. According to an embodiment, the reference data unit may include M×N samples. Herein, M and N may be equal to each other, and may be integers expressed as powers of 2. That is, the reference data unit may have a square or non-square shape, and then may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units that may include one or more reference coding units (e.g., sequences, pictures, slices, slice segments, tiles, tile groups, largest coding units, or the like).

According to an embodiment, the receiver (not shown) of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predetermined condition. That is, the receiver (not shown) may obtain, from the bitstream, only the PID for identifying the size and shape of reference coding units with respect to each slice, slice segment, tile, tile group, or largest coding unit which is a data unit satisfying a predetermined condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from an image may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 16:
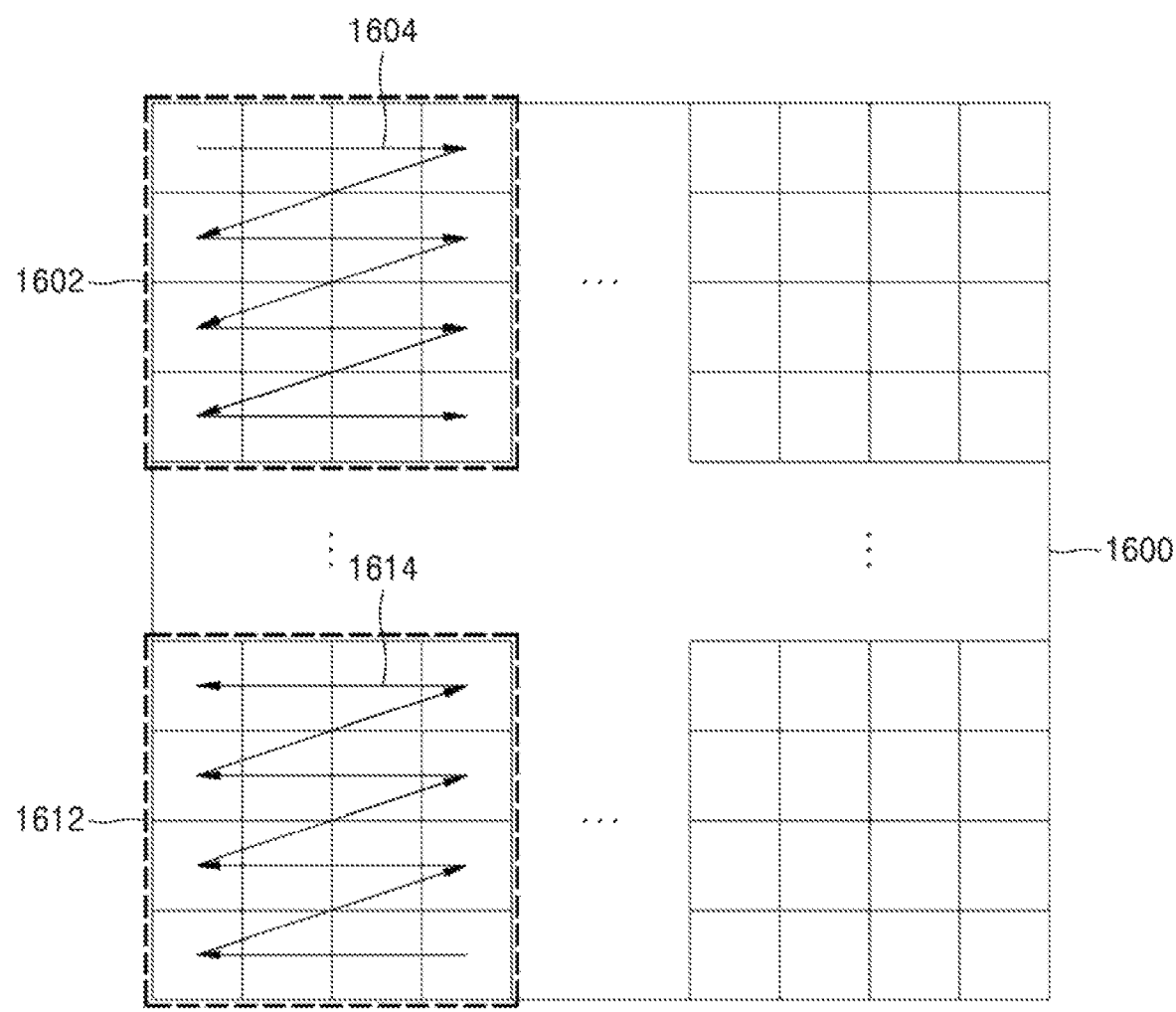
FIG. 16 illustrates a processing block serving as a criterion for determining a determination order of reference coding units included in a picture, according to an embodiment.

FIG. 16 illustrates a processing block serving as a criterion for determining a determination order of reference coding units included in a picture 1600, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a particular order. That is, a determination order of one or more reference coding units determined in each of processing blocks may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the aforementioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a predetermined size of data units, which is indicated by the processing block size information.

According to an embodiment, the receiver (not shown) of the image decoding apparatus 100 may obtain the processing block size information from the bitstream according to each particular data unit. For example, the processing block size information may be obtained from the bitstream in a data unit such as an image, sequence, picture, slice, slice segment, tile, tile group, or the like. That is, the receiver (not shown) may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each particular data unit. For example, the receiver (not shown) may obtain the determination order information of reference coding units from the bitstream according to each data unit such as an image, sequence, picture, slice, slice segment, tile, tile group, or processing block. Because the determination order information of reference coding units indicates an order for determining reference coding units in a processing block, the determination order information may be obtained with respect to each particular data unit including an integer number of processing blocks.

According to an embodiment, the image decoding apparatus 100 may determine one or more reference coding units based on the determined determination order.

According to an embodiment, the receiver (not shown) may obtain the determination order information of reference coding units from the bitstream as information related to the processing blocks 1602 and 1612, and the image decoding apparatus 100 may determine a determination order of one or more reference coding units included in the processing blocks 1602 and 1612 and may determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain, from the bitstream, block shape information indicating the shape of a current coding unit or split shape mode information indicating a splitting method of the current coding unit, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the disclosure will be described in detail.

The image decoding apparatus 100 may determine a split rule of an image. The split rule may be predetermined between the image decoding apparatus 100 and the image encoding apparatus 150. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, and a tile group header. The image decoding apparatus 100 may determine the split rule differently according to frames, slices, temporal layers, largest coding units, or coding units.

The image decoding apparatus 100 may determine the split rule based on a block shape of a coding unit. The block shape may include a size, shape, a ratio of width and height, and a direction of the coding unit. The image encoding apparatus 150 and the image decoding apparatus 100 may predetermine to determine the split rule based on the block shape of the coding unit. However, the disclosure is not limited thereto. The image decoding apparatus 100 may determine the split rule based on the information obtained from the bitstream received from the image encoding apparatus 150.

The shape of the coding unit may include a square and a non-square. When the lengths of the width and height of the coding unit are equal, the image decoding apparatus 100 may determine the shape of the coding unit to be a square. Also, when the lengths of the width and height of the coding unit are not equal, the image decoding apparatus 100 may determine the shape of the coding unit to be a non-square.

The size of the coding unit may include various sizes such as 4×4, 8×4, 4×8, 8×8, 16×4, 16×8, and to 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed, based on the size of the coding unit. The image decoding apparatus 100 may determine a split direction according to the size of the coding unit. The image decoding apparatus 100 may determine an allowable split type, based on the size of the coding unit.

The split rule determined based on the size of the coding unit may be a split rule predetermined between the image encoding apparatus 150 and the image decoding apparatus 100. Also, the image decoding apparatus 100 may determine the split rule, based on the information obtained from the bitstream.

The image decoding apparatus 100 may adaptively determine the split rule, based on a location of the coding unit. The image decoding apparatus 100 may adaptively determine the split rule, based on the location of the coding unit in the image.

Also, the image decoding apparatus 100 may determine the split rule such that coding units generated via different splitting paths do not have the same block shape. However, the disclosure is not limited thereto, and the coding units generated via different splitting paths may have the same block shape. The coding units generated via the different splitting paths may have different decoding processing orders. Because the decoding processing orders are described above with reference to FIG. 12, details thereof are not provided here.

Hereinafter, with reference to FIGS. 17 to 31, according to various embodiments provided in the present specification, a process of adaptively configuring intra prediction mode candidates according to a block shape, and performing intra prediction by using the intra prediction mode candidate will be described in detail. An intra prediction process according to various embodiments may be performed by the decoder 120 of the image decoding apparatus 100 of FIG. 1A and the encoder 155 of the image encoding apparatus 150 of FIG. 2A. In particular, the intra prediction process according to various embodiments may be performed by the intra predictor 6400 of the image decoder 6000 of FIG. 1C and the intra predictor 7200 of the image encoder 7000 of FIG. 2C.

Figure 17:
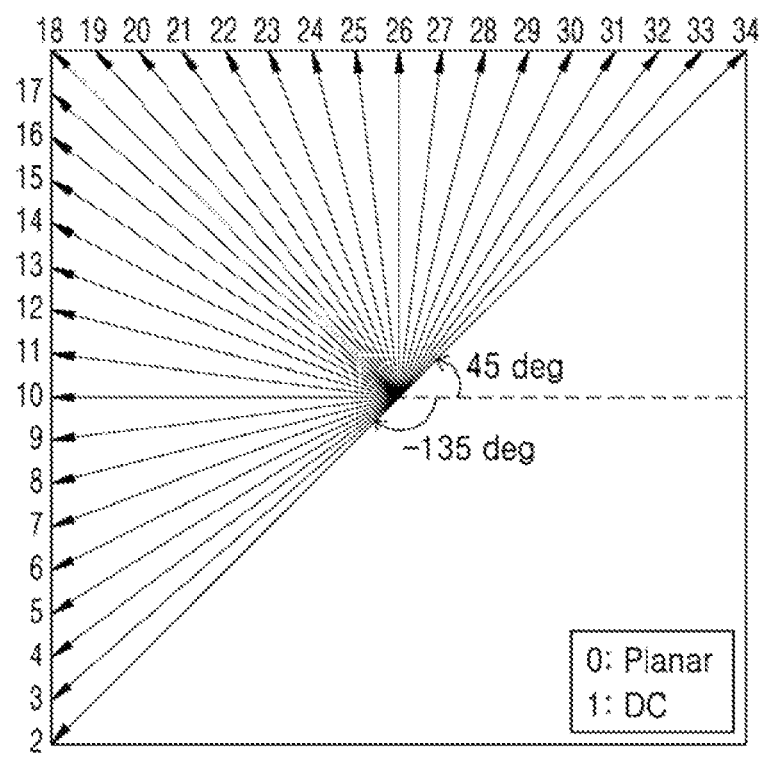
FIG. 17 illustrates intra prediction modes according to an embodiment.
Figure 18:
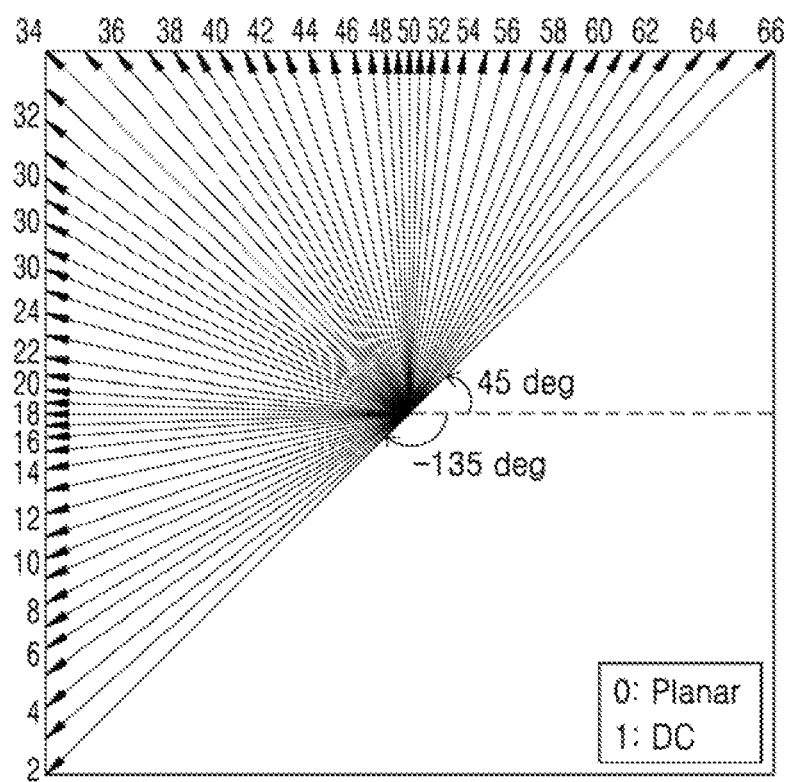
FIG. 18 illustrates intra prediction modes according to another embodiment.

FIG. 17 illustrates intra prediction modes according to an embodiment, and FIG. 18 illustrates intra prediction modes according to another embodiment.

Intra prediction modes according to various embodiments may include a non-angular intra prediction mode including a planar mode and a DC mode that do not have directivity, and an angular intra prediction mode having directivity.

Referring to FIGS. 17 and 18, the angular intra prediction mode includes intra prediction modes indicating particular directions within a range between −135 degrees and −180 degrees and a range between 45 degrees and 180 degrees with respect to directions of 45 degrees and −135 degrees.

In the descriptions below, angles of prediction directions in a range between 0 degree and 180 degrees which indicate directions on Quadrants I and II may be represented as +, and angles of prediction directions in a range between −180 degrees and 0 degree which indicate directions on Quadrants III and IV may be represented as −. A predetermined angle of −a (where "a" is a positive real number) indicating a direction on Quadrants III and IV corresponds to an angle of (360−a) degrees. For example, the direction of −135 degrees corresponds to the direction of 225 degrees, and the direction of −180 degrees corresponds to the direction of 180 degrees.

Prediction directions represented as arrows shown in FIGS. 17 and 18 indicate directions of adjacent pixels to be used in intra prediction, with respect to a current pixel of a current block which is to be intra predicted. Numbers marked in FIGS. 17 and 18 are examples of intra prediction mode indices (predModeIntra) according to intra prediction directions. A predModeIntra value of a planar mode and a predModeIntra value of a DC mode, which are the non-angular intra prediction modes, may be set as 0 and 1, respectively.

Referring to FIG. 17, angular intra prediction modes according to an embodiment may include 33 intra prediction modes obtained by dividing a gap between 45 degrees and −135 degrees by 33. The 33 angular intra prediction modes may sequentially have predModeIntra values of 2 through 34 in a clockwise direction from the direction of −135 degrees.

Referring to FIG. 18, angular intra prediction modes according to an embodiment may include 65 intra prediction modes obtained by dividing a gap between −135 degrees and −180 degrees and a gap between 45 degrees and 180 degrees with respect to directions of 45 degrees and −135 degrees by 65. The 65 angular intra prediction modes may sequentially have predModeIntra values of 2 through 66 in a clockwise direction from the direction of −135 degrees. However, predModeIntra values of intra prediction modes are not limited to those shown in FIGS. 17 and 18 and may be changed. For example, the number of angular intra prediction modes in a clockwise direction from the direction of 45 degrees may not be limited to 33 or 65 and may be changed, predModeIntra values of the angular intra prediction modes may be sequentially set in a counterclockwise direction from the direction of 45 degrees, and the set predModeIntra values may also be changed. The angular intra prediction modes are not limited thereto and may include a predetermined number of intra prediction modes indicating particular directions in a range between random A degrees (where "A" is a real number) and B degrees (where "B" is a real number).

A picture may be classified to a monochrome image including only a luma component, an image (YCbCr or YCgCo) including one luma component and two chroma components, a RGB image, etc., according to color components that construct the picture. The image including one luma component and two chroma components may be classified to a 4:4:4 format image, a 4:2:2 format image, and a 4:2:0 format image, according to ratios of sampling between the luma component and the chroma components.

In a 4:4:4 format image, ratios of sampling between a luma component and a chroma component are equal. That is, when a size of a luma component block is 2N×2N (where N is an integer), a size of a chroma component block corresponding thereto is also 2N×2N.

In a 4:2:2 format image, ratios of sampling between a luma component and a chroma component in a vertical direction are equal, but a ratio of sampling of a chroma component in a horizontal direction is ½ of a ratio of sampling of a luma component. That is, when a size of a luma component block is 2N×2N, a size of a chroma component block corresponding thereto is N×2N.

In a 4:2:0 format image, a ratio of sampling between two chroma components is ½ of a ratio of sampling of a luma component. That is, when a size of a luma component block is 2N×2N, a size of a chroma component block corresponding thereto is N×N.

Figure 19:
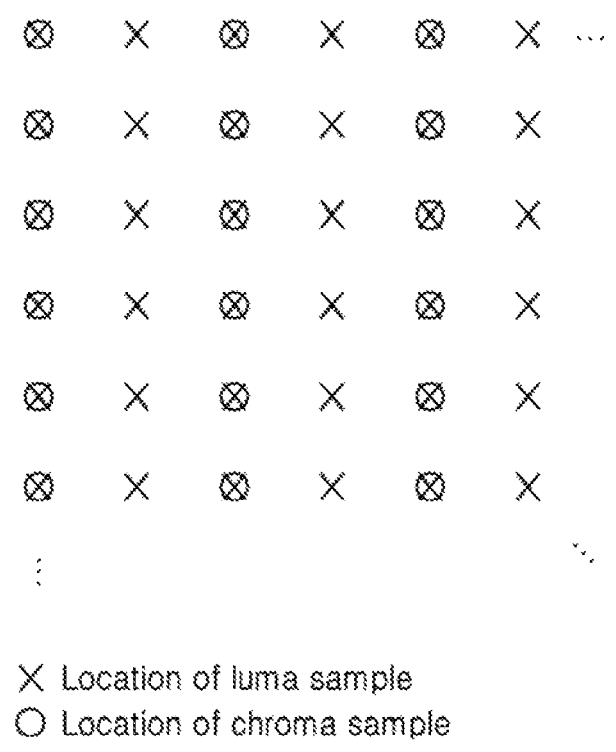

FIG. 19 illustrates locations of luma samples and locations of chroma samples based on a 4:2:2 format, according to an embodiment.

Referring to FIG. 19, as described above, in a 4:2:2 format image, ratios of sampling between a luma component and a chroma component in a vertical direction are equal, but a ratio of sampling of a chroma component in a horizontal direction is ½ of a ratio of sampling of a luma component. That is, only one chroma component is sampled with respect to two luma components in a horizontal direction. Accordingly, in the 4:2:2 format image, resolutions of a luma component and a chroma component are equal in a vertical direction, but resolution of a chroma component is ½ of that of a luma component in a horizontal direction. When a size of a luma component block is 2N×2N, a size of a chroma component block corresponding thereto is N×2N.

The intra prediction modes described with reference to FIGS. 17 and 18 are set, in consideration of a square shape. However, as described above with reference to FIGS. 3 to 5, according to an embodiment, data units including a coding unit, a prediction unit, and transform units may each have a square shape or a non-square shape. Also, according to a 4:2:2 format, even when a luma component has a square shape, a block of a chroma component corresponding thereto has a non-square shape.

Therefore, according to various embodiments, when a current block has a non-square shape, intra prediction mode candidates are adaptively configured based on a shape of the current block, and then intra prediction is performed by applying the adaptively-configured intra prediction mode candidates.

Figure 23:
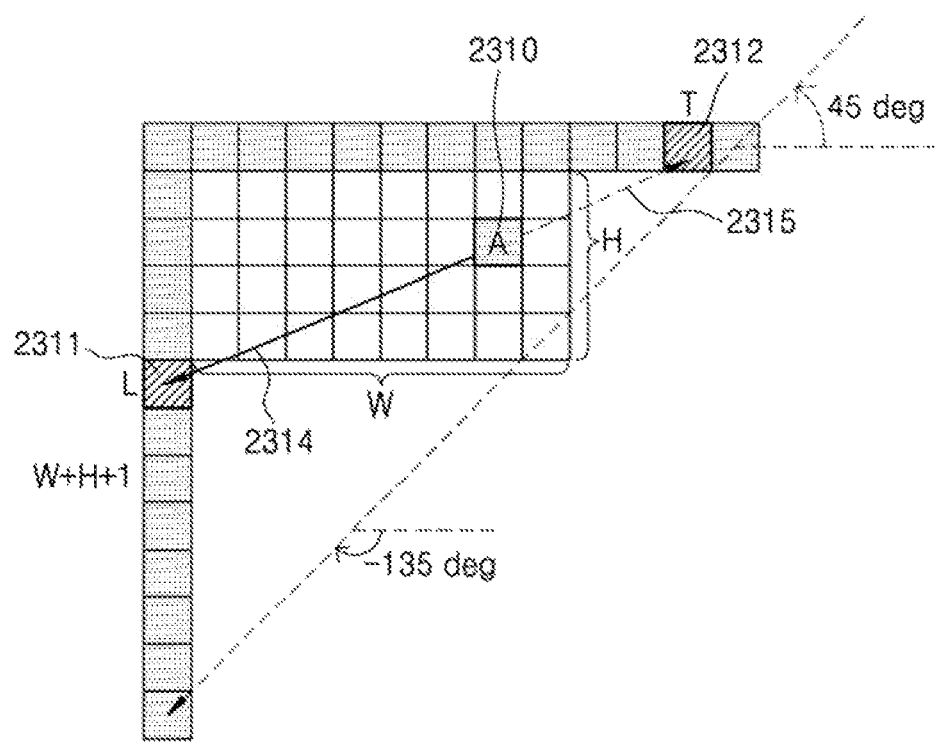
FIG. 23 is a reference diagram of locations of adjacent pixels according to prediction directions of an intra prediction mode when the intra prediction mode that is used to be applied to a square block is applied to a current block in which a width is greater than its height.
Figure 24:
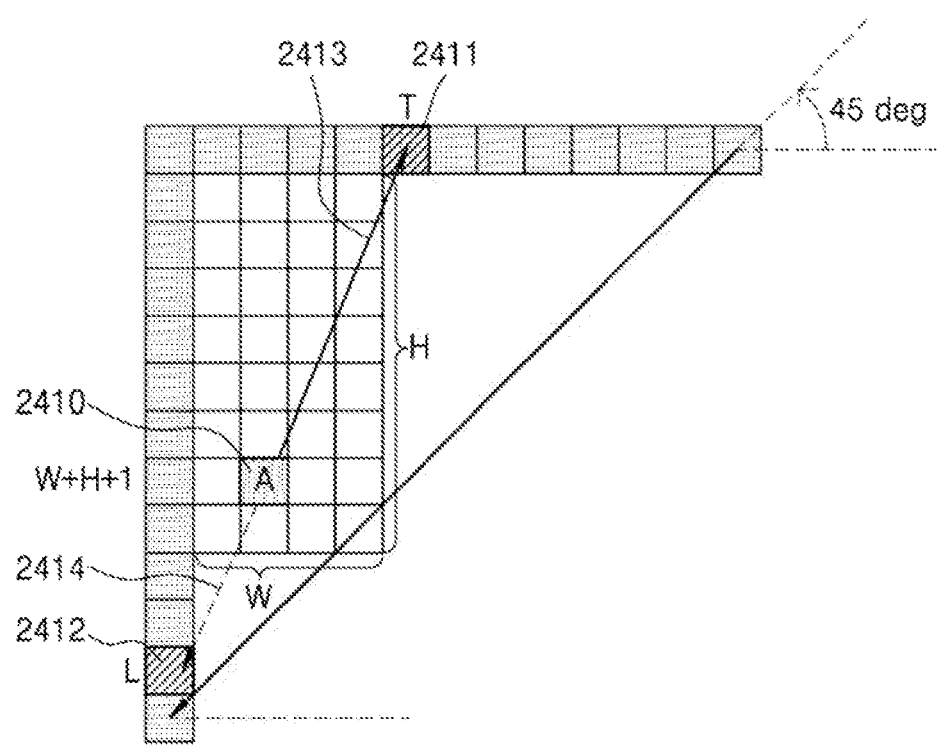
FIG. 24 is a reference diagram of locations of adjacent pixels according to prediction directions of an intra prediction mode when the intra prediction mode that is used to be applied to a square block is applied to a current block in which a height is greater than its width.

FIG. 23 is a reference diagram of locations of adjacent pixels according to prediction directions of an intra prediction mode when the intra prediction mode that is used to be applied to a square block is applied to a current block in which a width is greater than its height, and FIG. 24 is a reference diagram of locations of adjacent pixels according to prediction directions of an intra prediction mode when the intra prediction mode that is used to be applied to a square block is applied to a current block in which a height is greater than its width.

Referring to FIG. 23, the current block is a block having a non-square shape of 8×4 in which a width (W) is 8 and a height (H) is 4. In a case where an intra prediction mode 2314 close to the direction of −135 degrees is applied to a current pixel A 2310 to be intra predicted, the current pixel A 2310 is predicted by using a value of an adjacent pixel L 2311, and an adjacent pixel T 2312 that is spatially closer to the current pixel A 2310 than the adjacent pixel L 2311 and is indicated by an opposite direction 2315 of the intra prediction mode 2314 is not used in intra prediction with respect to the current pixel A 2310. The opposite direction 2315 is a direction that is not included in intra prediction mode prediction directions set between −135 degrees and 45 degrees that are used to be applied to a square block.

Referring to FIG. 24, the current block is a block having a non-square shape of 4×8 in which a width (W) is 4 and a height (H) is 8. When an intra prediction mode 2413 close to 45 degrees is applied to a current pixel A 2410 of the current block which is to be intra predicted, the current pixel A 2410 is predicted by using a value of an adjacent pixel T 2411, and an adjacent pixel L 2412 that is spatially closer to the current pixel A 2410 than the adjacent pixel T 2411 and is indicated by an opposite direction 2414 of the intra prediction mode 2413 is not used in intra prediction with respect to the current pixel A 2410. The opposite direction 2414 is a direction that is not included in prediction directions between −135 degrees and 45 degrees that are used to be applied to a square block.

The prediction directions between −135 degrees and 45 degrees according to the intra prediction mode modes that are used to be applied to a square block equally point to adjacent samples in the top and left sides. Therefore, in a case where the intra prediction modes that are used to be applied to a square block are applied to a non-square block that is a rectangular block, a reference sample at a spatially remote location, instead of an adjacent sample, is used as a prediction value for a current pixel. As described above, the intra prediction modes that are used to be applied to a square block cannot sufficiently point to an adjacent sample in a direction in which one of a width and a height of a block is longer than the other one. For example, intra prediction modes that are applied to a square block and indicate directions between −135 degrees and −180 degrees and between 45 degrees and 180 degrees with respect to directions of 45 degrees and −135 degrees do not include prediction directions between 0 degree and 45 degrees, and thus cannot sufficiently point to a top-right adjacent pixel located at a direction between 0 degree and 45 degrees with respect to a current pixel of a current block in which a width is greater than its height as shown in FIG. 23. Also, the intra prediction modes that are applied to a square block and indicate the directions between −135 degrees and −180 degrees and between 45 degrees and 180 degrees with respect to the directions of 45 degrees and −135 degrees do not include prediction directions between −90 degrees and −135 degrees, and thus cannot sufficiently point to a lower-left adjacent pixel located at a direction between −90 degrees and −135 degrees with respect to a current pixel of a current block in which a height is greater than its width as shown in FIG. 24. Accordingly, when the intra prediction modes that are used to be applied to a square block are applied to a non-square block, intra prediction efficiency may deteriorate.

In order to solve these problems, according to various embodiments, when a current block has a non-square shape, intra prediction modes that are used to be applied to a square block are adaptively changed to configure intra prediction modes that are applicable to a non-square block.

Hereinafter, with reference to FIGS. 20A to 20C, and FIGS. 21 and 22, a process of adaptively configuring intra prediction mode candidates based on a shape of a current block according to an embodiment will now be described.

Figure 20A:
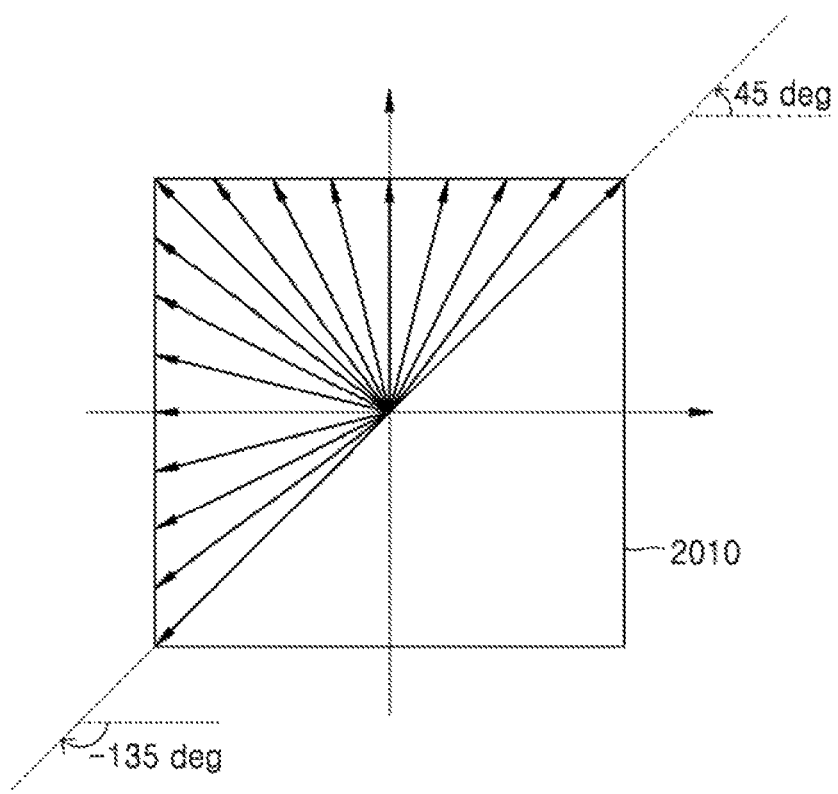
FIG. 20A illustrates intra prediction mode candidates to be applied to a square current block, according to an embodiment.

FIG. 20A illustrates intra prediction mode candidates to be applied to a square current block, according to an embodiment. In a case where a current block 2010 has a square shape in which a width and a height are equal, a predetermined number of intra prediction modes indicating directions between −135 degrees and −180 degrees and between 45 degrees and 180 degrees with respect to directions of 45 degrees and −135 degrees may be applied to an intra prediction mode for the current block 2010. Hereinafter, a group of intra prediction modes that may be applied to a square block may be referred to as first intra prediction mode candidates.

Figure 20B:
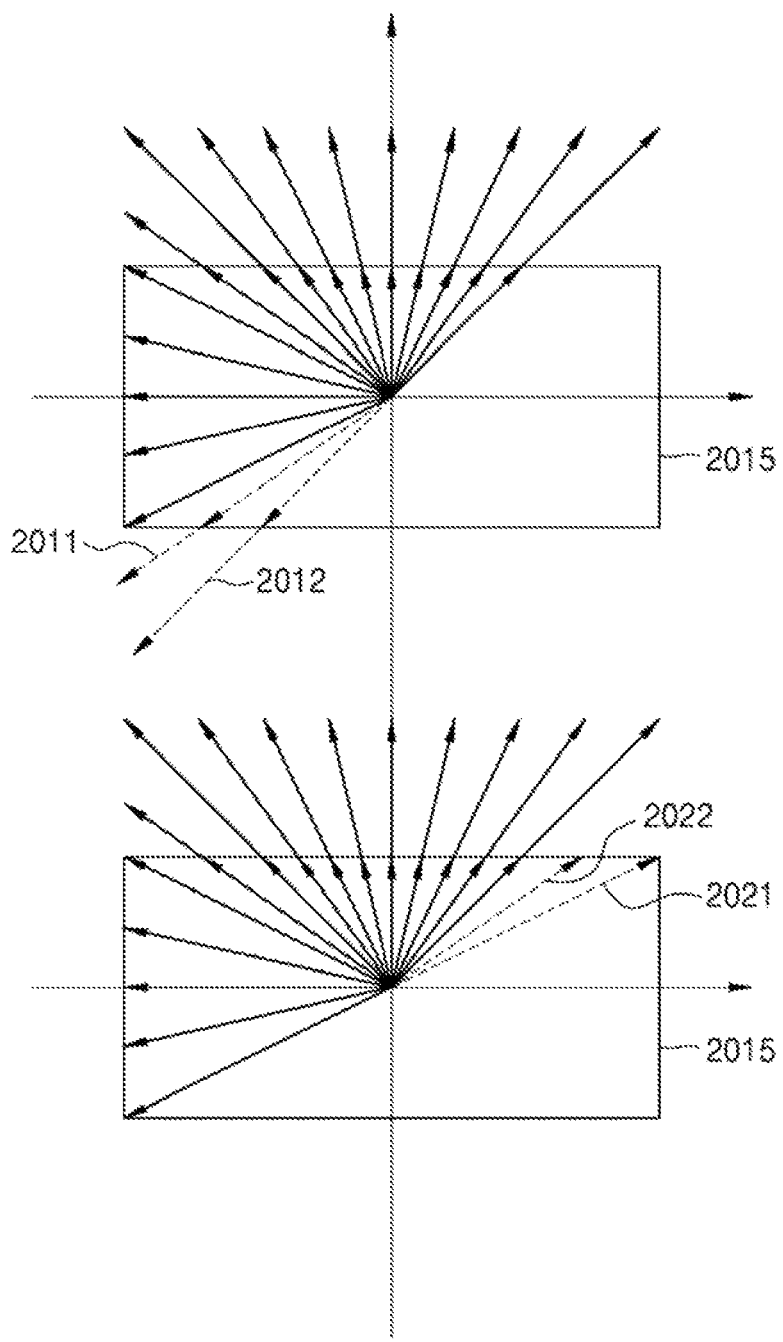
FIG. 20B illustrates methods of configuring intra prediction modes to be applied to a current block whose width is greater than its height, by changing an intra prediction mode that is used to be applied to a square block, according to an embodiment.

FIG. 20B illustrates methods of configuring intra prediction modes to be applied to a current block whose width is greater than its height, by changing an intra prediction mode that is used to be applied to a square block, according to an embodiment.

The upper diagram in FIG. 20B corresponds to a case in which the first intra prediction mode candidates that are used to be applied to a square block are changelessly applied to a rectangular-shape current block 2015. Referring to the upper diagram in FIG. 20B, a predetermined number of intra prediction modes 2011 and 2012 that are included in the first intra prediction mode candidates and indicate a lower-left direction and a direction close to the lower-left direction point to adjacent pixels at spatially-remote locations. Also, when the first intra prediction mode candidates are changelessly applied to the rectangular-shape current block 2015, the first intra prediction mode candidates cannot sufficiently point to adjacent pixels in a direction in which a width is greater than its height. That is, based on the first intra prediction mode candidates, adjacent pixels located in the upper-right side of the rectangular-shape current block 2015 whose width is greater than its height are not used.

Therefore, according to an embodiment, when the current block 2015 has a rectangular shape whose width is greater than its height, instead of a predetermined number of intra prediction modes 2011 and 2012 selected based on a lower-left direction from among the first intra prediction mode candidates, as illustrated in the lower diagram in FIG. 20B, a predetermined number of intra prediction modes 2021 and 2022 indicating particular directions configured based on an upper-right direction other than directions indicated by intra prediction modes included in the first intra prediction mode candidates may be included in second intra prediction mode candidates for the current block 2015. Hereinafter, a group of intra prediction modes being applicable to a non-square block may be referred to as second intra prediction mode candidates.

Figure 20C:
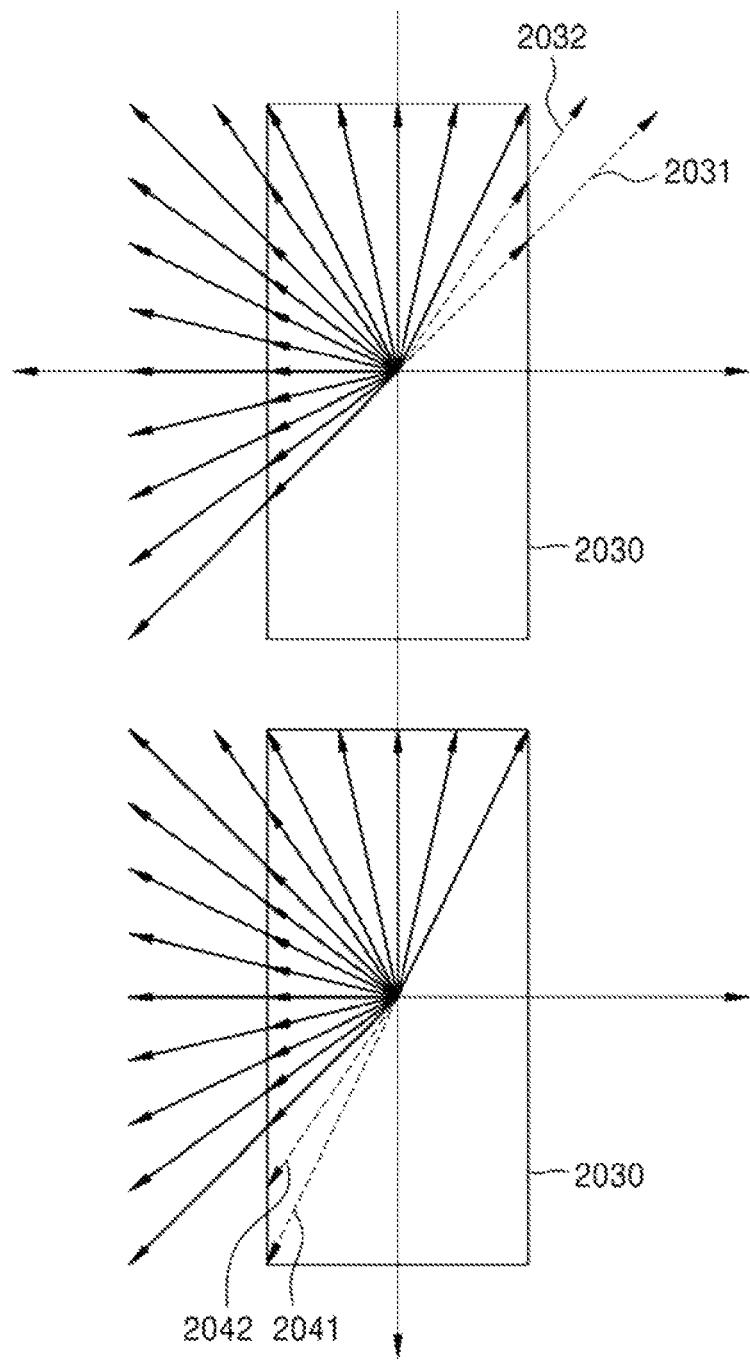
FIG. 20C illustrates methods of configuring intra prediction modes to be applied to a current block whose height is greater than its width, by changing an intra prediction mode that is used to be applied to a square block, according to an embodiment.

FIG. 20C illustrates methods of configuring intra prediction modes to be applied to a current block whose height is greater than its width, by changing an intra prediction mode that is used to be applied to a square block, according to an embodiment.

The upper diagram in FIG. 20C corresponds to a case in which first intra prediction mode candidates are changelessly applied to a rectangular-shape current block 2030. Referring to the upper diagram in FIG. 20C, a predetermined number of intra prediction modes 2031 and 2032 that are included in the first intra prediction mode candidates and point to an upper-right direction and a direction close to the upper-right direction point to adjacent pixels at spatially-remote locations. Also, when the first intra prediction mode candidates are changelessly applied to the rectangular-shape current block 2030, the first intra prediction mode candidates cannot sufficiently point to adjacent pixels in a direction in which a height is greater than its width. That is, based on the first intra prediction mode candidates, adjacent pixels located in the lower-left side of the rectangular-shape current block 2030 whose height is greater than its width are not used.

Therefore, according to an embodiment, when the current block 2030 has a rectangular shape whose height is greater than its width, instead of a predetermined number of intra prediction modes 2031 and 2032 selected based on an upper-right direction from among the first intra prediction mode candidates, as illustrated in the lower diagram in FIG. 20C, a predetermined number of intra prediction modes 2041 and 2042 indicating particular directions configured based on a lower-left direction other than directions indicated by intra prediction modes included in the first intra prediction mode candidates may be included in second intra prediction mode candidates for the current block 2030.

Figure 21:
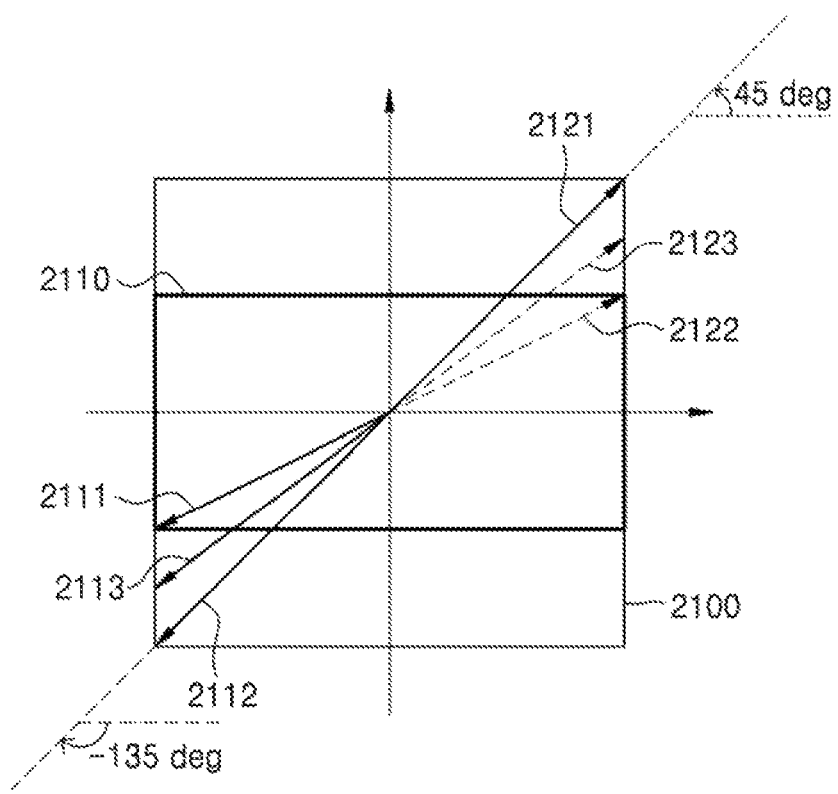
FIG. 21 illustrates a method of configuring intra prediction modes to be applied to a current block whose width is greater than its height, according to an embodiment.

FIG. 21 illustrates a method of configuring intra prediction modes to be applied to a current block whose width is greater than its height, according to an embodiment.

Referring to FIG. 21, intra prediction modes that are to be excluded from second intra prediction mode candidates to be applied to a non-square block 2110 and are from among first intra prediction mode candidates at directions between −135 degrees and −180 degrees and between 45 degrees and 180 degrees to be applied to a square block 2100 may be selected in an order of indicating directions close to −135 degrees with respect to the lower-left direction of −135 degrees. Referring to FIG. 21, a predetermined number of intra prediction modes 2112 and 2113 may be excluded from the second intra prediction mode candidates, the predetermined number of intra prediction modes 2112 and 2113 being from among intra prediction mode modes that indicate directions between a direction 2111 indicating a lower-left vertex from a center of the non-square block 2110 and the direction of −135 degrees 2112 deviating from the lower-left vertex from the center of the non-square block 2110. A number of intra prediction modes that are from among the first intra prediction modes and are to be excluded from the non-square block 2110 may be changed, in consideration of the number of all of predetermined angular intra prediction modes.

Instead of the intra prediction modes 2112 and 2113 excluded from the second intra prediction mode candidates, intra prediction modes 2122 and 2123 indicating directions that cannot be indicated by the first intra prediction mode candidates may be included in the second intra prediction mode candidates. The directions that cannot be indicated by the first intra prediction mode candidates may be directions between 0 degree and 45 degrees. The intra prediction modes 2122 and 2123 that are newly added to the second intra prediction mode candidates may be selected in a direction opposite to directions of the intra prediction modes 2112 and 2113 excluded from the first intra prediction mode candidates, i.e., at a direction opposite by 180 degrees.

Figure 22:
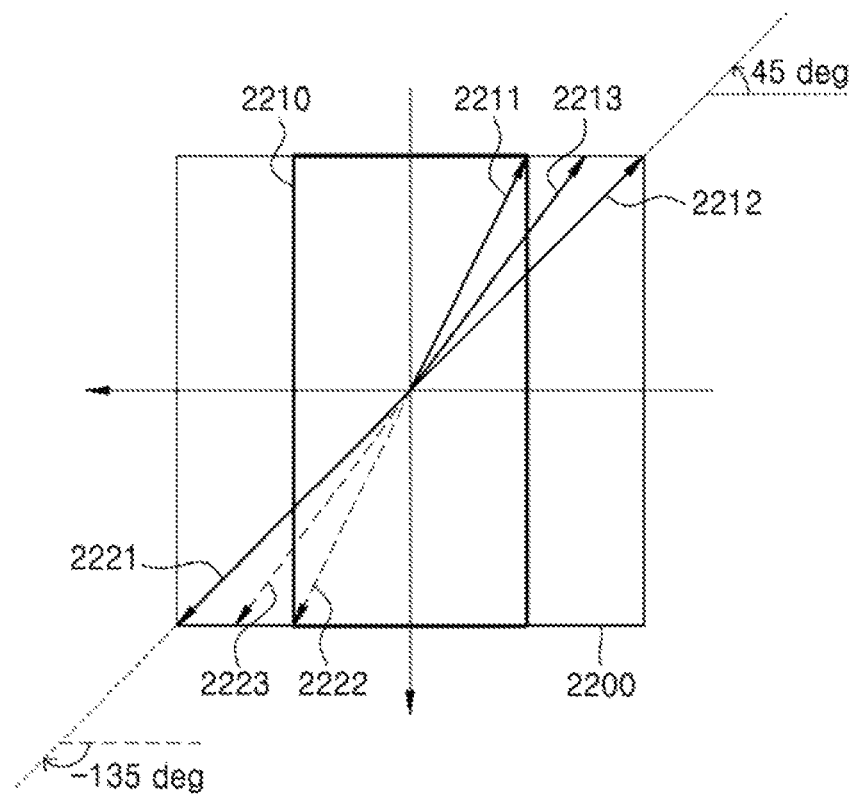
FIG. 22 illustrates a method of configuring intra prediction modes to be applied to a current block whose height is greater than its width, according to an embodiment.

FIG. 22 illustrates a method of configuring intra prediction modes to be applied to a current block whose height is greater than its width, according to an embodiment.

Referring to FIG. 22, intra prediction modes that are to be excluded from second intra prediction mode candidates to be applied to a non-square block 2210 and are from among first intra prediction mode candidates at directions between −135 degrees and −180 degrees and between 45 degrees and 180 degrees, i.e., at a direction between 45 degrees and 225 degrees, to be applied to a square block 2200 may be selected in an order of indicating directions close to 45 degrees with respect to the upper-right direction of 45 degrees. Referring to FIG. 22, a predetermined number of intra prediction modes 2212 and 2213 may be excluded from the second intra prediction mode candidates, the predetermined number of intra prediction modes 2212 and 2213 being from among intra prediction mode modes that indicate directions between a direction 2211 pointing to a top-right vertex from a center of the non-square block 2210 and a direction of 45 degrees 2212 deviating from the top-right vertex from the center of the non-square block 2210. A number of intra prediction modes that are from among the first intra prediction modes and are to be excluded from the non-square block 2210 may be changed, in consideration of the number of all of predetermined angular intra prediction modes.

Instead of the intra prediction modes 2212 and 2213 excluded from the second intra prediction mode candidates, intra prediction modes 2222 and 2223 indicating directions that cannot be indicated by the first intra prediction mode candidates may be included in the second intra prediction mode candidates.

The directions that cannot be indicated by the first intra prediction mode candidates may be directions between −90 degrees and −135 degrees. The intra prediction modes 2222 and 2223 that are newly added to the second intra prediction mode candidates may be selected at a direction opposite to directions of the intra prediction modes 2212 and 2213 included in the first intra prediction mode candidates, i.e., at a direction opposite by 180 degrees.

Also, the second intra prediction mode candidates may include a plurality of intra prediction modes predetermined based on a ratio of a width and a height of a current block. For example, when the ratio of the width and the height of the current block is 1:n or n:1 (where n is a positive integer), based on a ratio of the width and the height according to a value of n, intra prediction modes may be included in the second intra prediction mode candidates, the intra prediction modes indicating predetermined particular directions between a first intra prediction direction and a second intra prediction direction based on the ratio of the width and the height of the current block, wherein the first intra prediction direction points to a bottom-left vertex from a center of the current block and the second intra prediction direction points to a top-right vertex from the center of the current block.

Figure 25A:
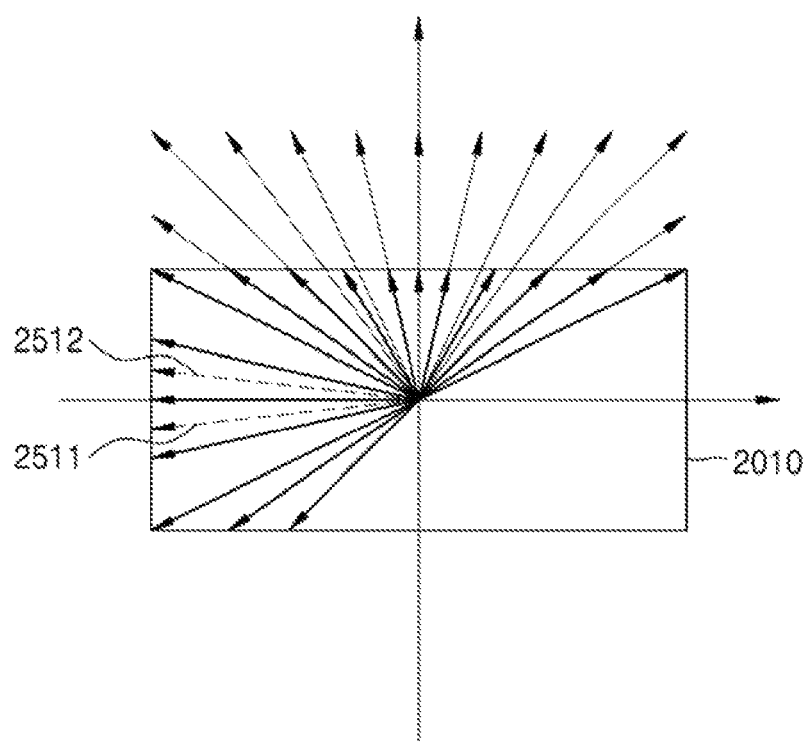
FIG. 25A illustrates a method of configuring intra prediction modes to be applied to a current block whose width is greater than its height, according to another embodiment.
Figure 25B:
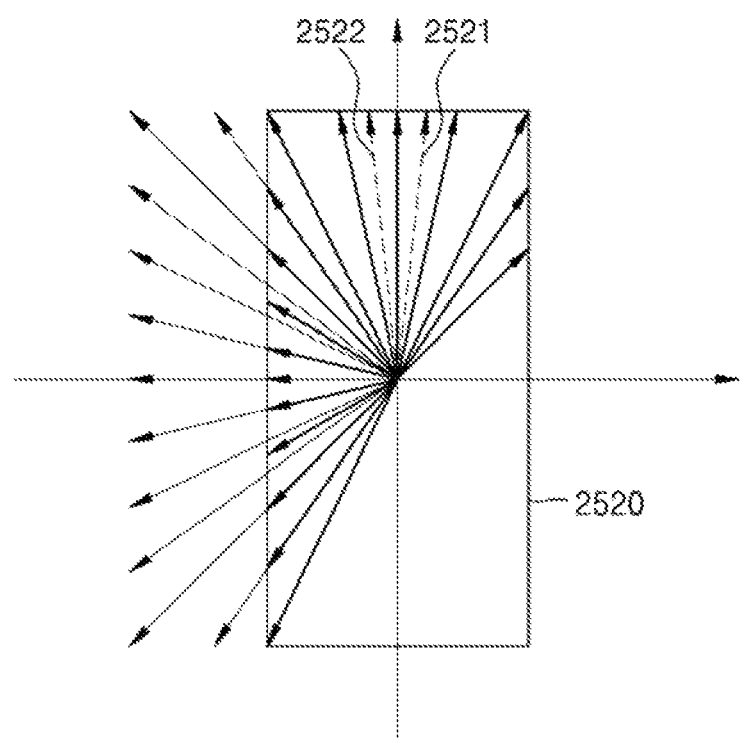
FIG. 25B illustrates a method of configuring intra prediction modes to be applied to a current block whose height is greater than its width, according to another embodiment.

FIG. 25A illustrates a method of configuring intra prediction modes to be applied to a current block whose width is greater than its height, according to another embodiment, and FIG. 25B illustrates a method of configuring intra prediction modes to be applied to a current block whose height is greater than its width, according to another embodiment.

An intra prediction mode of a current block may be statistically related to a shape of the current block. For example, as in an image including stripes in a horizontal direction, when the image has a strong horizontal component, a shape thereof which is determined based on a RD-cost may be determined to be a flat rectangular shape in which a width is greater than its height, and an intra prediction mode therefor may be determined to be an intra prediction mode pointing to a horizontal direction or a direction close to the horizontal direction. In contrast, as in an image including stripes in a vertical direction, when the image has a strong vertical component, a shape thereof may be determined to be a rectangular shape in which a height is greater than its width, and an intra prediction mode therefor may be determined to be an intra prediction mode pointing to a vertical direction or a direction close to the vertical direction.

Therefore, according to another embodiment, second intra prediction mode candidates to be applied to a non-square current block may further densely set prediction directions indicating a shorter one from among a width and a height. For example, as in FIG. 25A, when a current block 2010 has a non-square shape in which a width is greater than its height, the second intra prediction mode candidates may further include intra prediction modes 2511 and 2512 pointing to directions close to a horizontal direction, in addition to first intra prediction mode candidates. Also, as in FIG. 25B, when a current block 2520 has a non-square shape in which a height is greater than its width, the second intra prediction mode candidates may further include intra prediction modes 2521 and 2522 pointing to directions close to a vertical direction, in addition to first intra prediction mode candidates.

Figure 26A:
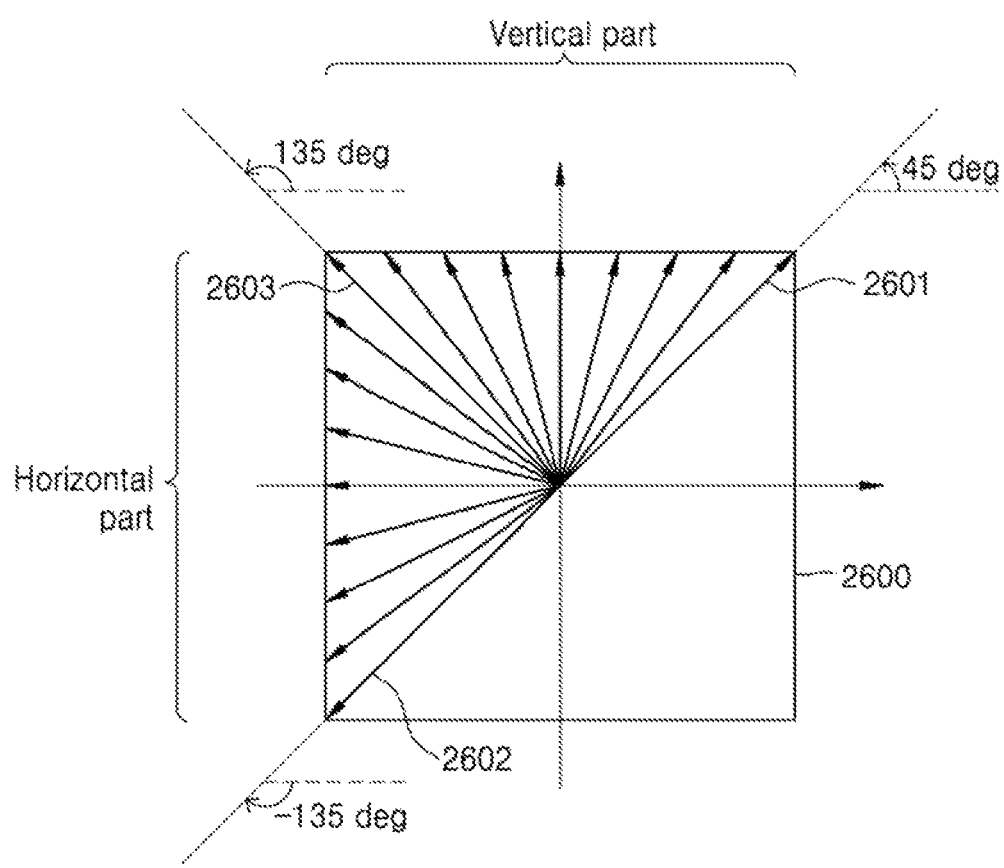
FIG. 26A illustrates a method of dividing an intra prediction mode to a horizontal part and a vertical part, the intra prediction mode being to be applied to a block, according to various embodiments.

FIG. 26A illustrates a method of dividing an intra prediction mode to a horizontal part and a vertical part, the intra prediction mode being to be applied to a block, according to various embodiments.

Referring to FIG. 26A, intra prediction modes to be applied to a square block 2600 includes vertical-part intra prediction modes configured by dividing angles between 45 degrees angle and 135 degrees, and horizontal-part intra prediction modes configured by dividing angles between 135 degrees and 225 degrees, i.e., angles between 135 degrees and 180 degrees and between −135 degrees and −180 degrees, based on a first intra prediction mode 2601 in a 45-degree direction pointing to a top-right vertex, a second intra prediction mode 2603 in the direction of 135 degrees, and a third intra prediction mode 2602 in the direction of −135 degrees. The vertical-part intra prediction modes may include intra prediction modes indicating directions obtained by dividing angles between 45 degrees and 135 degrees. For example, intra prediction modes that are an intra prediction mode of a 90-degree direction which is obtained by bisecting a gap between a 45-degree direction and a 135-degree direction, an intra prediction mode obtained by bisecting a gap between a 45-degree direction and a 90-degree direction, and an intra prediction mode obtained by bisecting a gap between a 90-degree direction and a 135-degree direction may be sequentially included in the vertical-part intra prediction modes. As described above, the vertical-part intra prediction modes may be configured by sequentially dividing the gap between a 45-degree direction and a 135-degree direction. The number of times of dividing the gap between a 45-degree direction and a 135-degree direction may be determined, in consideration of the number of all intra prediction modes.

Similarly, the horizontal-part intra prediction modes may include intra prediction modes indicating directions obtained by dividing the gap between a 135-degree direction and a 225-degree direction, i.e., the gaps between 135 degrees and 180 degrees and between −135 degrees and −180 degrees. For example, intra prediction modes that are an intra prediction mode of a 180-degree direction (a −180-degree direction) which is obtained by bisecting a gap between a −135-degree direction and a 135-degree direction, an intra prediction mode obtained by bisecting a gap between a 135-degree direction and a 180-degree direction, and an intra prediction mode obtained by bisecting a gap between a −135-degree direction and a −180-degree direction may be sequentially included in the horizontal-part intra prediction modes. As described above, the horizontal-part intra prediction modes may be configured by sequentially dividing the gap between a 135-degree direction and a 225-degree direction, i.e., the gaps between 135 degrees and 180 degrees and between −135 degrees and −180 degrees. The number of times of dividing angles between −135 degrees and 135 degrees may be determined, in consideration of the number of all intra prediction modes. In particular, in a case of intra prediction modes to be applied to a square block, the number of vertical-part intra prediction modes and the number of horizontal-part intra prediction modes may be set to be equal.

Figure 26B:
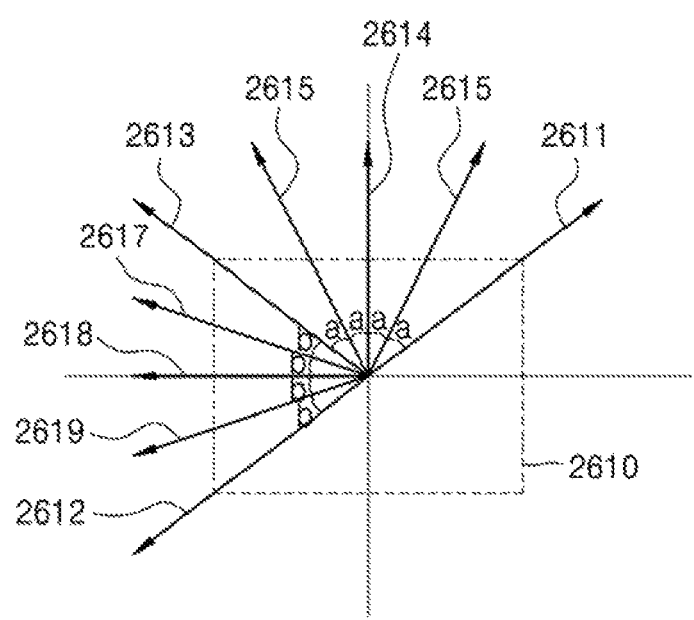
FIG. 26B illustrates a method of configuring intra prediction modes to be applied to a current block whose width is greater than its height, according to another embodiment.
Figure 26C:
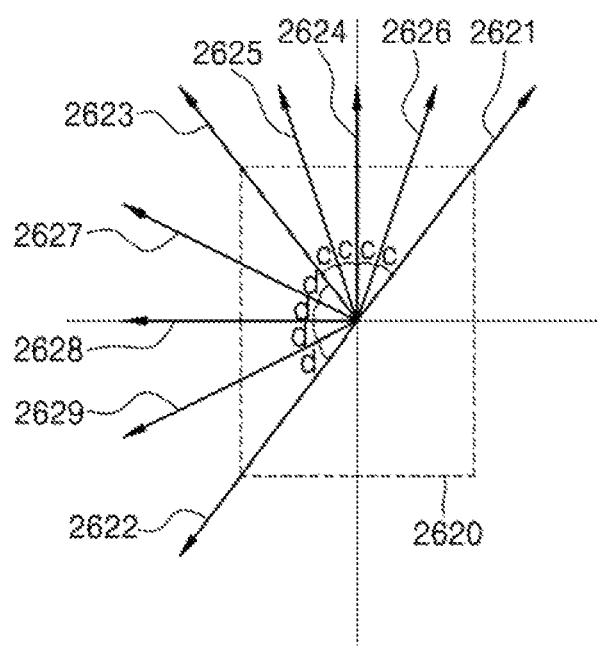
FIG. 26C illustrates a method of configuring intra prediction modes to be applied to a current block whose height is greater than its width, according to another embodiment.

FIG. 26B illustrates a method of configuring intra prediction modes to be applied to a current block whose width is greater than its height, according to another embodiment, and FIG. 26C illustrates a method of configuring intra prediction modes to be applied to a current block whose height is greater than its width, according to another embodiment.

Referring to FIG. 26B, second intra prediction mode candidates to be applied to a current block 2610 whose width is greater than its height may include vertical-part intra prediction modes 2614, 2615, and 2616 configured by sequentially bisecting gaps between a top-right vertex direction 2611 and a top-left vertex direction 2613, and horizontal-part intra prediction modes 2617, 2618, and 2619 configured by sequentially bisecting gaps between the top-left vertex direction 2613 and a bottom-left vertex direction 2612, based on an intra prediction mode indicating the top-right vertex direction 2611 from a center of the current block 2610, an intra prediction mode indicating the top-left vertex direction 2613 from the center of the current block 2610, and an intra prediction mode indicating the bottom-left vertex direction 2612 from the center of the current block 2610.

The number of times of dividing the gaps between the top-right vertex direction 2611 and the top-left vertex direction 2613, and the number of times of dividing the gaps between the top-left vertex direction 2613 and the bottom-left vertex direction 2612 may be determined, in consideration of the number of all intra prediction modes. Similar to the descriptions of FIG. 25A, the number of horizontal-part intra prediction modes may be set to be greater than the number of vertical-part intra prediction modes in the second intra prediction mode candidates to be applied to the current block 2610 whose width is greater than its height.

Referring to FIG. 26C, second intra prediction mode candidates to be applied to a current block 2620 whose height is greater than its width may include vertical-part intra prediction modes 2624, 2625, and 2626 configured by sequentially bisecting gaps between a top-right vertex direction 2621 and a top-left vertex direction 2623, and horizontal-part intra prediction modes 2627, 2628, and 2629 configured by sequentially bisecting gaps between the top-left vertex direction 2623 and a bottom-left vertex direction 2622, based on an intra prediction mode indicating the top-right vertex direction 2621 from a center of the current block 2620, an intra prediction mode indicating the top-left vertex direction 2623 from the center of the current block 2620, and an intra prediction mode indicating the bottom-left vertex direction 2622 from the center of the current block 2620.

The number of times of dividing the gaps between the top-right vertex direction 2621 and the top-left vertex direction 2623, and the number of times of dividing the gap between the top-left vertex direction 2623 and the bottom-left vertex direction 2622 may be determined, in consideration of the number of all intra prediction modes. Similar to the descriptions of FIG. 25B, the number of vertical-part intra prediction modes may be set to be greater than the number of horizontal-part intra prediction modes in the second intra prediction mode candidates to be applied to the current block 2620 whose height is greater than its width.

According to various embodiments, an intra prediction mode in a horizontal or vertical direction is generally determined as an intra prediction mode for a block, such that intra prediction modes may be set to densely indicate horizontal or vertical directions.

FIG. 27 illustrates a look-up table showing mapping relations between intra prediction mode indices (predModeIntra) and angle parameters (IntraPredAngle) according to intra prediction modes, according to an embodiment, and FIG. 28 illustrates a look-up table showing mapping relations between intra prediction mode indices (predModeIntra) and angle parameters (IntraPredAngle) according to intra prediction modes, according to another embodiment.

A particular direction of intra prediction modes according to various embodiments described above may be represented by using an angle parameter IntraPredAngle about a particular direction based on an intra prediction mode index (predModeIntra), except for a vertical direction of 90 degrees and a horizontal direction of 180 degrees. For example, a direction of horizontal-part intra prediction modes may have a direction of tan-1(intraPredAngle/fixed number) by using a fixed number in a horizontal direction and an angle parameter IntraPredAngle in a vertical direction, and a direction of vertical-part intra prediction modes may have a direction of tan-1(fixed number/intraPredAngle) by using an angle parameter IntraPredAngle in a horizontal direction and a fixed number in a vertical direction. In this regard, the fixed number may be a power of 2. For example, the fixed number may be one of 32, 64, and 128.

Figure 29:
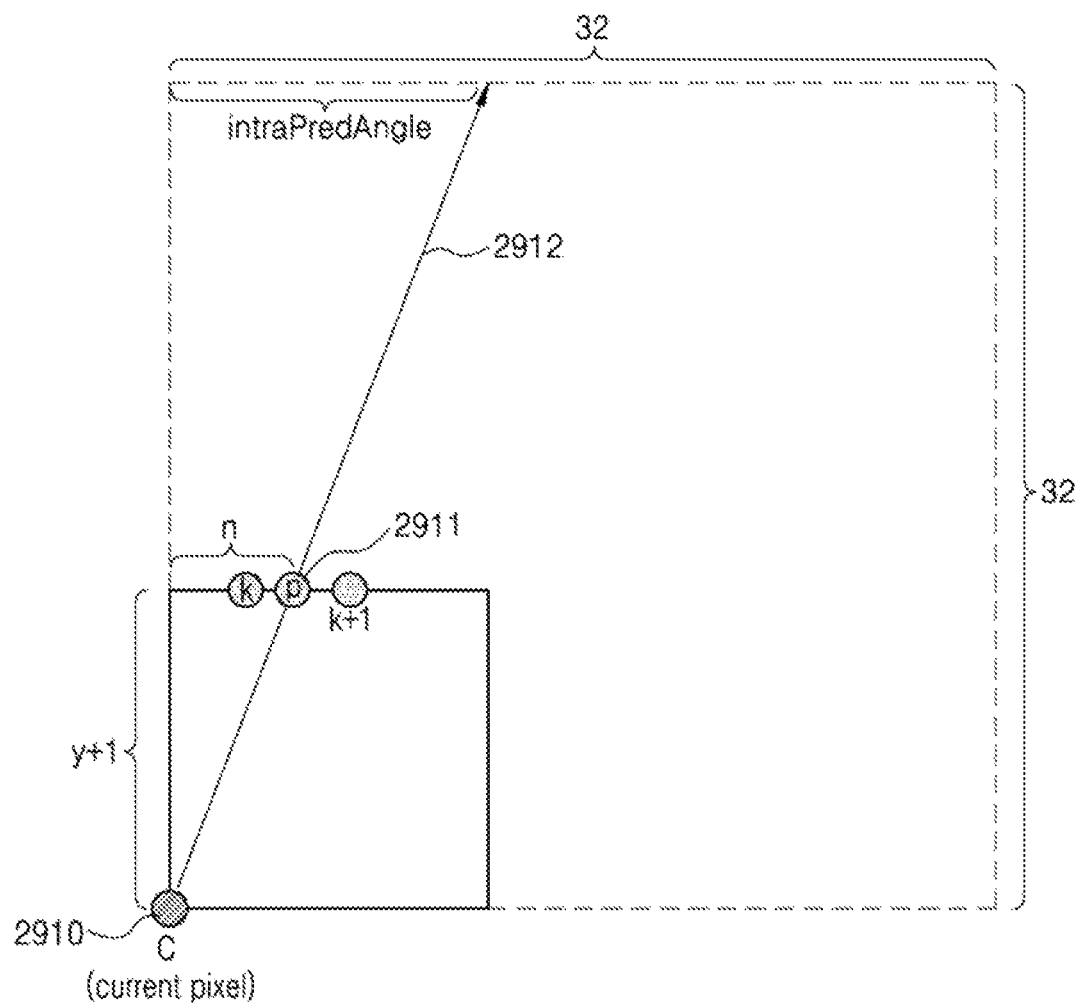
FIG. 29 is a reference diagram for describing angle parameters IntraPredAngle related to intra prediction mode directions, according to embodiments.

FIG. 29 is a reference diagram for describing angle parameters IntraPredAngle related to intra prediction mode directions, according to embodiments.

A prediction direction based on an intra prediction mode may be indicated by using a fixed number in a horizontal direction and angle parameter IntraPredAngle in a vertical direction, or may be indicated by using angle parameter IntraPredAngle in a horizontal direction and a fixed number in a vertical direction. For example, referring to FIG. 29, a particular direction 2912 with respect to a current pixel 2910 has the angle of $\tan^{-1}(32/\text{intraPredAngle})$ (deg) or $(90-\tan^{-1}(32/\text{intraPredAngle}))$ (deg) by using angle parameter IntraPredAngle in a horizontal direction and a fixed number of 32 in a vertical direction.

In intra prediction, an adjacent pixel may be determined by using a fixed number and angle parameter IntraPredAngle.

A process of determining an adjacent pixel 2911 pointed by the particular direction 2911 with respect to the current pixel 2910 will now be described. It is assumed that a location difference in a vertical direction between the current pixel 2910 and the adjacent pixel 2911 is n. In this regard, based on a trigonometrical function, a proportional relationship corresponding to (y+1): n=32: intraPredAngle is established. From the proportional relationship, n=(y+1)*intraPredAngle/32 may be derived. An operation of n=(y+1)*intraPredAngle/32 may be performed through a bit operation as n=(y+1)*intraPredAngle>>5. In this manner, a location of an adjacent pixel may be determined by using intraPredAngle provided that a size of a current block and a location of the current pixel 2910 are known.

When a value of (y+1)*intraPredAngle is a multiple of 32, p indicates an adjacent pixel at an integer location, and when the value of (y+1)*intraPredAngle is not a multiple of 32, a particular direction based on intraPredAngle indicates a gap between two adjacent pixels (k and k+1). When the particular direction based on intraPredAngle indicates the gap between the two adjacent pixels (k and k+1), a weighted average value of the two adjacent pixels (k and k+1) may be used as a prediction value of the current pixel 2910.

In intra prediction, an adjacent pixel in a particular direction is used as a reference pixel, i.e., a prediction value, for the current pixel 2910. On condition of a fixed number in a horizontal or vertical direction, directions of angular intra prediction modes may be indicated by using one parameter of angle parameter IntraPredAngle. Therefore, as described above with reference to FIGS. 27 and 28, angle parameter IntraPredAngle indicating particular directions of angular intra prediction modes corresponding to intra prediction mode indices (predModeIntra) of intra prediction modes may be predetermined in the form of a look-up table.

It is assumed that a value of an intra prediction mode index predModeIntra is A (where A is an integer), the intra prediction mode index predModeIntra indicating an intra prediction mode to be substituted when an intra prediction mode included in first intra prediction mode candidates is to be applied to a non-square shape. Instead of a first intra prediction mode to be substituted, a value of an intra prediction mode index indicating an intra prediction mode included in second intra prediction mode candidates may have a value obtained by adding a predetermined value a (where a is an integer) to A or by subtracting the predetermined value a from A. Also, a value of IntraPredAngle indicating a particular direction of a second intra prediction mode candidate that is to be substituted for predModeIntra and has a value of A+a or A−a may be set. For example, referring to FIG. 28, an intra prediction mode in which a value of predModeIntra included in the first intra prediction mode candidates is 2 refers to an intra prediction mode whose intraPredAngle is 32 and that indicates the direction of −135 degrees in the lower left side. For a non-square block whose width is greater than its height, intra prediction modes in the vicinity of the direction of −135 degrees may be substituted. In this case, 67 that is a value obtained by adding a predetermined value of 65 to predModeIntra may be determined as a value of predModeIntra for a non-square block, and when predModeIntra is 67, 35 is allocated to a value of IntraPredAngle, thereby indicating second intra prediction mode candidates. In other words, for the non-square block, a value of IntraPredAngle indicating a particular direction based on a second intra prediction mode candidate to be substituted may be set for PredModeIntra+a or PredModeIntra−a, instead of intraPredAngle indicated by previous predModeIntra.

According to another embodiment, second intra prediction mode candidates may include a plurality of intra prediction modes predetermined based on a ratio of a width and a height of a current block. When the ratio of the width and the height of the current block is 1:n or n:1 (where n is a positive integer), intra prediction modes indicating particular directions predetermined based on a ratio of the width and the height according to a value of n may be included in the second intra prediction mode candidates.

According to another embodiment, when a luma component and a chroma component are each split to data units having different shapes, intra prediction mode candidates to be applied to a luma component block and intra prediction mode candidates to be applied to a chroma component block may be independently determined based on a shape and a ratio of respective luma component blocks and respective chroma component blocks.

Figure 30:
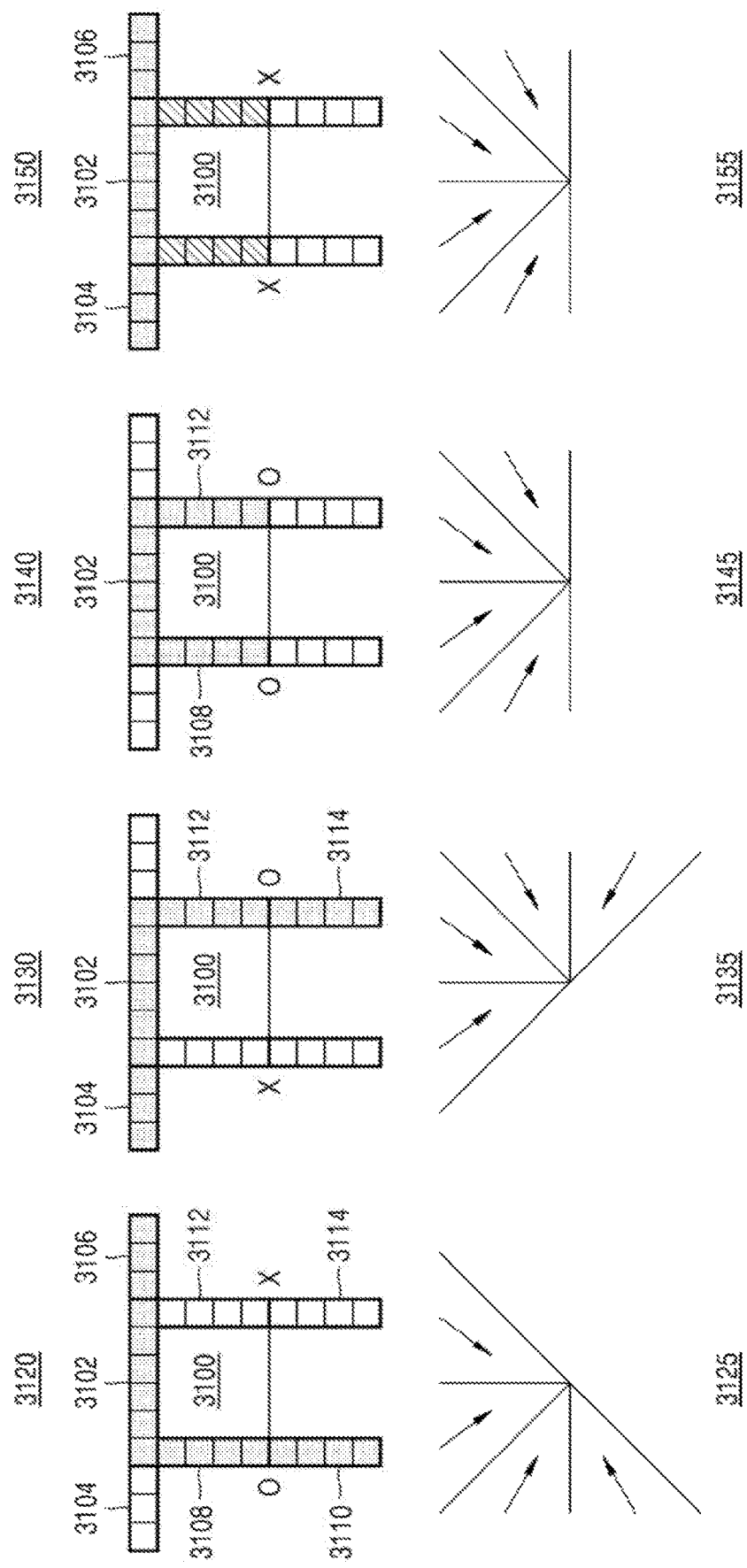
FIG. 30 illustrates a method of determining reference samples for angular intra prediction modes.

FIG. 30 illustrates a method of determining reference samples for angular intra prediction modes.

First embodiment 3120 indicates reference samples 3102, 3106, 3108, and 3110 to be used in intra prediction when blocks in an upper row and a left block are reconstructed. In First embodiment 3120, the reference samples 3102 and 3106 of the reconstructed upper blocks and the reference samples 3108 of the reconstructed left block may be used in intra prediction. The reference samples 3110 of a lower-left block may be used only when the lower-left block is reconstructed, or reference samples of a reconstructed left block may be copied and used. In order to use the reference samples 3102, 3106, 3108, and 3110, prediction directions included in a first intra prediction direction group 3125 may be used in intra prediction with respect to a current block 3100.

Second embodiment 3130 indicates reference samples 3102, 3104, 3112, and 3114 to be used in intra prediction when blocks in an upper row and right blocks are reconstructed. In Second embodiment 3130, the reference samples 3102 and 3104 of the reconstructed upper blocks and the reference samples 3112 of the reconstructed right blocks may be used in intra prediction. The reference samples 3114 of a lower-right block may be used only when the lower-right block is reconstructed, or reference samples of a reconstructed right block may be copied and used. In order to use the reference samples 3102, 3104, 3112, and 3114, prediction directions included in a second intra prediction direction group 3135 may be used in intra prediction with respect to the current block 3100.

Third embodiment 3140 indicates reference samples 3102, 3108, and 3112 to be used in intra prediction when an upper block, a right block, and a left block are reconstructed. In Third embodiment 3140, the reference samples 3102 of the upper block, the reference samples 3108 of the left block, and the reference samples 3112 of the right block may be used in intra prediction. Prediction directions included in a third intra prediction direction group 3145 may be used in intra prediction with respect to the current block 3100.

According to First embodiment 3120 and Second embodiment 3130, when the reference samples 3110 of the lower-left block and the reference samples 3114 of the lower-right block are unavailable, prediction accuracy may be decreased. However, in Third embodiment 3140, all of the reference samples 3102, 3108, and 3112 to be used are adjacent to the current block 3100, such that prediction accuracy may be relatively high, compared to other embodiments.

Fourth embodiment 3150 indicates reference samples 3102, 3104, and 3106 to be used in intra prediction when only blocks in an upper row are reconstructed. In Fourth embodiment 3150, only the reference samples 3102, 3104, and 3106 of the reconstructed upper blocks may be used in intra prediction. Prediction directions included in a fourth intra prediction direction group 3155 may be used in intra prediction with respect to the current block 3100.

Unlike Third embodiment, in Fourth embodiment 3150, reference samples that are adjacent to the current block 3100 are only the reference samples 3102 of the upper block. Also, the reference samples 3104 and 3106 are spatially distant from the current block 3100, such that prediction accuracy may deteriorate, compared to other embodiments 3120, 3130, and 3140. Therefore, an intra prediction method to be used for Fourth embodiment 3150 may be a vertical mode using the reference samples 3102 of the upper block, which are adjacent to the current block 3100, or may be an angular prediction mode pointing to a direction adjacent to the vertical mode.

In Z encoding order, an intra prediction method according to First embodiment 3120 is used, but, when encoding orders of two blocks being horizontally adjacent to each other are swapped, a right block may be first predicted by using an intra prediction method according to Fourth embodiment 3150. After the right block is reconstructed, a left block may be reconstructed by being predicted using an intra prediction method according to Third embodiment 3140.

In this manner, according to embodiments, when locations of reference samples are changed due to a change in processing orders, intra prediction modes may be adaptively reconfigured based on locations of the reference samples. For example, when the blocks in the upper row and the right blocks are reconstructed as in Second embodiment 3130, intra prediction mode candidates indicating particular directions between −135 degrees and −180 degrees and between 45 degrees and 180 degrees in the prediction directions included in the second intra prediction direction group 3135 may be used in intra prediction with respect to the current block 3100. Also, when the upper block, the right block, and the left block are reconstructed as in Third embodiment 3140, intra prediction mode candidates indicating particular directions between 0 degree and 180 degrees in the prediction directions included in the third intra prediction direction group 3145 may be used in intra prediction with respect to the current block 3100. Also, when only the reference samples 3102 of the upper block adjacent to a current block are available as in Fourth embodiment 3150, vertical part intra prediction modes, e.g., intra prediction mode candidates indicating directions between 45 degrees and 135 degrees may be used in intra prediction with respect to the current block 3100.

Also, according to embodiments, in a case where the current block 3100 has a non-square shape whose width is greater than its height, a predetermined number of intra prediction modes indicating particular directions configured based on an upper-right direction may be used, instead of a predetermined number of intra prediction modes that are selected based on a lower-left direction and are used to be applied to a square shape. Also, in a case where the current block 3100 has a non-square shape whose height is greater than its width, a predetermined number of intra prediction modes indicating particular directions configured based on a lower-left direction other than directions indicated by the first intra prediction mode candidates may be used, instead of a predetermined number of intra prediction modes that are selected from among the first intra prediction mode candidates based on an upper-right direction.

Also, according to embodiments, whether to reconfigure intra prediction mode candidates to be applied to a non-square block may be determined based on availability of adjacent pixels of a current block. In this regard, the availability may be determined based on whether an adjacent pixel is a pixel included in a slice or tile different from the current block, or included in an inter-predicted block. For example, when an adjacent pixel is a pixel included in the slice or tile different from the current block, or included in the inter-predicted block, the adjacent pixel may be determined as an unavailable adjacent pixel.

According to embodiments, in a case where a width of a current block is greater than its height, when an adjacent pixel located in the upper right side is unavailable, the first intra prediction mode candidates that are used to be applied to a square block are changelessly applied to the non-square current block, and when an adjacent pixel located in the upper right side is available, intra prediction may be performed on the non-square current block by using the second intra prediction mode candidates obtained by reconfiguring the first intra prediction mode candidates that are used to be applied to a square block.

According to embodiments, in a case where a height of a current block is greater than its width, when an adjacent pixel located in the lower left side is unavailable, the first intra prediction mode candidates that are used to be applied to a square block are changelessly applied to the non-square current block, and when an adjacent pixel located in the lower left side is available, intra prediction may be performed on the non-square current block by using the second intra prediction mode candidates obtained by reconfiguring the first intra prediction mode candidates that are used to be applied to a square block.

Also, according to another embodiment, whether to reconfigure intra prediction mode candidates to be applied to a non-square block may be signaled via separate flag information.

Figure 31:
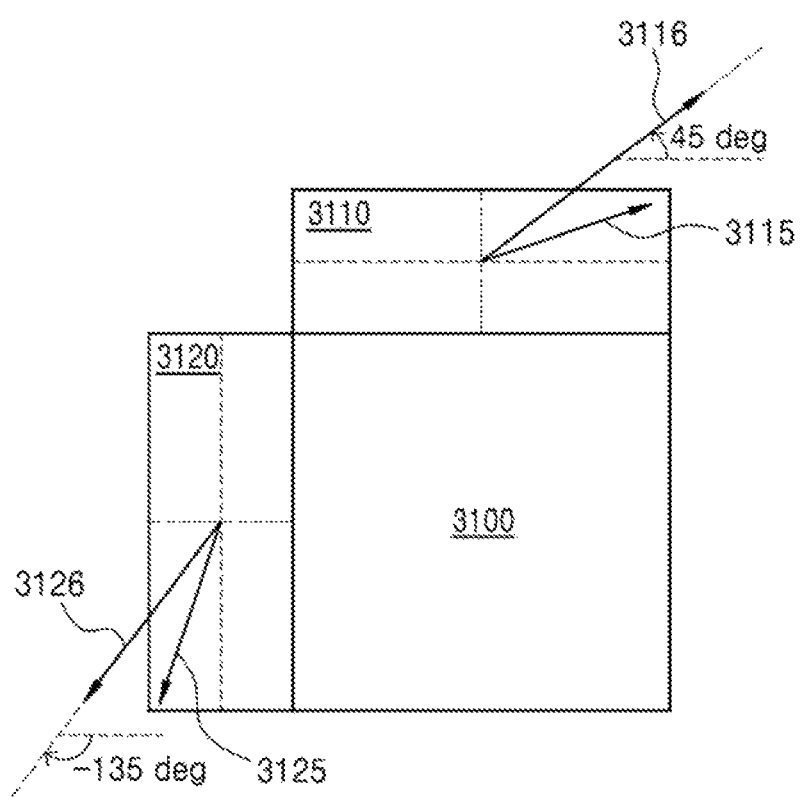
FIG. 31 is a diagram for describing a method of determining an intra prediction mode of an adjacent block when a most probable mode (MPM) is applied.

FIG. 31 is a diagram for describing a method of determining an intra prediction mode of an adjacent block when an MPM is applied.

In general, it is highly probable that a current block and an adjacent block have a similar image characteristic. Therefore, the MPM refers to intra prediction mode candidates being highly probable to be an intra prediction mode of the current block. The MPM may be determined by using a prediction mode of top and left adjacent blocks of the current block.

Referring to FIG. 31, when intra prediction modes of a top adjacent block 3110 adjacent to a top end of a current block 3100 and a left adjacent block 3120 adjacent to a left end of the current block 3100 are a vertical mode and a horizontal mode, respectively, an MPM mode of the current block 3110 may be determined as the vertical mode and the horizontal mode, and an additional mode set may include modes that have a high relation to the MPM mode and are close to the MPM mode, the modes being from among modes between the vertical mode and the horizontal mode. For example, the additional mode set may be configured of an intra prediction mode having an index increased by 1 from an intra prediction mode index of the vertical mode, an intra prediction mode having an index increased by 2 from the intra prediction mode index of the vertical mode, an intra prediction mode having an index decreased by 2 from an intra prediction mode index of the horizontal mode, an intra prediction mode having an index decreased by 1 from the intra prediction mode index of the horizontal mode, and an intra prediction mode having an index obtained by averaging and then rounding off intra prediction mode indices of the vertical mode and the horizontal mode.

According to an embodiment, the additional mode set may include N modes (where, N is a predetermined integer) according to the number of intra prediction modes or the number of MPMs.

According to an embodiment, the additional mode set may differently include N or M (where, N and M are positive integers) modes, according to a type of an intra prediction mode of a neighboring block adjacent to a current block. In detail, the additional mode set may vary according to a case where an intra prediction mode of the adjacent block is an angular mode and a case where an intra prediction mode of the adjacent block is a non-angular mode such as a DC mode, a planar mode, or the like.

When intra prediction mode candidates that are adaptively configured based on a shape of a current block are applied as described above, an intra prediction mode of an adjacent block may not be included in an intra prediction mode to be applied to the current block. According to embodiments, in a case where a shape of an adjacent block adjacent to a left or top end of a current block is different from a shape of the current block, and an intra prediction mode of the adjacent block adjacent to the left or top end is not included in intra prediction mode candidates of the current block, the intra prediction mode of the adjacent block adjacent to the left or top end may be substituted with an intra prediction mode having a closest direction from among the intra prediction mode candidates of the current block. According to embodiments, in a case where a shape of the adjacent block adjacent to the left or top end of the current block is different from a shape of the current block, and an intra prediction mode of the adjacent block adjacent to the left or top end is not included in intra prediction mode candidates of the current block, the intra prediction mode of the adjacent block adjacent to the left or top end may be substituted with an intra prediction mode indicating a direction closest to a direction that is opposite, by 180 degrees, to a direction indicated by the intra prediction mode of the adjacent block adjacent to the left or top end.

Referring to FIG. 31, it is assumed that the top adjacent block 3110 has a rectangular shape whose width is greater than its height, and an intra prediction mode of the top adjacent block 3110 indicates a direction 3115 between 0 degree and 45 degrees, the left adjacent block 3120 has a rectangular shape whose height is greater than its width, and an intra prediction mode of the left adjacent block 3120 indicates a direction 3125 between −90 degrees and −135 degrees, and the current block 3100 has a square shape. In this case, the intra prediction mode of the top adjacent block 3110 or the intra prediction mode of the left adjacent block 3120 indicates a direction deviating from a range between −135 degrees and −180 degrees and a range between 45 degrees and 180 degrees, and is not included in first intra prediction mode candidates of the current block 3100. In this manner, in a case where an MPM is configured, when intra prediction mode candidates are different because shapes of an adjacent block and a current block are different, an intra prediction mode of the adjacent block may be substituted with an intra prediction mode having a most similar direction from among intra prediction mode candidates to be applied to the current block. For example, with reference to FIG. 31, the intra prediction mode of the top adjacent block 3110 may be substituted with an intra prediction mode indicating a 45-degree direction 3116, instead of the direction 3115 between 0 degree and 45 degrees, and the intra prediction mode of the left adjacent block 3120 may be substituted with an intra prediction mode indicating a −135-degree direction 3126, instead of the direction 3125 between −90 degrees and −135 degrees.

According to another embodiment, when the intra prediction mode of the adjacent block is not included in the intra prediction mode candidates to be applied to the current block, the MPM may be configured by using an intra prediction mode indicating a direction that is opposite, by 180 degrees, to a direction indicated by the intra prediction mode of the adjacent block. For example, referring to FIG. 31, the intra prediction mode of the top adjacent block 3110 may be determined as an intra prediction mode indicating a direction that is opposite, by 180 degrees, to the direction 3115 between 0 degree and 45 degrees. In a case where the direction that is opposite by 180 degrees is not included in intra prediction mode candidates of the current block 3100, an intra prediction mode that is from among the intra prediction mode candidates of the current block 3100 and indicates a direction being most similar to the direction that is opposite by 180 degrees may be determined as the intra prediction mode of the top adjacent block 3110.

Even when a shape a current block and a shape of an adjacent block are different, an MPM of the adjacent block may be configured by changelessly using an intra prediction mode of the adjacent block, without a mode change when the adjacent block corresponds to a non-angular intra prediction mode such as a planar mode or a DC mode.

The disclosure has been particularly shown and described with reference to embodiments thereof. In this regard, it will be understood by one of ordinary skill in the art that various changes in form and details may be made therein without departing from the scope of the disclosure. Therefore, the embodiments should be considered in a descriptive sense only and not for purposes of limitation. The scope of the disclosure is defined not by the detailed descriptions of the disclosure but by the following claims, and all differences within the scope will be construed as being included in the disclosure.

Meanwhile, the aforedescribed embodiments of the disclosure can be written as a program executable on a computer, and can be implemented in general-use digital computers that execute the program by using a computer-readable recording medium. Examples of the computer-readable recording medium include magnetic storage media (e.g., ROM, floppy disks, hard disks, etc.), optical recording media (e.g., CD-ROMs, or DVDs), or the like.

The invention claimed is:

1. A video decoding method comprising:
obtaining, from a bitstream, intra prediction mode information indicating an intra prediction mode of a current block from among a plurality of intra prediction modes;
determining the intra prediction mode of the current block by using a width of the current block and a height of the current block, and the intra prediction mode information of the current block;
obtaining a prediction sample of pixel comprised in the current block by performing intra prediction according to the determined intra prediction mode of the current block;
obtaining a residual sample of pixel comprised in the current block; and
reconstructing the current block by using the prediction sample and the residual sample, and
wherein the determining of the intra prediction mode of the current block comprises,
when the current block has a square shape in which the width and the height are equal, determining the intra prediction mode of the current block, based on the intra prediction mode information, the intra prediction mode being from among intra prediction mode candidates comprising a plurality of predetermined intra prediction directions; and
when the current block has a non-square shape in which the width is greater than the height, substituting an intra prediction mode indicating a particular direction on an upper-right direction for an intra prediction mode indicating a particular direction on a lower-left direction based on the intra prediction mode information; and
when the current block has a non-square shape in which the height is greater than the width, substituting the intra prediction mode indicating the particular direction on the lower-left direction for the intra prediction mode indicating the particular direction on the upper-right direction based on the intra prediction mode information,
wherein, when a value of an intra prediction mode index indicating the intra prediction mode determined based on the intra prediction mode information is A (where A is an integer), a value of the intra prediction mode index indicating the substituted intra prediction mode is obtained by adding a predetermined value to A or subtracting a predetermined value from A.

2. A video decoding apparatus comprising:
a memory; and
at least one processor connected to the memory and configured to perform:
obtaining, from a bitstream, intra prediction mode information indicating an intra prediction mode of a current block from among a plurality of intra prediction modes;
determining the intra prediction mode of the current block by using a width of the current block and a height of the current block, and the intra prediction mode information of the current block;
obtaining a prediction sample of pixel comprised in the current block by performing intra prediction according to the determined intra prediction mode of the current block;
obtaining a residual sample of pixel comprised in the current block; and
reconstructing the current block by using the prediction sample and the residual sample, and
wherein the at least one processor is further configured to perform,
when the current block has a square shape in which the width and the height are equal, determining the intra prediction mode of the current block, based on the intra prediction mode information, the intra prediction mode being from among intra prediction mode candidates comprising a plurality of predetermined intra prediction directions, and
when the current block has a non-square shape in which the width is greater than the height, substituting an intra prediction mode indicating a particular direction on an upper-right direction for an intra prediction mode indicating a particular direction on a lower-left direction based on the intra prediction mode information; and
when the current block has a non-square shape in which the height is greater than the width, substituting the intra prediction mode indicating the particular direction on the lower-left direction for the intra prediction mode indicating the particular direction on the upper-right direction based on the intra prediction mode information,
wherein, when a value of an intra prediction mode index indicating the intra prediction mode determined based on the intra prediction mode information is A (where A is an integer), a value of the intra prediction mode index indicating the substituted intra prediction mode is obtained by adding a predetermined value to A or subtracting a predetermined value from A.

* * * * *